(12) United States Patent
Tang et al.

(10) Patent No.: US 8,369,029 B2
(45) Date of Patent: Feb. 5, 2013

(54) IMAGE CAPTURING LENS ASSEMBLY

(75) Inventors: Hsiang Chi Tang, Taichung (TW); Dung Yi Hsieh, Taichung (TW); Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 146 days.

(21) Appl. No.: 13/104,880

(22) Filed: May 10, 2011

(65) Prior Publication Data

US 2012/0212660 A1    Aug. 23, 2012

(30) Foreign Application Priority Data

Feb. 22, 2011   (TW) .............................. 100105726 A

(51) Int. Cl.
*G02B 9/00*         (2006.01)
(52) U.S. Cl. ...................................................... 359/754
(58) Field of Classification Search .......... 359/754–758, 359/763–766
See application file for complete search history.

(56) References Cited

U.S. PATENT DOCUMENTS

| | | | |
|---|---|---|---|
| 7,502,181 B2 * | 3/2009 | Shinohara | ..................... 359/764 |
| 7,777,972 B1 | 8/2010 | Chen et al. | |
| 7,864,454 B1 | 1/2011 | Tang et al. | |

\* cited by examiner

*Primary Examiner* — James Greece
(74) *Attorney, Agent, or Firm* — Morris, Manning & Martin, LLP; Tim Tingkang Xia, Esq.

(57) ABSTRACT

This invention provides an image capturing lens assembly in order from an object side to an image side comprising: a first lens group has only one first lens element with a positive refractive power, and a second lens group in order from the object side to the image side comprising: a second lens element with a negative refractive power, a third lens element, a fourth lens element and a fifth lens element; while a distance between an imaged object and the image capturing lens assembly changes from far to near, focusing is performed by moving the first lens group along the optical axis and a distance between the first lens group and an image plane changes from near to far. By such arrangement and focusing adjustment method, good image quality is achieved and less power is consumed.

24 Claims, 33 Drawing Sheets

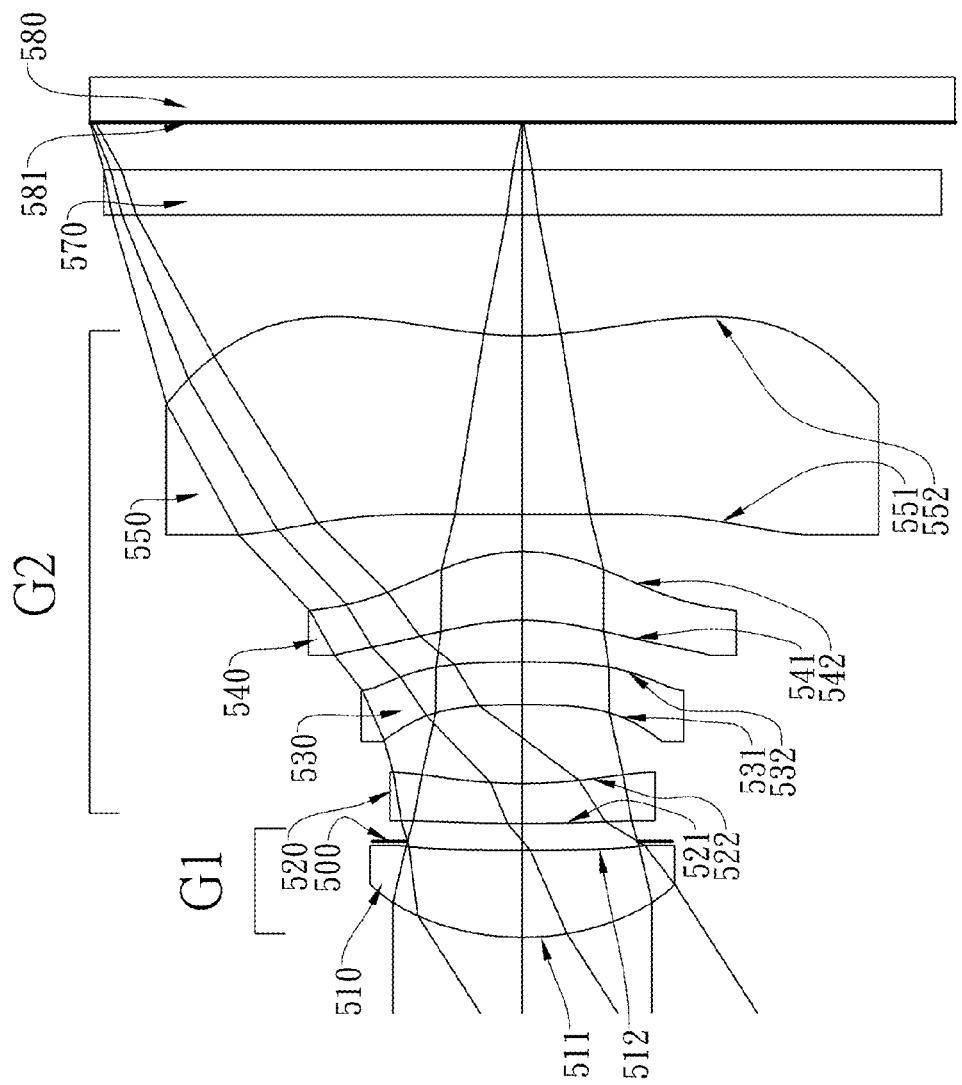

IMAGE CAPTURING LENS ASSEMBLY

CROSS-REFERENCE TO RELATED APPLICATIONS

This non-provisional application claims priority under 35 U.S.C. §119(a) on Patent Application No. 100105726 filed in Taiwan, R.O.C. on Feb. 22, 2011, the entire contents of which are hereby incorporated by reference.

BACKGROUND OF THE INVENTION

1. Field of the Invention

The present invention relates to an image capturing lens assembly, and more particularly, to a compact image capturing lens assembly used in electronic products.

2. Description of the Prior Art

In recent years, with the popularity of camera equipped in a mobile phone, the demand for compact photographing lens assemblies is increasing, and the sensor of a general photographing camera is none other than CCD (Charge Coupled Device) or CMOS device (Complementary Metal Oxide Semiconductor device). Furthermore, as advanced semiconductor manufacturing technology has reduced the pixel size of sensors and compact photographing lens assemblies have gradually evolved toward higher megapixels, there is an increasing demand for compact photographing lens assemblies featuring better image quality.

A conventional compact photographing lens assembly equipped in a mobile phone is usually a fixed-focus lens assembly with a fixed focal length. For a specific object distance, since the photographing lens assembly has a limited depth of field, it is apt to produce blurry images. Therefore, as the resolution of compact photographing lens assembly increases, a focusing adjustment function becomes more and more essential as well. As the system with five lens elements disclosed in U.S. Pat. No. 7,864,454, which is designed to perform focusing by the movement of the whole lens system, has a limited depth of field while focusing at an extremely close site and thereby obtains blurry peripheral images so that causing deficiency in image quality. Moreover, as the one disclosed in U.S. Pat. No. 7,777,972; wherein the invention is an imaging lens system with a structure of two lens groups. However, the second lens group thereof is configured with only three lens elements and thereby the ability to correct aberration and chromatic aberration is limited.

In addition, generally, a photographing lens assembly with a focusing adjustment function performs focusing adjustment by using a driving motor to move the entire photographing lens assembly relative to the sensor. However, such a photographing lens assembly requires higher power consumption because the driving motor is configured to drive the entire photographing lens assembly. Moreover, the photographing lens assembly has a relatively long total track length. In view of this, the driving power consumption of the present invention, which is only required for the movement of the first lens element, is low and the total track length thereof can be under well-controlled.

SUMMARY OF THE INVENTION

The present invention provides an image capturing lens assembly comprising, in order from an object side to an image side: a first lens group comprising only a first lens element with a positive refractive power; and a second lens group comprising, in order from an object side to an image side: a second lens element with a negative refractive power; a third lens element; a fourth lens element; and a fifth lens element; while a distance between an imaged object and the image capturing lens assembly changes from far to near, focusing is performed by moving the first lens group along the optical axis and a distance between the first lens group and an image plane changes from near to far; wherein a focal length of the image capturing lens assembly is f, a focal length of the third lens element is f3, a number of lens elements with refractive powers in the image capturing lens assembly is N, and they satisfy the following relations: $|f/f3|<0.7$; and $5 \leq N \leq 7$.

On the other hand, the present invention provides an image capturing lens assembly comprising, in order from an object side to an image side: a first lens group comprising only a first lens element with a positive refractive power; and a second lens group comprising, in order from an object side to an image side: a second lens element with a negative refractive power; a third lens element; a fourth lens element with a positive refractive power; and a fifth lens element with a negative refractive power; while a distance between an imaged object and the image capturing lens assembly changes from far to near, focusing is performed by moving the first lens group along the optical axis and a distance between the first lens group and an image plane changes from near to far; wherein a thickness of the second lens element on the optical axis is CT2, a thickness of the third lens element on the optical axis is CT3, a thickness of the fourth lens element on the optical axis is CT4, a thickness of the fifth lens element on the optical axis is CT5, a focal length of the image capturing lens assembly is f, a number of lens elements with refractive powers in the image capturing lens assembly is N, and they satisfy the following relations: $0.2<(CT2+CT3+CT4+CT5)/f<1.2$; and $5 \leq N \leq 7$.

By such arrangement and focusing adjustment method, good image quality is achieved and less power is consumed.

The image capturing lens assembly of the present invention has the ability to perform focusing by movements among lens groups, wherein focusing by adjusting the movable first lens group results in excellent image quality where the imaged object is at an extremely close site or an extremely far site.

In the aforementioned image capturing lens assembly, the first lens element has a positive refractive power, which thereby can reduce the total track length favorably. The second lens element has a negative refractive power, and thereby the aberration of the lens assembly can be effectively corrected and the image quality thereof can be favorably improved. The fourth lens element has a positive refractive power, and thereby the total track length of the lens assembly can be effectively reduced and the sensitivity thereof can be also reduced. The fifth lens element has a negative refractive power, and thereby the high order aberration of the lens assembly can be effectively corrected.

In the aforementioned image capturing lens assembly, the second lens group of the present invention, in comparison with the one in a conventional image lens system focusing by the movement of the lens elements thereof (such as the one disclosed in U.S. Pat. No. 7,777,972), contains an additional lens element with a refractive power, which is critical to the image quality thereof. If the aforementioned lens element has a positive refractive power, it can be served as a correcting lens element for better correction of the aberration of the lens assembly; whereas, if the aforementioned lens element has a negative refractive power, the negative refractive power can provide good effect on correcting the chromatic aberration of the lens assembly.

In the aforementioned image capturing lens assembly, when the first lens element has a convex object-side surface, the positive refractive power of the lens elements can be strengthened and thereby the total track length of the lens assembly can be reduced even more. When the second lens element has a concave image lens element, the aberration of the lens assembly can be corrected favorably. When the fourth lens element has a concave object-side surface and a convex image-side surface, it is favorable for the correction of the astigmatism of the lens assembly. When the fifth lens element has a concave object-side surface, the high order aberration of the lens assembly can be favorably corrected. When the fifth lens element has a concave image-side surface, the principle point can be positioned away from the image plane and thereby reducing the total track length of the lens assembly.

BRIEF DESCRIPTION OF THE DRAWINGS

FIG. 5A shows an image capturing lens assembly in accordance with a fifth embodiment of the present invention.

DETAILED DESCRIPTION OF THE PREFERRED EMBODIMENTS

Figure 1A:
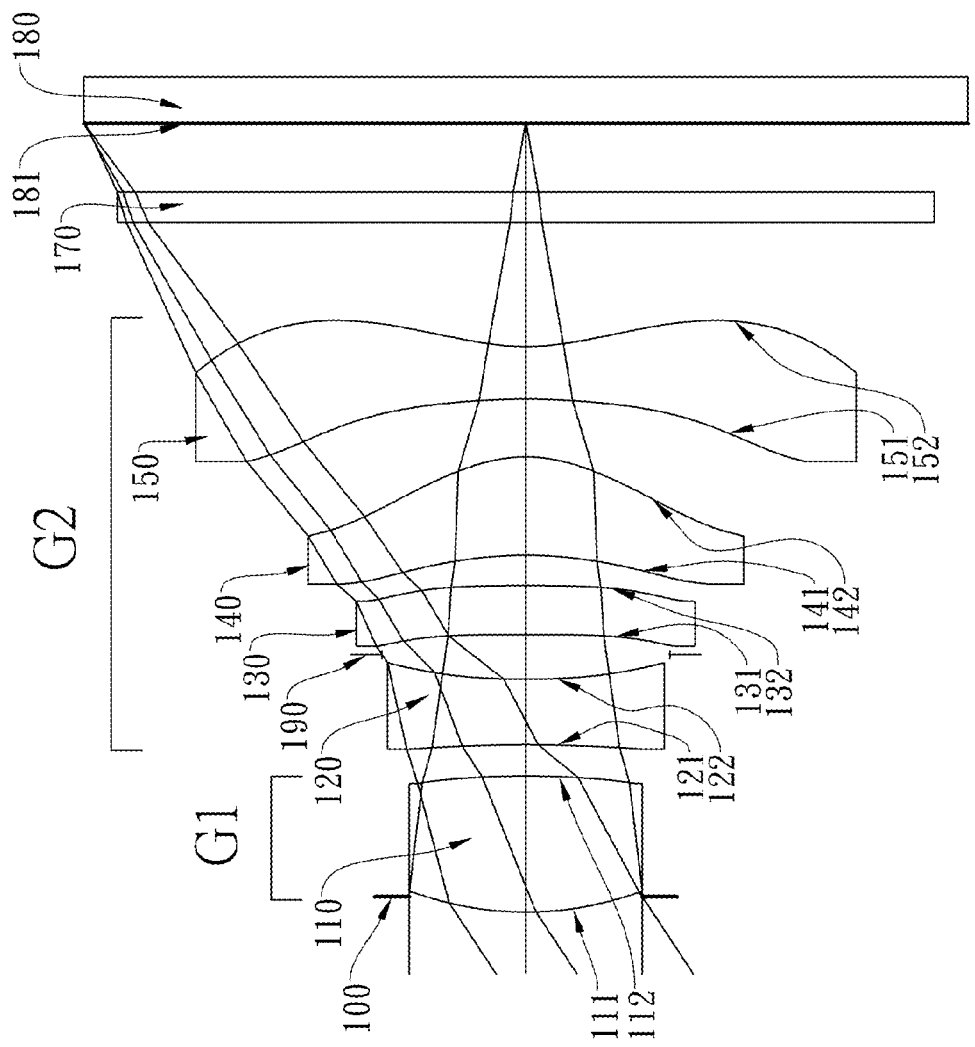
FIG. 1A shows an image capturing lens assembly in accordance with a first embodiment of the present invention.

The present invention provides an image capturing lens assembly comprising, in order from an object side to an image side: a first lens group comprising only a first lens element with a positive refractive power; and a second lens group comprising, in order from an object side to an image side: a second lens element with a negative refractive power; a third lens element; a fourth lens element; and a fifth lens element; while a distance between an imaged object and the image capturing lens assembly changes from far to near, focusing is performed by moving the first lens group along the optical axis and a distance between the first lens group and an image plane changes from near to far; wherein a focal length of the image capturing lens assembly is f, a focal length of the third lens element is f3, a number of lens elements with refractive powers in the image capturing lens assembly is N, and they satisfy the following relations as the first lens group is at the closest or the farthest position to the image plane: $|f/f3|<0.7$; and $5 \leq N \leq 7$.

When the relation of $|f/f3|<0.7$ is satisfied, the aberration of the lens assembly is corrected for improving image quality by adjusting the refractive power of the third lens element; preferably, the following relation is satisfied: $|f/f3|<0.4$.

When the relation of $5 \leq N \leq 7$ is satisfied, it means the lens assembly totally contains 5 to 7 lens elements so that the best balance between preventing the total track length from being excessively long and obtaining good image quality can be achieved.

In the aforementioned image capturing lens assembly, a difference of the focal length of the image capturing lens assembly while the first lens element is at the closest or the farthest position to the image plane is $^\Delta f$, the focal length of the image capturing lens assembly is f, and they preferably satisfy the following relation as the first lens group is at the closest or the farthest position to the image plane: $|^\Delta f/f|<0.1$. When the above relation is satisfied, the difference of the focal length is the best for preventing the total track length from being excessively long.

In the aforementioned image capturing lens assembly, a difference of the back focal length of the image capturing lens assembly while the first lens element is at the closest or the farthest position to the image plane is $^\Delta BFL$, and they preferably satisfy the following relation: $|^\Delta BFL|<0.1$ mm. When the above relation is satisfied, the space arrangement of the back focal length is more suitable so that the total track length is reduced.

In the aforementioned image capturing lens assembly, it is preferable to have at least one inflection point formed on at least one of the object-side and image-side surfaces of the fifth lens element. Consequently, the angle at which light projects onto the sensor from the off-axis field can be effectively reduced, and the off-axis aberrations can be further corrected.

In the aforementioned image capturing lens assembly, an Abbe number of the first lens element is V1, an Abbe number of the second lens element is V2, and they preferably satisfy the following relation: $28<V1-V2<45$. When the above relation is satisfied, the chromatic aberration of the first lens element can be favorably corrected.

In the aforementioned image capturing lens assembly, the lens assembly further comprising a stop, a distance on an optical axis between the stop and the image plane is SL, a distance on the optical axis between the object-side surface of the first lens element and the image plane is TTL, and they preferably satisfy the following relation as the first lens group is at the closest or the farthest position to the image plane: $0.92<SL/TTL<1.15$. When the above relation is satisfied, the position of the stop is favorable for providing telecentricity, which is thereby favorable for avoiding the occurrence of shading and improving the sensing efficiency.

In the aforementioned image capturing lens assembly, a focal length of the fourth lens element is f4, a focal length of the fifth lens element is f5, and they preferably satisfy the following relation: $0.6<|f4/f5|<1.4$. When the above relation is satisfied, the refractive powers of the fourth lens element and the fifth lens element are more suitable, and thereby the aberration of the lens assembly can be effectively corrected.

In the aforementioned image capturing lens assembly, a thickness of the second lens element on the optical axis is CT2, a thickness of the third lens element on the optical axis is CT3, a thickness of the fourth lens element on the optical axis is CT4, a thickness of the fifth lens element on the optical axis is CT5, the focal length of the image capturing lens assembly is f, and they preferably satisfy the following relation as the first lens group is at the closest or the farthest position to the image plane: $0.2<(CT2+CT3+CT4+CT5)/f<0.7$. When the above relation is satisfied, the thickness of the second lens group, including the second, third, fourth and fifth lens elements, is more suitable and thereby the total track length can be reduced effectively.

In the aforementioned image capturing lens assembly, the Abbe number of the first lens element is V1, the Abbe number of the second lens element is V2, an Abbe number of the third lens element is V3, and they preferably satisfy the following relation: $0.85<V1/(V2+V3)<1.7$. When the above relation is satisfied, the second and third lens elements are favorable for correcting the chromatic aberration of the lens assembly.

In the aforementioned image capturing lens assembly, the lens assembly further comprising an image sensor provided on the image plane; the distance on the optical axis between the object-side surface of the first lens element and the image plane is TTL, half of a diagonal length of an effective photosensitive area of the image sensor is ImgH, and they preferably satisfy the following relation as the first lens group is at the closest or the farthest position to the image plane: $TTL/ImgH<2.2$. When the above relation is satisfied, it is favorable for keeping the lens assembly compact for portable electronic products.

On the other hand, the present invention provides an image capturing lens assembly comprising, in order from an object side to an image side: a first lens group comprising only a first lens element with a positive refractive power; and a second lens group comprising, in order from an object side to an image side: a second lens element with a negative refractive power; a third lens element; a fourth lens element with a positive refractive power; and a fifth lens element with a negative refractive power; while a distance between an imaged object and the image capturing lens assembly changes from far to near, focusing is performed by moving the first lens group along the optical axis and a distance between the first lens group and an image plane changes from near to far; wherein a thickness of the second lens element on the optical axis is CT2, a thickness of the third lens element on the optical axis is CT3, a thickness of the fourth lens element on the optical axis is CT4, a thickness of the fifth lens element on the optical axis is CT5, a focal length of the image capturing lens assembly is f, a number of lens elements with refractive powers in the image capturing lens assembly is N, and they satisfy the following relations as the first lens group is at the closest or the farthest position to the image plane: $0.2<(CT2+CT3+CT4+CT5)/f<1.2$; and $5 \leq N \leq 7$.

When the relation of $0.2<(CT2+CT3+CT4+CT5)/f<1.2$ is satisfied, the thickness of the second lens group, including the second, third, fourth and fifth lens elements, is more suitable and thereby the total track length can be reduced effectively.

When the relation of $5 \leq N \leq 7$ is satisfied, it means the lens assembly totally contains 5 to 7 lens elements so that the best balance between preventing the total track length from being excessively long and obtaining good image quality can be achieved.

In the aforementioned image capturing lens assembly, a difference of the focal length of the image capturing lens assembly while the first lens element is at the closest or the farthest position to the image plane is $^\Delta f$, the focal length of the image capturing lens assembly is f, and they preferably satisfy the following relation as the first lens group is at the closest or the farthest position to the image plane: $|^\Delta f/f|<0.1$. When the above relation is satisfied, the difference of the focal length is the best for preventing the total track length from being excessively long.

In the aforementioned image capturing lens assembly, it is preferable to have at least one inflection point formed on at least one of the object-side and image-side surfaces of the fifth lens element. Consequently, the angle at which light projects onto the sensor from the off-axis field can be effectively reduced, and the off-axis aberrations can be further corrected.

In the aforementioned image capturing lens assembly, the focal length of the image capturing lens assembly is f, a focal length of the first lens element is f1, and they preferably satisfy the following relation as the first lens group is at the closest or the farthest position to the image plane: 1.0<f/f1<1.8. When the above relation is satisfied, the refractive power of the first lens element is favorable for reducing the total track length of the lens assembly.

In the aforementioned image capturing lens assembly, the focal length of the image capturing lens assembly is f, a focal length of the third lens element is f3, and they preferably satisfy the following relation as the first lens group is at the closest or the farthest position to the image plane: |f/f3|<0.7. When the above relation is satisfied, the aberration of the lens assembly is corrected for improving image quality by adjusting the refractive power of the third lens element.

In the aforementioned image capturing lens assembly, the Abbe number of the first lens element is V1, the Abbe number of the second lens element is V2, and they preferably satisfy the following relation: 28<V1−V2<45. When the above relation is satisfied, the chromatic aberration of the first lens element can be favorably corrected.

In the aforementioned image capturing lens assembly, the lens elements can be made of glass or plastic material. If the lens elements are made of glass, the freedom for distributing the refractive power of the image capturing lens assembly can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements used in an optical system. Consequently, the total track length of the image capturing lens assembly can be effectively reduced.

In the present image capturing lens assembly, if a lens element has a convex surface, it means the portion of the surface in proximity to the optical axis is convex; if a lens element has a concave surface, it means the portion of the surface in proximity to the optical axis is concave.

In the present image capturing lens assembly, there can be at least one stop, such as a glare stop or a field stop, provided for eliminating stray light and thereby promoting image resolution thereof.

Preferred embodiments of the present invention will be described in the following paragraphs by referring to the accompanying drawings.

Embodiment 1

Figure 1B:
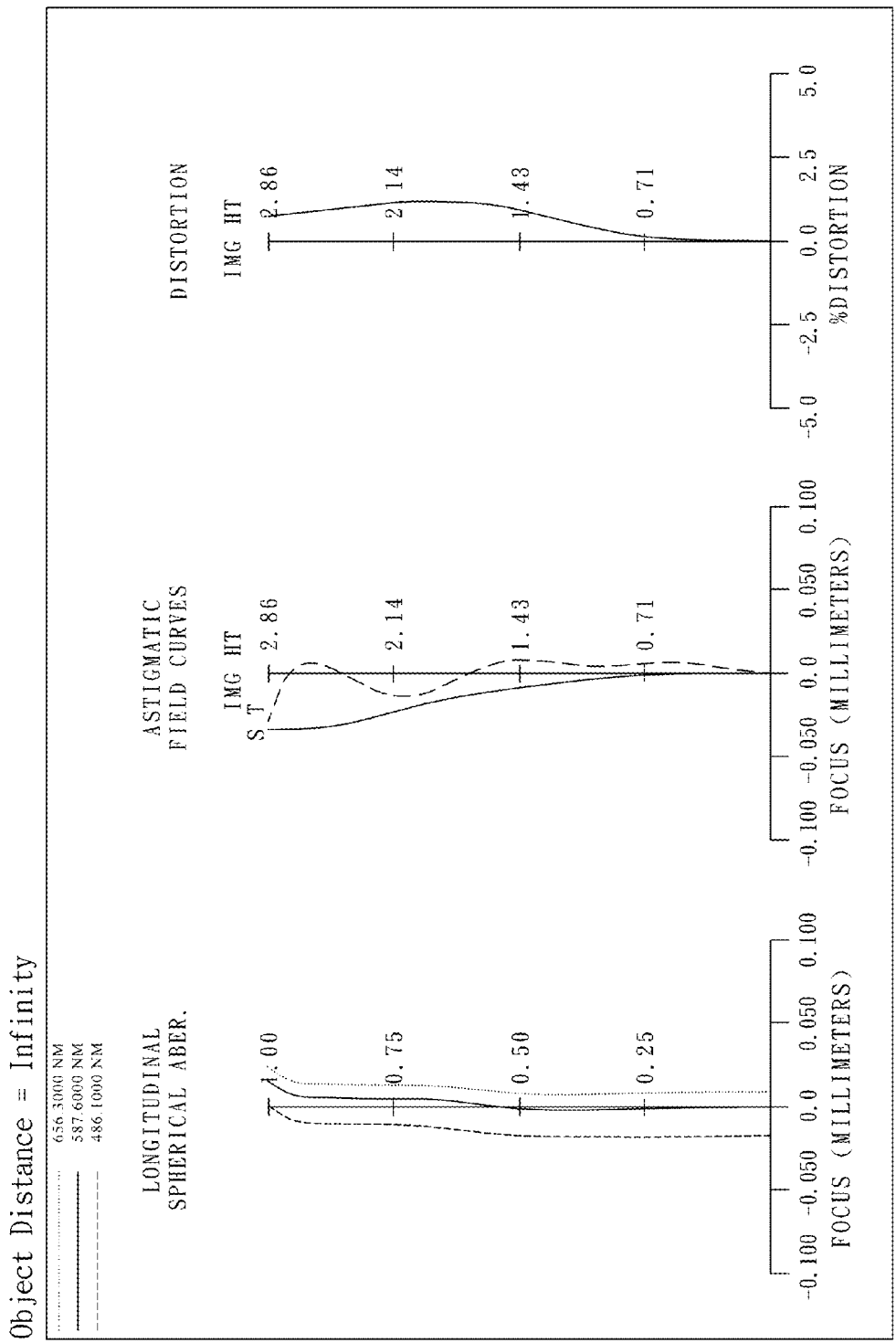
FIG. 1B shows the aberration curves of the first embodiment of the present invention as a distance between the lens assembly and an imaged object is infinite.
Figure 1C:
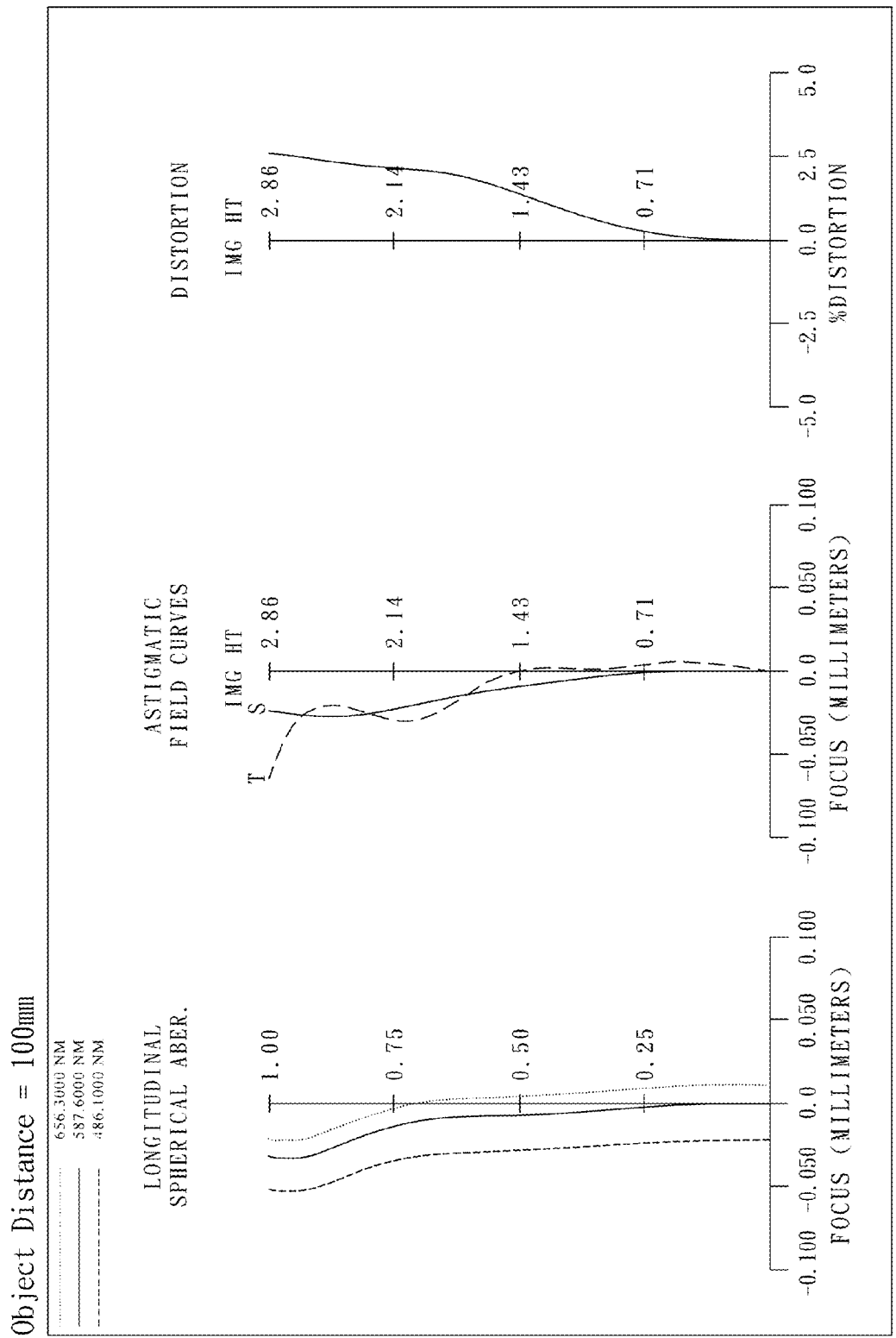
FIG. 1C shows the aberration curves of the first embodiment of the present invention as a distance between the lens assembly and the imaged object is 100 mm.

FIG. 1A shows an image capturing lens assembly in accordance with the first embodiment of the present invention; meanwhile, FIG. 1B shows the aberration curves of the first embodiment as a distance between the lens assembly and an imaged object is infinite, and FIG. 1C shows the aberration curves as a distance between the lens assembly and the imaged object is 100 mm. The image capturing lens assembly of the first embodiment of the present invention mainly comprises five lens elements, in order from an object side to an image side:

a first lens group G1, comprising a first lens element 110 made of plastic with a positive refractive power having a convex object-side surface 111 and a convex image-side surface 112, the object-side and image-side surfaces 111 and 112 thereof being aspheric; and a second lens group G2, comprising, in order from an object side to an image side:

a second lens element 120 made of plastic with a negative refractive power having a concave object-side surface 121 and a concave image-side surface 122, the object-side and image-side surfaces 121 and 122 thereof being aspheric;

a third lens element 130 made of plastic with a positive refractive power having a concave object-side surface 131 and a convex image-side surface 132, the object-side and image-side surfaces 131 and 132 thereof being aspheric;

a fourth lens element 140 made of plastic with a positive refractive power having a concave object-side surface 141 and a convex image-side surface 142, the object-side and image-side surfaces 141 and 142 thereof being aspheric; and a fifth lens element 150 made of plastic with a negative refractive power having a concave object-side surface 151 and a concave image-side surface 152, the object-side and image-side surfaces 151 and 152 thereof being aspheric, and at least one inflection point is formed on both the object-side and image-side surfaces 151 and 152 thereof;

wherein an aperture stop 100 is disposed between an imaged object and the first lens element 110; moreover, a stop 190 is disposed between the second lens element 120 and the third lens element 130;

the image capturing lens assembly further comprises an IR filter 170 disposed between the image-side surface 152 of the fifth lens element 150 and an image plane 181, and the IR filter 170 is made of glass and has no influence on the focal length of the image capturing lens assembly; the image capturing lens assembly further comprises an image sensor 180 provided on the image plane 181.

The detailed optical data of the first embodiment is shown in TABLE 1, and the aspheric surface data is shown in TABLE 2, wherein the units of the radius of curvature, the thickness and the focal length are expressed in mm, and HFOV is half of the maximal field of view.

TABLE 1

(Embodiment 1)
Object Distance = Infinity: f = 4.29 mm, Fno = 2.85, HFOV = 33.5 deg.

| Surface # | | Curvature Radius | Thickness | Material | Index | Abbe # | Focal length |
|---|---|---|---|---|---|---|---|
| 0 | Object | Plano | Infinity, 100 | | | | |
| 1 | Ape. Stop | Plano | −0.100 | | | | |
| 2 | Lens 1 | 2.036760 (ASP) | 0.880 | Plastic | 1.544 | 55.9 | 2.93 |
| 3 | | −6.230740 (ASP) | 0.203, 0.282 | | | | |
| 4 | Lens 2 | −7.757784 (ASP) | 0.424 | Plastic | 1.634 | 23.8 | −4.63 |
| 5 | | 4.827075 (ASP) | 0.160 | | | | |
| 6 | Stop | Plano | 0.128 | | | | |
| 7 | Lens 3 | −100.000000 (ASP) | 0.317 | Plastic | 1.634 | 23.8 | 40.12 |
| 8 | | −20.302263 (ASP) | 0.197 | | | | |
| 9 | Lens 4 | −2.646432 (ASP) | 0.637 | Plastic | 1.544 | 55.9 | 2.38 |
| 10 | | −0.944067 (ASP) | 0.374 | | | | |
| 11 | Lens 5 | −4.355796 (ASP) | 0.340 | Plastic | 1.530 | 55.8 | −2.06 |
| 12 | | 1.494423 (ASP) | 0.800 | | | | |
| 13 | IR-filter | Plano | 0.200 | Glass | 1.516 | 64.1 | — |

TABLE 1-continued (Embodiment 1)
Object Distance = Infinity: f = 4.29 mm, Fno = 2.85, HFOV = 33.5 deg.

| Surface # | | Curvature Radius | Thickness | Material Index | Abbe # | Focal length |
|---|---|---|---|---|---|---|
| 14 | | Plano | 0.443 | | | |
| 15 | Image | Plano | — | | | |

\* Reference wavelength is 587.6 nm (d-line)
\* Effective radius of surface 6(Stop) is 0.93 mm
\* Object Distance = 100 mm: surface 3 thickness = 0.282 mm, f = 4.18 mm

TABLE 2

Aspheric Coefficients

| Surface # | 2 | 3 | 4 | 5 | 7 |
|---|---|---|---|---|---|
| k = | −1.32208E+01 | −4.35934E+01 | −9.00000E+01 | 1.57374E+01 | −9.00000E+01 |
| A4 = | 1.73171E−01 | −4.17399E−02 | 3.75040E−02 | 5.58356E−02 | −8.92230E−02 |
| A6 = | −2.19962E−01 | 6.15343E−02 | −9.53714E−02 | −7.10038E−02 | −1.15769E−01 |
| A8 = | 2.31412E−01 | −2.95688E−01 | 2.67697E−01 | 1.06098E−01 | 3.74660E−01 |
| A10 = | −2.31084E−01 | 4.01471E−01 | −8.66040E−01 | −3.15992E−01 | −4.67083E−01 |
| A12 = | 1.90139E−01 | −1.22296E−01 | 1.38914E+00 | 3.92369E−01 | 2.22744E−01 |
| A14 = | −1.02420E−01 | −1.23860E−01 | −8.14948E−01 | −1.66284E−01 | |

| Surface # | 8 | 9 | 10 | 11 | 12 |
|---|---|---|---|---|---|
| k = | −9.00000E+01 | 2.74954E+00 | −3.41243E+00 | −6.18834E+01 | −1.02710E+01 |
| A4 = | −8.03935E−02 | 4.79701E−02 | −6.85281E−02 | −2.15242E−02 | −6.10341E−02 |
| A6 = | −9.63703E−02 | 5.49222E−02 | 1.29451E−01 | −2.74337E−02 | 1.57564E−02 |
| A8 = | 1.41869E−01 | −2.11643E−01 | −1.14726E−01 | 1.24934E−02 | −5.48171E−03 |
| A10 = | −5.78265E−02 | 3.09310E−01 | 6.66127E−02 | −7.70927E−04 | 1.42234E−03 |
| A12 = | 2.00041E−02 | −1.70177E−01 | −1.78138E−01 | −2.15167E−04 | −2.24585E−04 |
| A14 = | | 3.34514E−02 | 1.30790E−03 | 1.96793E−05 | 1.54051E−05 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present image capturing lens assembly, the focal length of the image capturing lens assembly is f, and it satisfies the following relation as the first lens element 110 is at the closest position to the image plane 181: f=4.29 (mm).

In the first embodiment of the present image capturing lens assembly, the f-number of the image capturing lens assembly is Fno, and it satisfies the relation: Fno=2.85.

In the first embodiment of the present image capturing lens assembly, half of the maximal field of view of the image capturing lens assembly is HFOV, and it satisfies the relation: HFOV=33.5 deg.

In the first embodiment of the present image capturing lens assembly, a number of lens elements with refractive powers in the image capturing lens assembly is N, and it satisfies the relation: N=5.

In the first embodiment of the present image capturing lens assembly, an Abbe number of the first lens element 110 is V1, an Abbe number of the second lens element 120 is V2, and they satisfy the relation: V1−V2=32.1.

In the first embodiment of the present image capturing lens assembly, the Abbe number of the first lens element 110 is V1, the Abbe number of the second lens element 120 is V2, an Abbe number of the third lens element 130 is V3, and they satisfy the relation: V1/(V2+V3)=1.17.

In the first embodiment of the present image capturing lens assembly, a thickness of the second lens element 120 on the optical axis is CT2, a thickness of the third lens element 130 on the optical axis is CT3, a thickness of the fourth lens element 140 on the optical axis is CT4, a thickness of the fifth lens element 150 on the optical axis is CT5, the focal length of the image capturing lens assembly is f, and they satisfy the following relation as the first lens element 110 is at the closest position to the image plane 181: (CT2+CT3+CT4+CT5)/f=0.40.

In the first embodiment of the present image capturing lens assembly, the focal length of the image capturing lens assembly is f, a focal length of the first lens element 110 is f1, and they satisfy the following relation as the first lens element 110 is at the closest position to the image plane 181: f/f1=1.46.

In the first embodiment of the present image capturing lens assembly, the focal length of the image capturing lens assembly is f, a focal length of the third lens element 130 is f3, and they satisfy the following relation as the first lens element 110 is at the closest position to the image plane 181: |f/f3|=0.11.

In the first embodiment of the present image capturing lens assembly, a focal length of the fourth lens element 140 is f4, a focal length of the fifth lens element 150 is f5, and they satisfy the relation: |f4/f5|=1.16.

In the first embodiment of the present image capturing lens assembly, a difference of the focal length of the image capturing lens assembly while the first lens element 110 is at the closest or the farthest position to the image plane 181 is $^\Delta$f, the focal length of the image capturing lens assembly is f, and they satisfy the following relation as the first lens element 110 is at the closest position to the image plane 181: |$^\Delta$f/f|=0.026.

In the first embodiment of the present image capturing lens assembly, a difference of the back focal length of the image capturing lens assembly while the first lens element 110 is at the closest or the farthest position to the image plane 181 is $^\Delta$BFL, and they satisfy the relation: |$^\Delta$BFL|=0.0 (mm).

In the first embodiment of the present image capturing lens assembly, the distance on the optical axis between the aperture stop 100 and the image plane 181 is SL, the distance on the optical axis between the object-side surface 111 of the first lens element 110 and the image plane 181 is TTL, and they satisfy the relation: SL/TTL=0.98.

In the first embodiment of the present image capturing lens assembly, the distance on the optical axis between the object-side surface 111 of the first lens element 110 and the image plane 181 is TTL, half of the diagonal length of the effective photosensitive area of the image sensor 180 is ImgH, and they satisfy the following relation as the first lens element 110 is at the closest position to the image plane 181: TTL/ImgH=1.76.

Embodiment 2

Figure 2A:
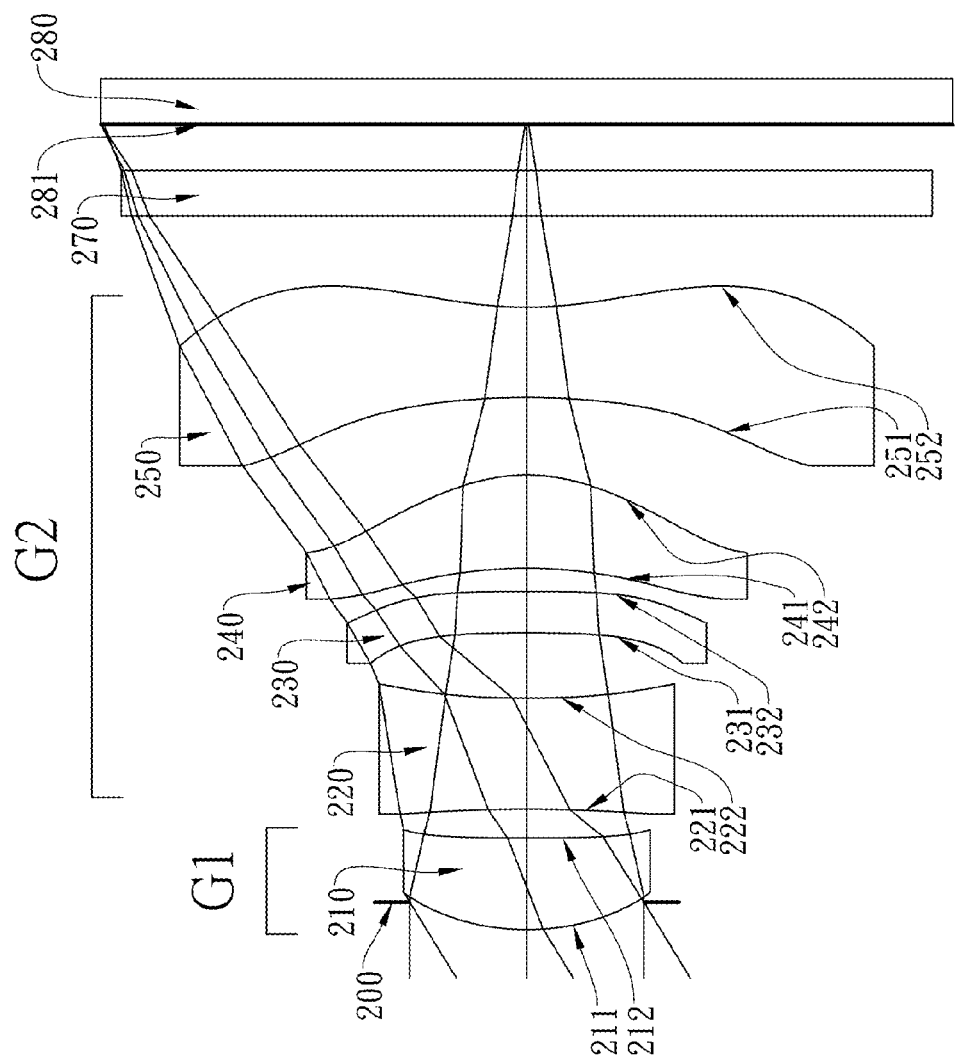
FIG. 2A shows an image capturing lens assembly in accordance with a second embodiment of the present invention.
Figure 2B:
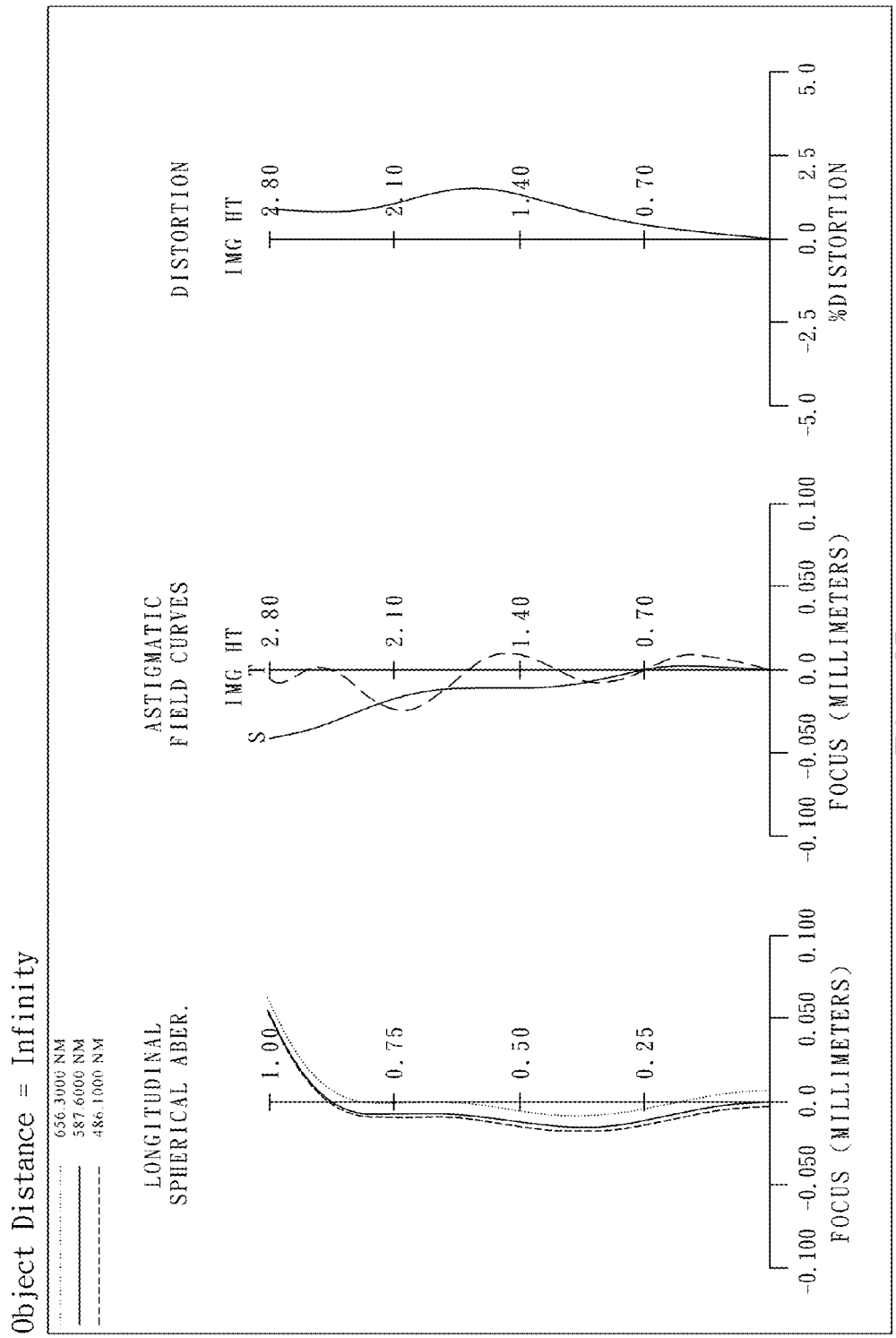
FIG. 2B shows the aberration curves of the second embodiment of the present invention as a distance between the lens assembly and an imaged object is infinite.
Figure 2C:
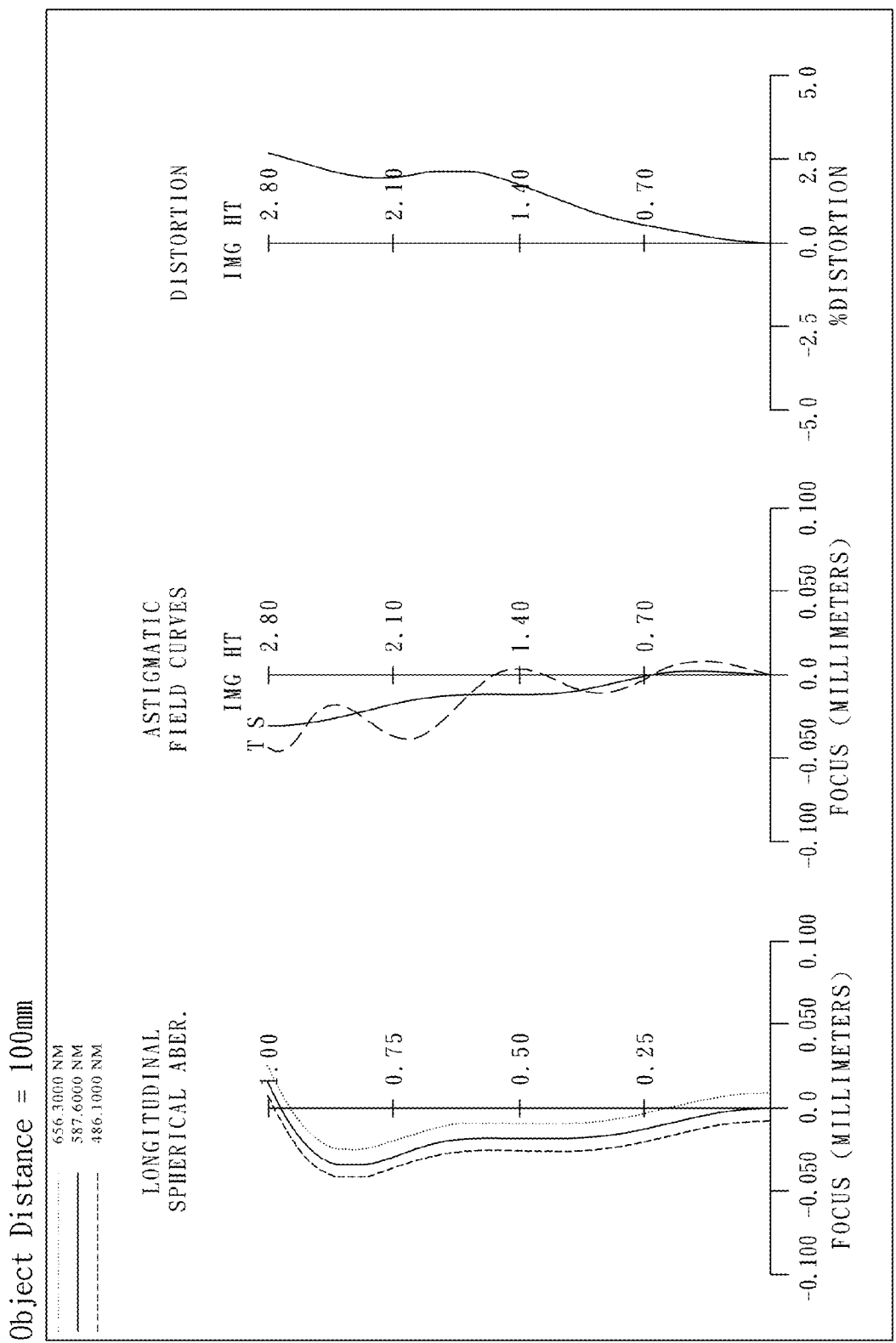
FIG. 2C shows the aberration curves of the second embodiment of the present invention as a distance between the lens assembly and the imaged object is 100 mm.

FIG. 2A shows an image capturing lens assembly in accordance with the second embodiment of the present invention; meanwhile, FIG. 2B shows the aberration curves of the second embodiment as a distance between the lens assembly and an imaged object is infinite, and FIG. 2C shows the aberration curves as a distance between the lens assembly and the imaged object is 100 mm. The image capturing lens assembly of the second embodiment of the present invention mainly comprises five lens elements, in order from an object side to an image side:

a first lens group G1, comprising a first lens element 210 made of plastic with a positive refractive power having a convex object-side surface 211 and a concave image-side surface 212, the object-side and image-side surfaces 211 and 212 thereof being aspheric; and a second lens group G2, comprising, in order from an object side to an image side:

a second lens element 220 made of plastic with a negative refractive power having a concave object-side surface 221 and a concave image-side surface 222, the object-side and image-side surfaces 221 and 222 thereof being aspheric;

a third lens element 230 made of plastic with a negative refractive power having a concave object-side surface 231 and a convex image-side surface 232, the object-side and image-side surfaces 231 and 232 thereof being aspheric;

a fourth lens element 240 made of plastic with a positive refractive power having a concave object-side surface 241 and a convex image-side surface 242, the object-side and image-side surfaces 241 and 242 thereof being aspheric; and a fifth lens element 250 made of plastic with a negative refractive power having a concave object-side surface 251 and a concave image-side surface 252, the object-side and image-side surfaces 251 and 252 thereof being aspheric, and at least one inflection point is formed on both the object-side and image-side surfaces 251 and 252 thereof;

wherein an aperture stop 200 is disposed between an imaged object and the first lens element 210;

the image capturing lens assembly further comprises an IR filter 270 disposed between the image-side surface 252 of the fifth lens element 250 and an image plane 281, and the IR filter 270 is made of glass and has no influence on the focal length of the image capturing lens assembly; the image capturing lens assembly further comprises an image sensor 280 provided on the image plane 281.

The detailed optical data of the second embodiment is shown in TABLE 3, and the aspheric surface data is shown in TABLE 4, wherein the units of the radius of curvature, the thickness and the focal length are expressed in mm, and HFOV is half of the maximal field of view.

TABLE 3

(Embodiment 2)
Object Distance = Infinity: f = 4.54 mm, Fno = 2.95, HFOV = 31.5 deg.

| Surface # | | Curvature Radius | Thickness | Material | Index | Abbe # | Focal length |
|---|---|---|---|---|---|---|---|
| 0 | Object | Plano | Infinity, 100 | | | | |
| 1 | Ape. Stop | Plano | −0.180 | | | | |
| 2 | Lens 1 | 1.569857 (ASP) | 0.603 | Plastic | 1.544 | 55.9 | 3.07 |
| 3 | | 22.936248 (ASP) | 0.190, 0.278 | | | | |
| 4 | Lens 2 | −8.520521 (ASP) | 0.730 | Plastic | 1.650 | 21.4 | −5.59 |
| 5 | | 6.537925 (ASP) | 0.430 | | | | |
| 6 | Lens 3 | −13.992371 (ASP) | 0.272 | Plastic | 1.650 | 21.4 | −43.12 |
| 7 | | −28.169268 (ASP) | 0.153 | | | | |
| 8 | Lens 4 | −3.004038 (ASP) | 0.614 | Plastic | 1.544 | 55.9 | 3.23 |
| 9 | | −1.189474 (ASP) | 0.510 | | | | |
| 10 | Lens 5 | −4.650438 (ASP) | 0.593 | Plastic | 1.544 | 55.9 | −2.79 |
| 11 | | 2.358114 (ASP) | 0.600 | | | | |
| 12 | IR-filter | Plano | 0.300 | Glass | 1.516 | 64.1 | — |
| 13 | | Plano | 0.303 | | | | |
| 14 | Image | Plano | — | | | | |

* Reference wavelength is 587.6 nm (d-line)
* Object Distance = 100 mm: surface 3 thickness = 0.278 mm, f = 4.40 mm

TABLE 4

Aspheric Coefficients

| Surface # | 2 | 3 | 4 | 5 | 6 |
|---|---|---|---|---|---|
| k = | −6.38848E+00 | −1.00000E+00 | −2.07970E+01 | 3.66321E+01 | 0.00000E+00 |
| A4 = | 2.29846E−01 | 5.45050E−02 | 3.93122E−02 | 4.21054E−02 | −7.64127E−02 |

TABLE 4-continued

| Aspheric Coefficients | | | | | |
|---|---|---|---|---|---|
| A6 = | −1.79577E−01 | 7.21730E−02 | −9.84031E−02 | −7.09929E−02 | −1.88312E−01 |
| A8 = | 2.71650E−01 | −2.18939E−01 | 2.94058E−01 | 1.34132E−01 | 3.98230E−01 |
| A10 = | −1.97846E−01 | 4.20281E−01 | −8.39057E−01 | −3.29086E−01 | −4.37268E−01 |
| A12 = | 6.68855E−02 | −8.05981E−02 | 1.31077E+00 | 3.63578E−01 | 1.60962E−01 |
| A14 = | 2.17661E−02 | −1.11609E−01 | −7.69226E−01 | −1.54035E−01 | |

| Surface # | 7 | 8 | 9 | 10 | 11 |
|---|---|---|---|---|---|
| k = | 0.00000E+00 | 3.76848E+00 | −4.08879E+00 | −2.56155E+01 | −1.15474E+01 |
| A4 = | −7.89063E−02 | 4.29790E−02 | −1.05839E−01 | −1.13495E−02 | −4.28815E−02 |
| A6 = | −1.08385E−01 | 3.43932E−02 | 1.31758E−01 | −2.93976E−02 | 1.19212E−02 |
| A8 = | 1.23420E−01 | −2.11215E−01 | −1.14579E−01 | 1.21378E−02 | −5.78496E−03 |
| A10 = | −6.39774E−02 | 3.12515E−01 | 6.70933E−02 | −7.98197E−04 | 1.55903E−03 |
| A12 = | 1.87402E−02 | −1.69117E−01 | −1.75478E−02 | −2.08022E−04 | −2.08174E−04 |
| A14 = | | 3.26241E−02 | 1.39828E−03 | 2.49826E−05 | 1.10379E−05 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

| (Embodiment 2) | | | |
|---|---|---|---|
| f | 4.54 | f/f1 | 1.48 |
| Fno | 2.95 | |f/f3| | 0.11 |
| HFOV | 31.5 | |f4/f5| | 1.16 |
| N | 5 | |Δf/f| | 0.031 |
| V1 − V2 | 34.5 | |ΔBFL| [mm] | 0.0 |
| V1/(V2 + V3) | 1.31 | SL/TTL | 0.97 |
| (CT2 + CT3 + CT4 + CT5)/f | 0.49 | TTL/ImgH | 1.85 |

Embodiment 3

Figure 3A:
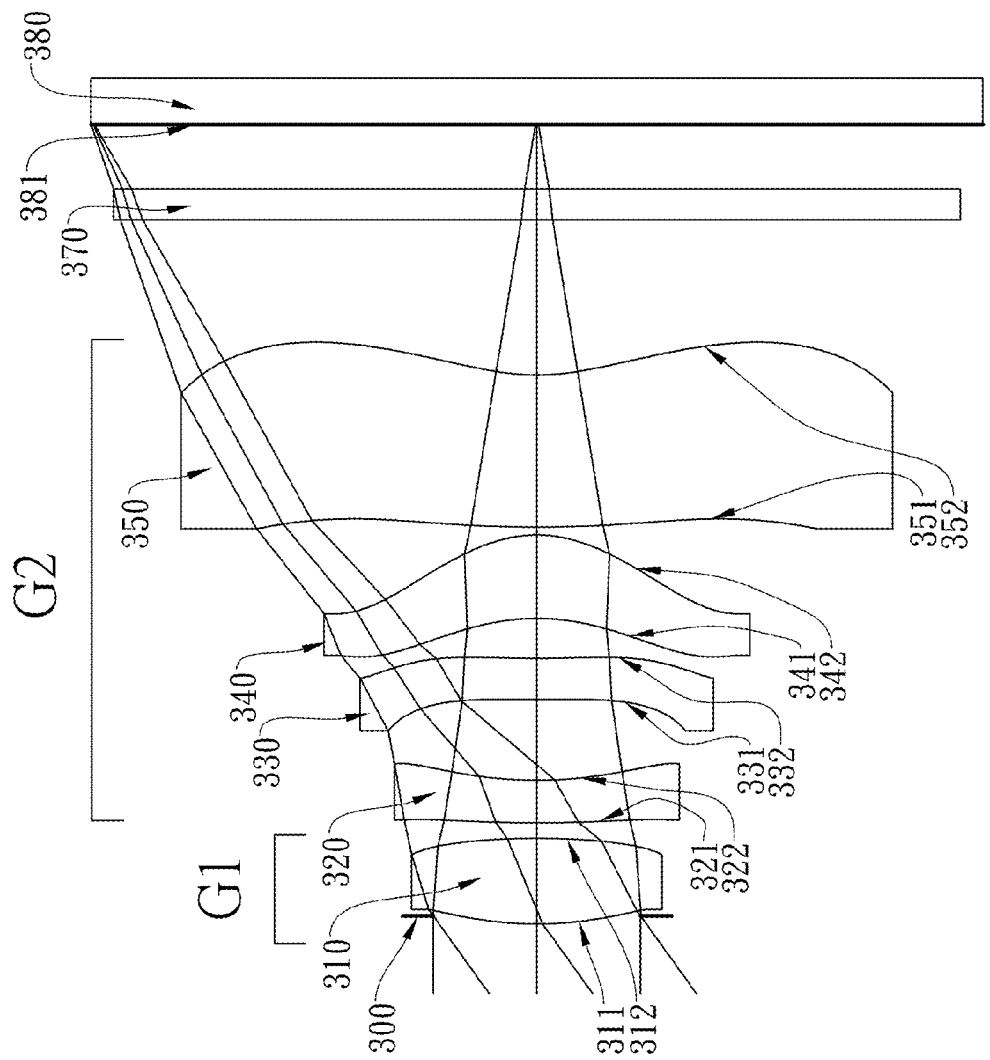
FIG. 3A shows an image capturing lens assembly in accordance with a third embodiment of the present invention.
Figure 3B:
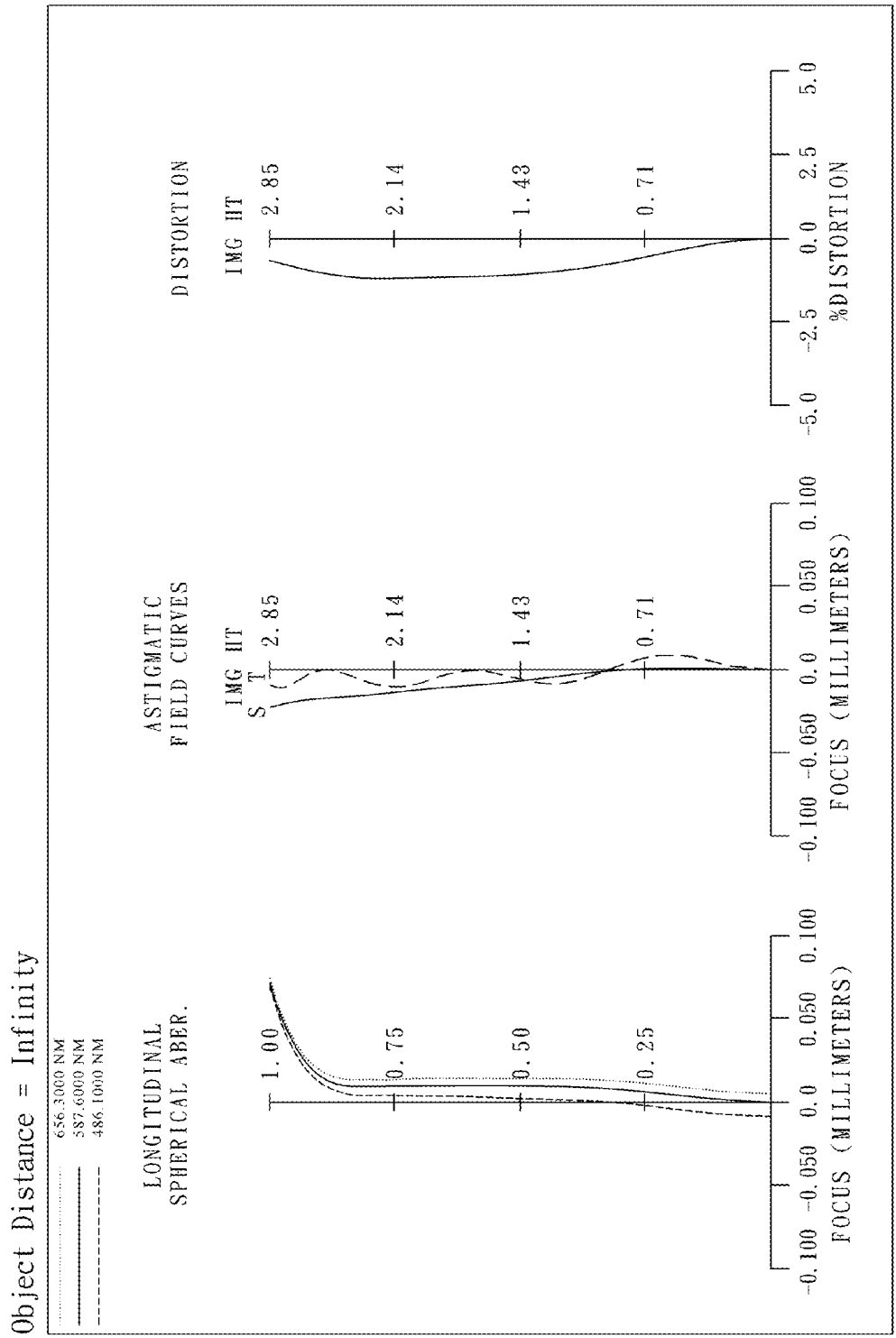
FIG. 3B shows the aberration curves of the third embodiment of the present invention as a distance between the lens assembly and an imaged object is infinite.
Figure 3C:
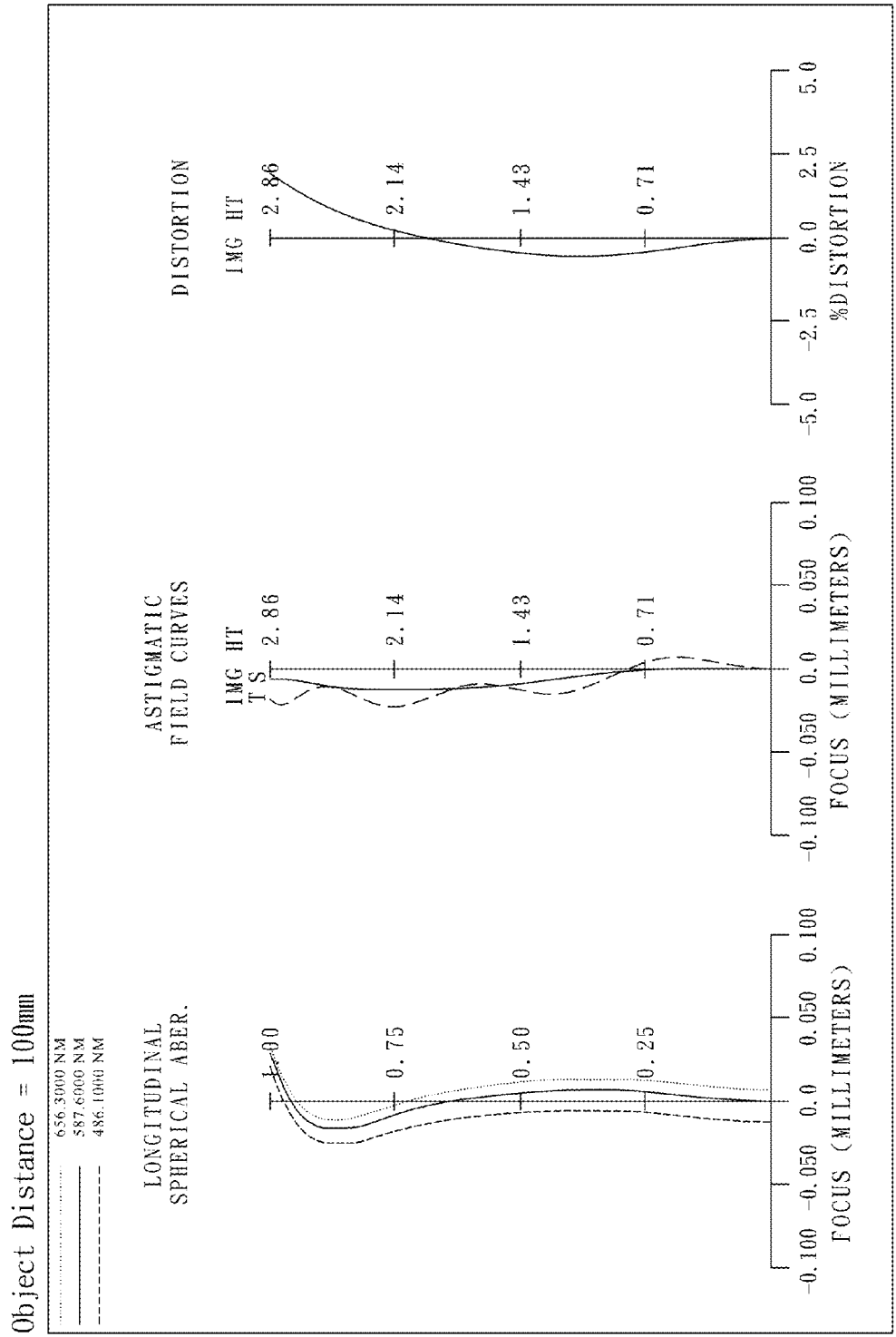
FIG. 3C shows the aberration curves of the third embodiment of the present invention as a distance between the lens assembly and the imaged object is 100 mm.

FIG. 3A shows an image capturing lens assembly in accordance with the third embodiment of the present invention; meanwhile, FIG. 3B shows the aberration curves of the third embodiment as a distance between the lens assembly and an imaged object is infinite, and FIG. 3C shows the aberration curves as a distance between the lens assembly and the imaged object is 100 mm. The image capturing lens assembly of the third embodiment of the present invention mainly comprises five lens elements, in order from an object side to an image side:

a first lens group G1, comprising a first lens element 310 made of plastic with a positive refractive power having a convex object-side surface 311 and a convex image-side surface 312, the object-side and image-side surfaces 311 and 312 thereof being aspheric; and a second lens group G2, comprising, in order from an object side to an image side:

a second lens element 320 made of plastic with a negative refractive power having a convex object-side surface 321 and a concave image-side surface 322, the object-side and image-side surfaces 321 and 322 thereof being aspheric;

a third lens element 330 made of plastic with a negative refractive power having a convex object-side surface 331 and a concave image-side surface 332, the object-side and image-side surfaces 331 and 332 thereof being aspheric;

a fourth lens element 340 made of plastic with a positive refractive power having a concave object-side surface 341 and a convex image-side surface 342, the object-side and image-side surfaces 341 and 342 thereof being aspheric; and a fifth lens element 350 made of plastic with a negative refractive power having a convex object-side surface 351 and a concave image-side surface 352, the object-side and image-side surfaces 351 and 352 thereof being aspheric, and at least one inflection point is formed on both the object-side and image-side surfaces 351 and 352 thereof;

wherein an aperture stop 300 is disposed between an imaged object and the first lens element 310;

the image capturing lens assembly further comprises an IR filter 370 disposed between the image-side surface 352 of the fifth lens element 350 and an image plane 381, and the IR filter 370 is made of glass and has no influence on the focal length of the image capturing lens assembly; the image capturing lens assembly further comprises an image sensor 380 provided on the image plane 381.

The detailed optical data of the third embodiment is shown in TABLE 6, and the aspheric surface data is shown in TABLE 7, wherein the units of the radius of curvature, the thickness and the focal length are expressed in mm, and HFOV is half of the maximal field of view.

TABLE 6

| (Embodiment 3) | | | | | | | |
|---|---|---|---|---|---|---|---|
| Object Distance = Infinity: f = 4.00 mm, Fno = 3.00, HFOV = 35.7 deg. | | | | | | | |
| Surface # | | Curvature Radius | Thickness | Material | Index | Abbe # | Focal length |
| 0 | Object | Plano | Infinity, 100 | | | | |
| 1 | Ape. Stop | Plano | −0.052 | | | | |
| 2 | Lens 1 | 2.261406 (ASP) | 0.551 | Plastic | 1.544 | 55.9 | 2.99 |
| 3 | | −5.291145 (ASP) | 0.100, 0.184 | | | | |
| 4 | Lens 2 | 8.592747 (ASP) | 0.275 | Plastic | 1.632 | 23.4 | −6.00 |
| 5 | | 2.599376 (ASP) | 0.520 | | | | |
| 6 | Lens 3 | 15.822785 (ASP) | 0.265 | Plastic | 1.632 | 23.4 | −17.86 |
| 7 | | 6.544633 (ASP) | 0.258 | | | | |
| 8 | Lens 4 | −1.385950 (ASP) | 0.538 | Plastic | 1.544 | 55.9 | 2.78 |
| 9 | | −0.822405 (ASP) | 0.050 | | | | |

TABLE 6-continued (Embodiment 3)
Object Distance = Infinity: f = 4.00 mm, Fno = 3.00, HFOV = 35.7 deg.

| Surface # | | Curvature Radius | Thickness | Material | Index | Abbe # | Focal length |
|---|---|---|---|---|---|---|---|
| 10 | Lens 5 | 7.503793 (ASP) | 0.980 | Plastic | 1.530 | 55.8 | −3.36 |
| 11 | | 1.372632 (ASP) | 1.000 | | | | |
| 12 | IR-filter | Plano | 0.200 | Glass | 1.516 | 64.1 | — |
| 13 | | Plano | 0.414 | | | | |
| 14 | Image | Plano | — | | | | |

* Reference wavelength is 587.6 nm (d-line)
* Object Distance = 100 mm: surface 3 thickness = 0.184 mm, f = 3.95 mm

TABLE 7

| Aspheric Coefficients | | | | | |
|---|---|---|---|---|---|
| Surface # | 2 | 3 | 4 | 5 | 6 |
| k = | −2.03824E+01 | −1.82440E+00 | −9.91111E+00 | −1.00000E+00 | 0.00000E+00 |
| A4 = | 1.72350E−01 | −3.83997E−02 | −2.84703E−03 | −2.91331E−02 | −2.64344E−01 |
| A6 = | −3.20541E−01 | −5.76889E−02 | −4.60283E−02 | 4.16478E−02 | 3.34765E−02 |
| A8 = | 2.19467E−01 | −1.29776E−01 | 2.31956E−02 | −1.25430E−01 | 9.32394E−03 |
| A10 = | 1.47442E−01 | 3.70811E−01 | −1.72069E−01 | −5.86070E−02 | 4.62686E−02 |
| A12 = | −4.84513E−01 | −4.64305E−01 | 3.69926E−01 | 2.10667E−01 | −1.18628E−01 |
| A14 = | 2.29340E−02 | 8.70037E−02 | −2.76624E−01 | −1.59862E−01 | |

| Surface # | 7 | 8 | 9 | 10 | 11 |
|---|---|---|---|---|---|
| k = | 0.00000E+00 | −3.43744E−18 | −2.69747E+00 | −1.00000E+00 | −1.02584E+01 |
| A4 = | −2.02929E−01 | 1.52094E−01 | −1.36712E−01 | −1.00547E−03 | −5.36776E−02 |
| A6 = | −2.32785E−02 | 8.39396E−02 | 2.03626E−01 | −2.60690E−02 | 2.14292E−02 |
| A8 = | 1.17832E−01 | −2.05839E−01 | −1.14118E−01 | 1.04989E−02 | −8.06464E−03 |
| A10 = | −8.77160E−02 | 2.95262E−01 | 5.98438E−02 | −1.11181E−03 | 1.78999E−03 |
| A12 = | 3.22763E−02 | −1.71454E−01 | −1.99946E−02 | −2.22513E−04 | −2.14094E−04 |
| A14 = | | 3.63899E−02 | 2.40853E−03 | 4.46947E−05 | 1.01323E−05 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

| (Embodiment 3) | | | |
|---|---|---|---|
| f | 4.00 | f/f1 | 1.34 |
| Fno | 3.00 | |f/f3| | 0.22 |
| HFOV | 35.7 | |f4/f5| | 0.83 |
| N | 5 | |Δf/f| | 0.013 |
| V1 − V2 | 32.5 | |ΔBFL| [mm] | 0.0 |
| V1/(V2 + V3) | 1.19 | SL/TTL | 0.99 |
| (CT2 + CT3 + CT4 + CT5)/f | 0.51 | TTL/ImgH | 1.78 |

Embodiment 4

Figure 4A:
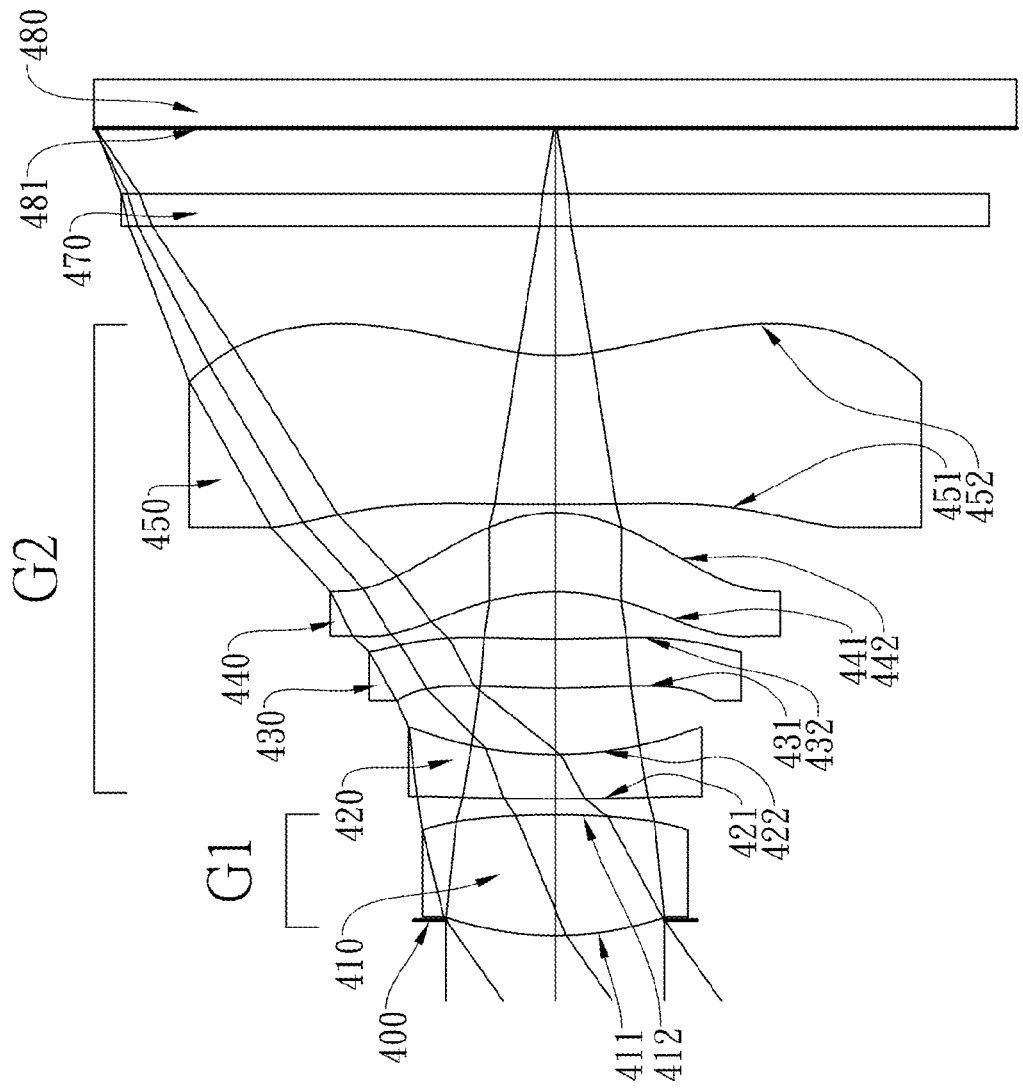
FIG. 4A shows an image capturing lens assembly in accordance with a fourth embodiment of the present invention.
Figure 4B:
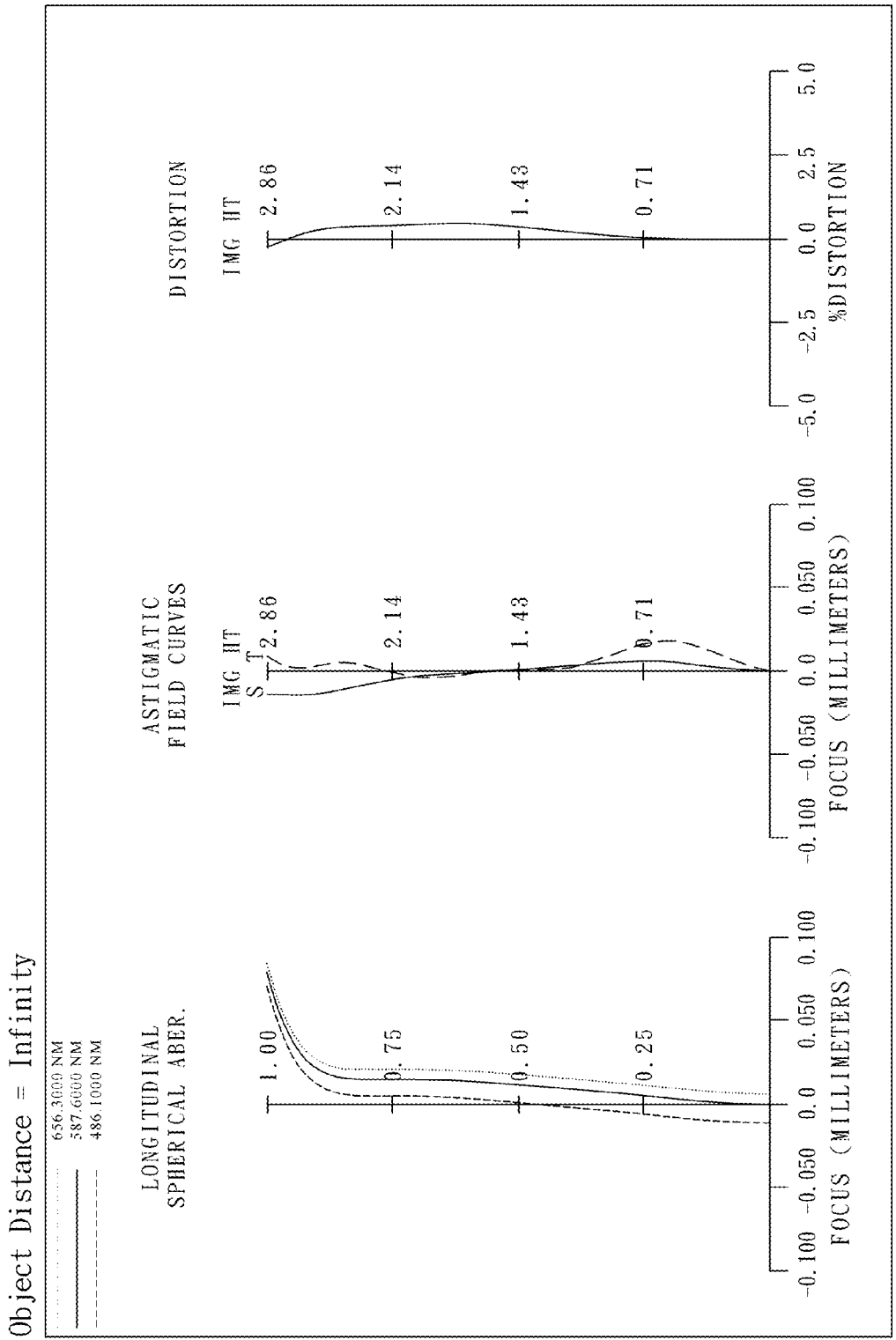
FIG. 4B shows the aberration curves of the fourth embodiment of the present invention as a distance between the lens assembly and an imaged object is infinite.
Figure 4C:
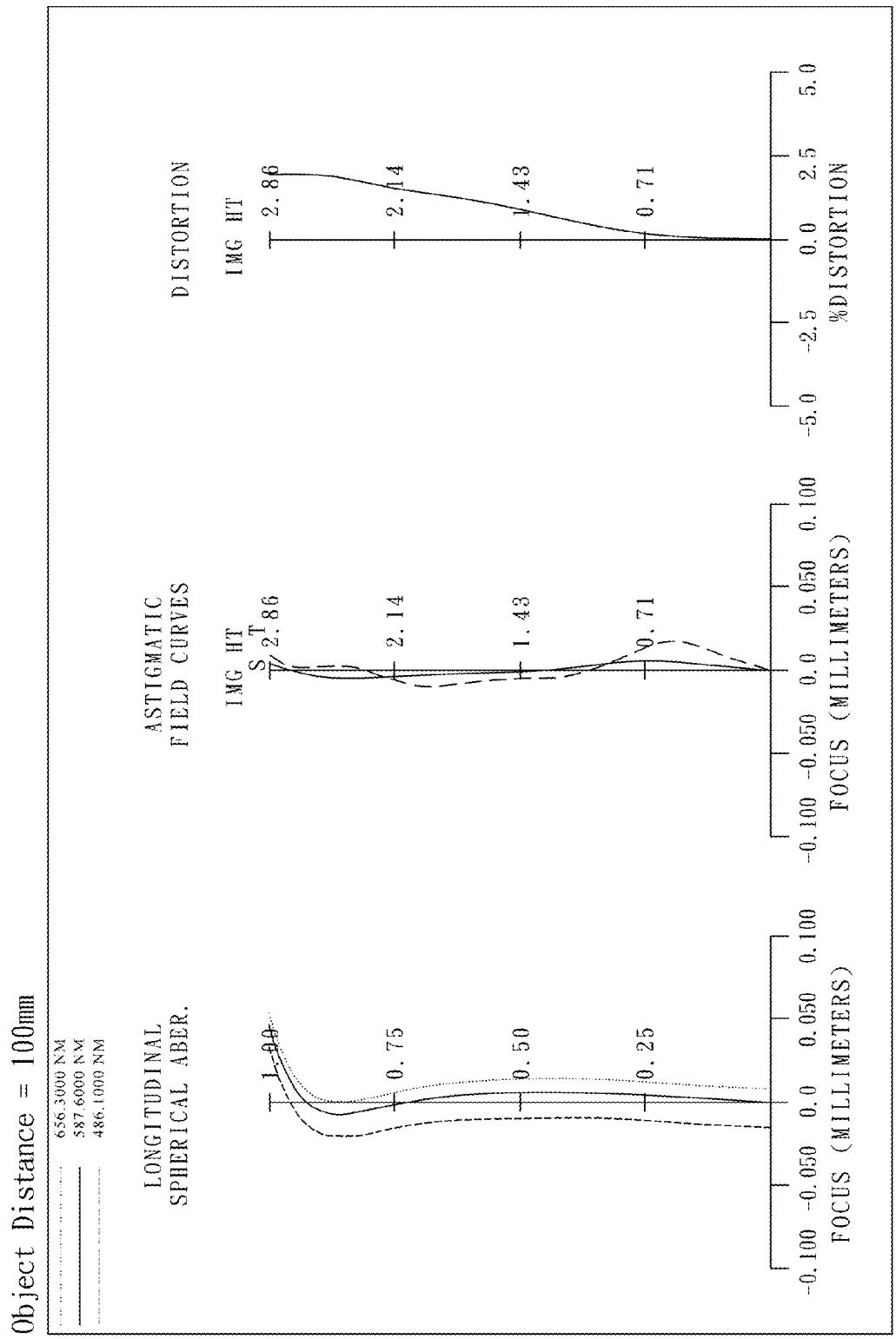
FIG. 4C shows the aberration curves of the fourth embodiment of the present invention as a distance between the lens assembly and the imaged object is 100 mm.

FIG. 4A shows an image capturing lens assembly in accordance with the four embodiment of the present invention; meanwhile, FIG. 4B shows the aberration curves of the four embodiment as a distance between the lens assembly and an imaged object is infinite, and FIG. 4C shows the aberration curves as a distance between the lens assembly and the imaged object is 100 mm. The image capturing lens assembly of the four embodiment of the present invention mainly comprises five lens elements, in order from an object side to an image side:

a first lens group G1, comprising a first lens element 410 made of plastic with a positive refractive power having a convex object-side surface 411 and a convex image-side surface 412, the object-side and image-side surfaces 411 and 412 thereof being aspheric; and a second lens group G2, comprising, in order from an object side to an image side:

a second lens element 420 made of plastic with a negative refractive power having a convex object-side surface 421 and a concave image-side surface 422, the object-side and image-side surfaces 421 and 422 thereof being aspheric;

a third lens element 430 made of plastic with a positive refractive power having a convex object-side surface 431 and a concave image-side surface 432, the object-side and image-side surfaces 431 and 432 thereof being aspheric;

a fourth lens element 440 made of plastic with a positive refractive power having a concave object-side surface 441 and a convex image-side surface 442, the object-side and image-side surfaces 441 and 442 thereof being aspheric; and a fifth lens element 450 made of plastic with a negative refractive power having a convex object-side surface 451 and a concave image-side surface 452, the object-side and image-side surfaces 451 and 452 thereof being aspheric, and at least one inflection point is formed on both the object-side and image-side surfaces 451 and 452 thereof;

wherein an aperture stop 400 is disposed between an imaged object and the first lens element 410 the image capturing lens assembly further comprises an IR filter 470 disposed between the image-side surface 452 of the fifth lens element 450 and an image plane 481, and the IR filter 470 is made of glass and has no influence on the focal length of the image capturing lens assembly; the image capturing lens assembly further comprises an image sensor 480 provided on the image plane 481.

The detailed optical data of the fourth embodiment is shown in TABLE 9, and the aspheric surface data is shown in TABLE 10, wherein the units of the radius of curvature, the thickness and the focal length are expressed in mm, and HFOV is half of the maximal field of view.

Embodiment 5

Figure 5B:
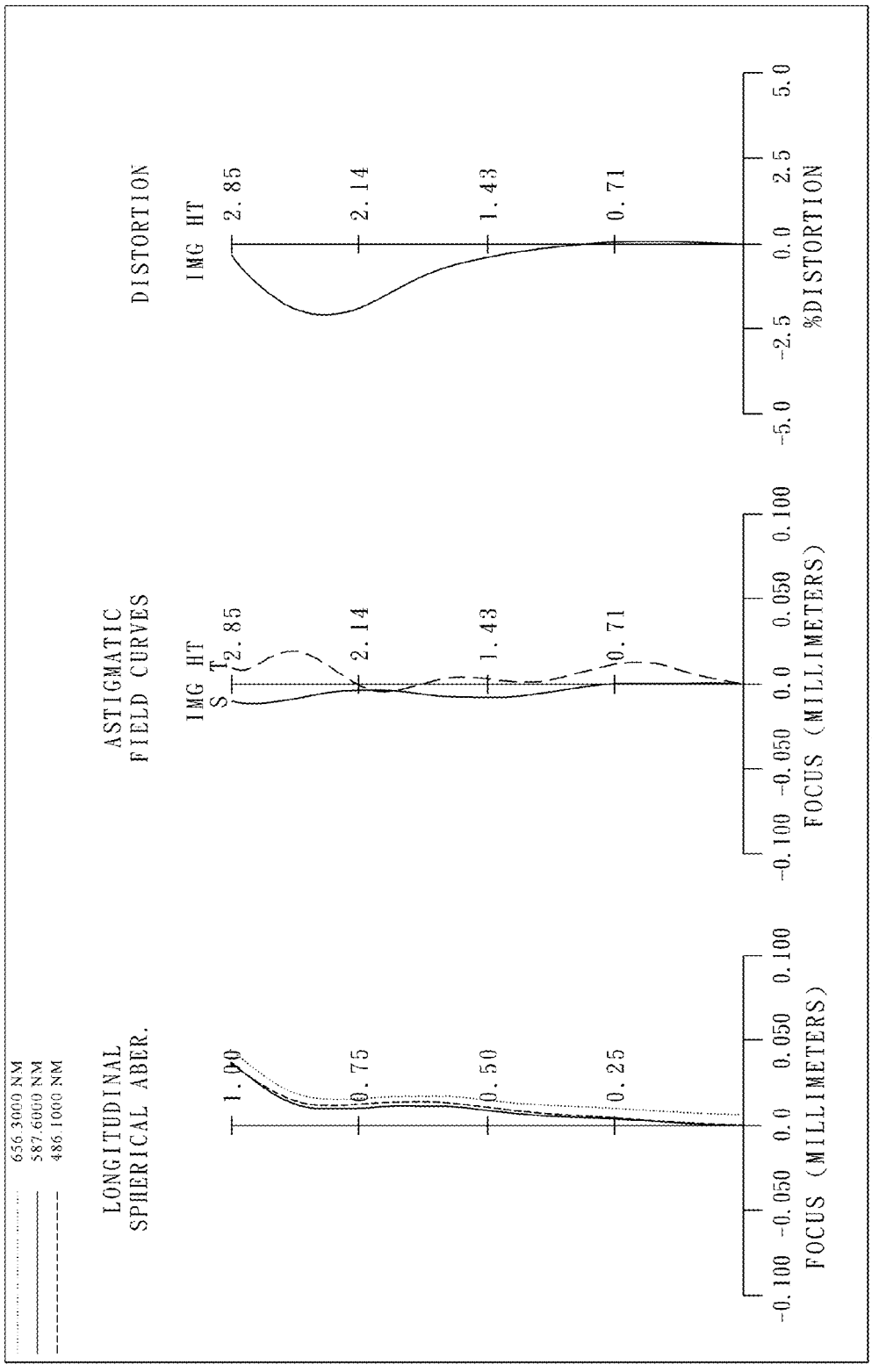
FIG. 5B shows the aberration curves of the fifth embodiment of the present invention as a distance between the lens assembly and an imaged object is infinite.

FIG. 5A shows an image capturing lens assembly in accordance with the fifth embodiment of the present invention; meanwhile, FIG. 5B shows the aberration curves of the fifth embodiment as a distance between the lens assembly and an

TABLE 9

(Embodiment 4)
Object Distance = Infinity; f = 4.05 mm, Fno = 3.00, HFOV = 35.2 deg.

| Surface # | | Curvature Radius | Thickness | Material | Index | Abbe # | Focal length |
|---|---|---|---|---|---|---|---|
| 0 | Object | Plano | Infinity, 100 | | | | |
| 1 | Ape. Stop | Plano | −0.096 | | | | |
| 2 | Lens 1 | 1.954816 (ASP) | 0.748 | Plastic | 1.544 | 55.9 | 2.73 |
| 3 | | −5.391365 (ASP) | 0.100, 0.170 | | | | |
| 4 | Lens 2 | 20.349884 (ASP) | 0.275 | Plastic | 1.632 | 23.4 | −4.42 |
| 5 | | 2.441989 (ASP) | 0.410 | | | | |
| 6 | Lens 3 | 5.285546 (ASP) | 0.305 | Plastic | 1.632 | 23.4 | 31.30 |
| 7 | | 7.051967 (ASP) | 0.293 | | | | |
| 8 | Lens 4 | −1.391818 (ASP) | 0.489 | Plastic | 1.544 | 55.9 | 3.18 |
| 9 | | −0.866744 (ASP) | 0.050 | | | | |
| 10 | Lens 5 | 19.462826 (ASP) | 0.925 | Plastic | 1.530 | 55.8 | −2.94 |
| 11 | | 1.419308 (ASP) | 0.800 | | | | |
| 12 | IR-filter | Plano | 0.200 | Glass | 1.516 | 64.1 | — |
| 13 | | Plano | 0.408 | | | | |
| 14 | Image | Plano | — | | | | |

* Reference wavelength is 587.6 nm (d-line)
* Object Distance = 100 mm; surface 3 thickness = 0.170 mm, f = 3.97 mm

TABLE 10

Aspheric Coefficients

| Surface # | 2 | 3 | 4 | 5 | 6 |
|---|---|---|---|---|---|
| k = | −1.10904E+01 | −8.93569E+00 | −1.00000E+01 | −1.00000E+00 | 0.00000E+00 |
| A4 = | 1.53697E−01 | −3.12766E−02 | 1.05342E−02 | −7.16716E−03 | −1.69044E−01 |
| A6 = | −1.81976E−01 | −4.50002E−02 | −3.70827E−02 | 6.68940E−02 | 3.81321E−02 |
| A8 = | 1.55937E−02 | −8.59386E−02 | 8.02904E−02 | −8.06295E−02 | −3.02541E−02 |
| A10 = | 3.37371E−01 | 3.35009E−01 | −1.97554E−02 | −5.25327E−02 | 1.35128E−02 |
| A12 = | −4.84513E−01 | −4.40929E−01 | 4.02033E−01 | 2.28573E−01 | −4.09911E−02 |
| A14 = | 2.29340E−02 | 7.82471E−02 | −3.53917E−01 | −1.74062E−01 | |

| Surface # | 7 | 8 | 9 | 10 | 11 |
|---|---|---|---|---|---|
| k = | 0.00000E+00 | 3.79840E−19 | −3.00620E+00 | −1.00000E+00 | −1.00502E+01 |
| A4 = | −1.33009E−01 | 9.56316E−02 | −1.37622E−01 | −2.01278E−02 | −5.55256E−02 |
| A6 = | −4.14620E−02 | 1.07177E−01 | 2.05716E−02 | −2.50642E−02 | 1.88325E−02 |
| A8 = | 1.08016E−01 | −1.93995E−01 | −1.17818E−01 | 1.21951E−02 | −7.31176E−03 |
| A10 = | −8.01634E−02 | 2.91742E−01 | 5.92232E−02 | −9.80109E−04 | 1.81106E−03 |
| A12 = | 2.80411E−02 | −1.75379E−01 | −1.94005E−02 | −2.54128E−04 | −2.47549E−04 |
| A14 = | | 3.75387E−02 | 2.37407E−03 | 3.63069E−05 | 1.37355E−05 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

(Embodiment 4)

Figure 5C:
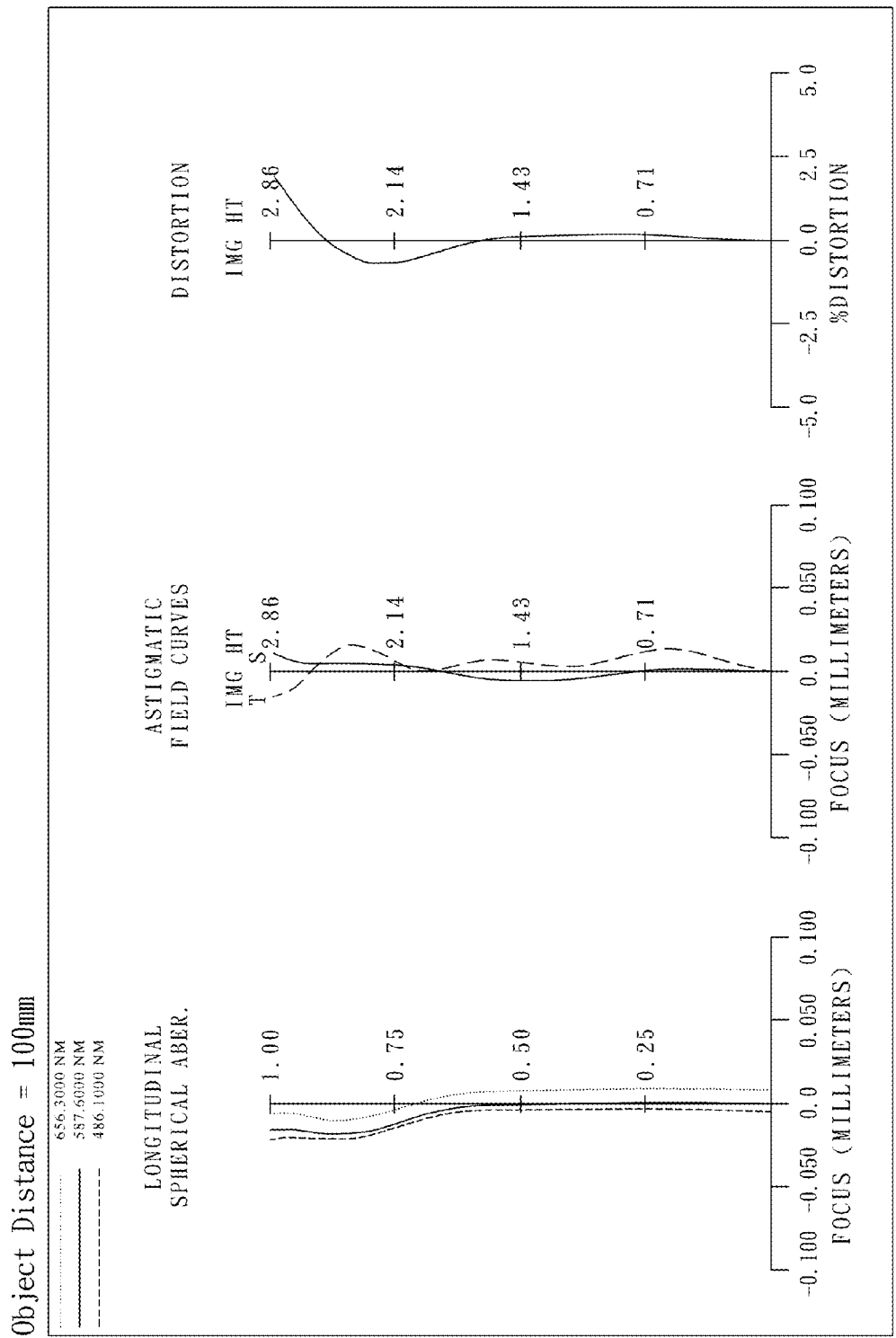
FIG. 5C shows the aberration curves of the fifth embodiment of the present invention as a distance between the lens assembly and the imaged object is 100 mm.

| f | 4.05 | f/f1 | 1.48 |
|---|---|---|---|
| Fno | 3.00 | |f/f3| | 0.13 |
| HFOV | 35.2 | |f4/f5| | 1.08 |
| N | 5 | |Δf/f| | 0.020 |
| V1 − V2 | 32.5 | |ΔBFL| [mm] | 0.0 |
| V1/(V2 + V3) | 1.19 | SL/TTL | 0.98 |
| (CT2 + CT3 + CT4 + CT5)/f | 0.49 | TTL/ImgH | 1.73 | imaged object is infinite, and FIG. 5C shows the aberration curves as a distance between the lens assembly and the imaged object is 100 mm. The image capturing lens assembly of the fifth embodiment of the present invention mainly comprises five lens elements, in order from an object side to an image side:

a first lens group G1, comprising a first lens element 510 made of glass with a positive refractive power having a convex object-side surface 511 and a concave image-side surface 512, the object-side and image-side surfaces 511 and 512 thereof being aspheric; and a second lens group G2, comprising, in order from an object side to an image side:

a second lens element 520 made of plastic with a negative refractive power having a convex object-side surface 521 and a concave image-side surface 522, the object-side and image-side surfaces 521 and 522 thereof being aspheric;

a third lens element 530 made of plastic with a negative refractive power having a concave object-side surface 531 and a convex image-side surface 532, the object-side and image-side surfaces 531 and 532 thereof being aspheric;

a fourth lens element 540 made of plastic with a positive refractive power having a concave object-side surface 541 and a convex image-side surface 542, the object-side and image-side surfaces 541 and 542 thereof being aspheric; and a fifth lens element 550 made of plastic with a negative refractive power having a convex object-side surface 551 and a concave image-side surface 552, the object-side and image-side surfaces 551 and 552 thereof being aspheric, and at least one inflection point is formed on both the object-side and image-side surfaces 551 and 552 thereof;

wherein an aperture stop 500 is disposed between the first lens element 510 and the second lens element 520;

the image capturing lens assembly further comprises an IR filter 570 disposed between the image-side surface 552 of the fifth lens element 550 and an image plane 581, and the IR filter 570 is made of glass and has no influence on the focal length of the image capturing lens assembly; the image capturing lens assembly further comprises an image sensor 580 provided on the image plane 581.

The detailed optical data of the fifth embodiment is shown in TABLE 12, and the aspheric surface data is shown in TABLE 13, wherein the units of the radius of curvature, the thickness and the focal length are expressed in mm, and HFOV is half of the maximal field of view.

TABLE 12

(Embodiment 5)
Object Distance = Infinity: f = 4.46 mm, Fno = 2.60, HFOV = 32.7 deg.

| Surface # | | Curvature Radius | Thickness | Material | Index | Abbe # | Focal length |
|---|---|---|---|---|---|---|---|
| 0 | Object | Plano | Infinity, 100 | | | | |
| 1 | Lens 1 | 1.792566 (ASP) | 0.578 | Glass | 1.603 | 60.6 | 3.16 |
| 2 | | 26.568405 (ASP) | 0.060 | | | | |
| 3 | Ape. Stop | Plano | 0.117, 0.213 | | | | |
| 4 | Lens 2 | 9.881469 (ASP) | 0.265 | Plastic | 1.650 | 21.4 | −6.65 |
| 5 | | 2.972925 (ASP) | 0.523 | | | | |
| 6 | Lens 3 | −6.556053 (ASP) | 0.283 | Plastic | 1.650 | 21.4 | −36.51 |
| 7 | | −9.214037 (ASP) | 0.277 | | | | |
| 8 | Lens 4 | −1.653907 (ASP) | 0.455 | Plastic | 1.544 | 55.9 | 4.65 |
| 9 | | −1.096819 (ASP) | 0.246 | | | | |
| 10 | Lens 5 | 42.735043 (ASP) | 1.186 | Plastic | 1.530 | 55.8 | −4.88 |
| 11 | | 2.414376 (ASP) | 0.800 | | | | |
| 12 | IR-filter | Plano | 0.300 | Glass | 1.516 | 64.1 | — |
| 13 | | Plano | 0.314 | | | | |
| 14 | Image | Plano | — | | | | |

* Reference wavelength is 587.6 nm (d-line)
* Object Distance = 100 mm: surface 3 thickness = 0.213 mm, f = 4.37 mm

TABLE 13

Aspheric Coefficients

| Surface # | 1 | 2 | 4 | 5 | 6 |
|---|---|---|---|---|---|
| k = | −1.05821E+01 | −1.00000E+01 | −7.62658E+00 | −1.00000E+00 | 0.00000E+00 |
| A4 = | 2.35949E−01 | 2.09232E−02 | −4.59845E−02 | −8.44846E−02 | −2.24960E−01 |
| A6 = | −2.51420E−01 | 5.42368E−02 | 5.27382E−02 | 4.62220E−02 | −1.39479E−01 |
| A8 = | 3.26068E−01 | −1.05871E−01 | −3.29685E−02 | −6.93804E−02 | 1.30917E−01 |
| A10 = | −2.57855E−01 | 1.58708E−01 | −9.94128E−02 | −2.10319E−02 | −3.65780E−02 |
| A12 = | 1.09701E−01 | −6.94658E−02 | 2.19417E−01 | 4.29524E−02 | 5.58152E−02 |
| A14 = | −5.35551E−03 | 1.04645E−02 | −1.57843E−01 | −3.34595E−02 | |

| Surface # | 7 | 8 | 9 | 10 | 11 |
|---|---|---|---|---|---|
| k= | 0.00000E+00 | 7.88973E−20 | −3.11379E+00 | −1.00000E+00 | −1.16549E+01 |
| A4= | −1.14818E−01 | 1.94450E−01 | −5.08005E−02 | −9.63755E−03 | −5.25059E−02 |
| A6= | −1.35318E−01 | 4.10035E−02 | 1.64555E−01 | −1.98930E−02 | 1.70616E−02 |
| A8= | 1.36539E−01 | −2.44290E−01 | −1.19046E−01 | 8.91830E−03 | −6.74919E−03 |
| A10= | −3.40275E−02 | 2.96796E−01 | 5.92069E−02 | −8.37360E−04 | 1.45016E−03 |
| A12= | 2.67211E−02 | −1.62558E−01 | −2.07759E−02 | −1.29302E−04 | −1.62119E−04 |
| A14= | | 3.36143E−02 | 3.27157E−03 | 2.08878E−05 | 7.55832E−06 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

(Embodiment 5)

| f | 4.46 | f/f1 | 1.41 |
|---|---|---|---|
| Fno | 2.60 | |f/f3| | 0.12 |

TABLE 14-continued (Embodiment 5)

| | | | |
|---|---|---|---|
| HFOV | 32.7 | |f4/f5| | 0.95 |
| N | 5 | |Δf/f| | 0.020 |
| V1 − V2 | 39.2 | |ΔBFL| [mm] | 0.0 |
| V1/(V2 + V3) | 1.42 | SL/TTL | 0.88 |
| (CT2 + CT3 + CT4 + CT5)/f | 0.49 | TTL/ImgH | 1.85 |

Embodiment 6

Figure 6A:
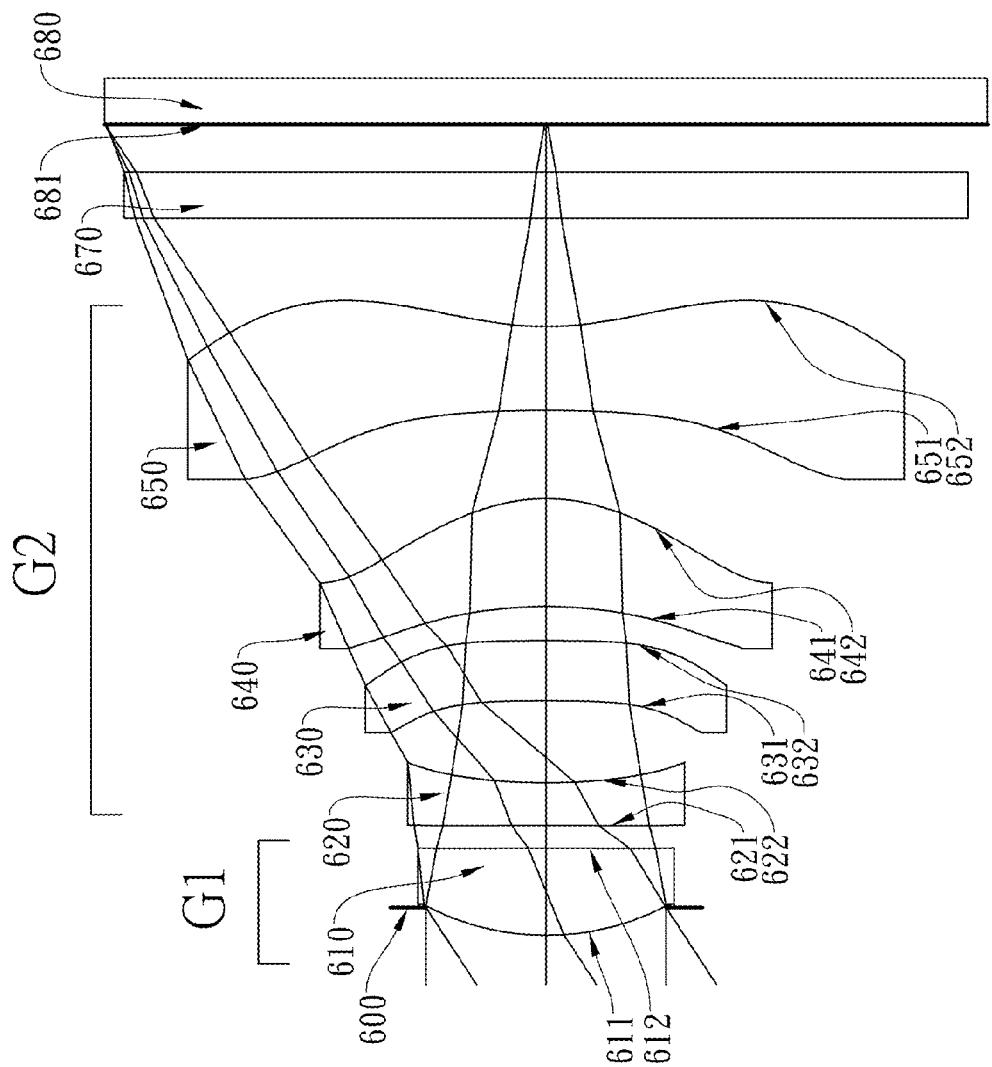
FIG. 6A shows an image capturing lens assembly in accordance with a sixth embodiment of the present invention.
Figure 6B:
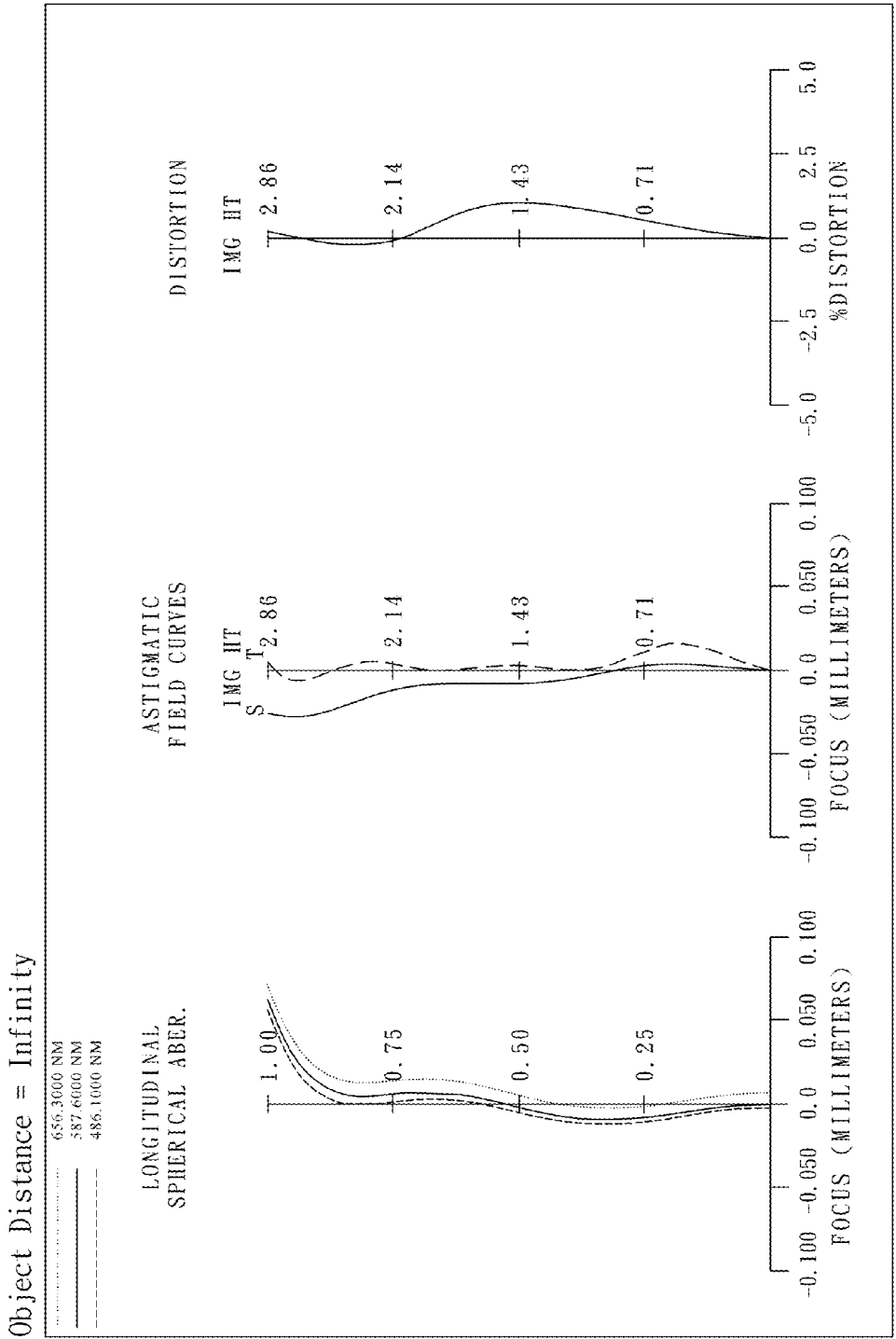
FIG. 6B shows the aberration curves of the sixth embodiment of the present invention as a distance between the lens assembly and an imaged object is infinite.
Figure 6C:
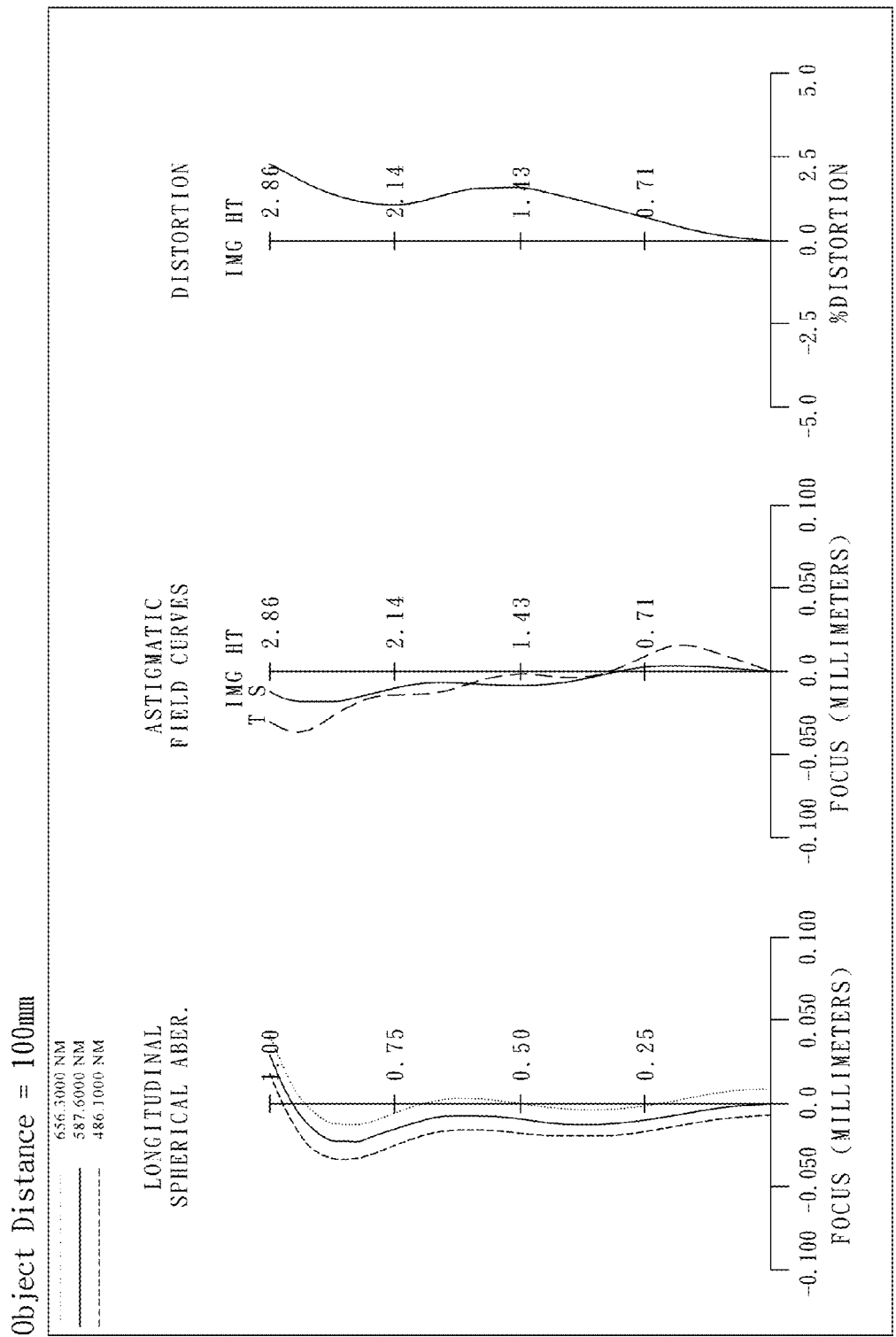
FIG. 6C shows the aberration curves of the sixth embodiment of the present invention as a distance between the lens assembly and the imaged object is 100 mm.

FIG. 6A shows an image capturing lens assembly in accordance with the sixth embodiment of the present invention; meanwhile, FIG. 6B shows the aberration curves of the sixth embodiment as a distance between the lens assembly and an imaged object is infinite, and FIG. 6C shows the aberration curves as a distance between the lens assembly and the imaged object is 100 mm. The image capturing lens assembly of the sixth embodiment of the present invention mainly comprises five lens elements, in order from an object side to an image side:

a first lens group G1, comprising a first lens element 610 made of plastic with a positive refractive power having a convex object-side surface 611 and a convex image-side surface 612, the object-side and image-side surfaces 611 and 612 thereof being aspheric; and a second lens group G2, comprising, in order from an object side to an image side:

a second lens element 620 made of plastic with a negative refractive power having a concave object-side surface 621 and a concave image-side surface 622, the object-side and image-side surfaces 621 and 622 thereof. being aspheric;

a third lens element 630 made of plastic with a negative refractive power having a concave object-side surface 631 and a convex image-side surface 632, the object-side and image-side surfaces 631 and 632 thereof being aspheric;

a fourth lens element 640 made of plastic with a positive refractive power having a concave object-side surface 641 and a convex image-side surface 642, the object-side and image-side surfaces 641 and 642 thereof being aspheric; and a fifth lens element 650 made of plastic with a negative refractive power having a concave object-side surface 651 and a concave image-side surface 652, the object-side and image-side surfaces 651 and 652 thereof being aspheric, and at least one inflection point is formed on both the object-side and image-side surfaces 651 and 652 thereof;

wherein an aperture stop 600 is disposed between an imaged object and the first lens element 610;

the image capturing lens assembly further comprises an IR filter 670 disposed between the image-side surface 652 of the fifth lens element 650 and an image plane 681, and the IR filter 670 is made of glass and has no influence on the focal length of the image capturing lens assembly; the image capturing lens assembly further comprises an image sensor 680 provided on the image plane 681.

The detailed optical data of the sixth embodiment is shown in TABLE 15, and the aspheric surface data is shown in TABLE 16, wherein the units of the radius of curvature, the thickness and the focal length are expressed in mm, and HFOV is half of the maximal field of view.

TABLE 15

(Embodiment 6)
Object Distance = Infinity: f = 4.35 mm, Fno = 2.80, HFOV = 33.2 deg.

| Surface # | | Curvature Radius | Thickness | Material | Index | Abbe # | Focal length |
|---|---|---|---|---|---|---|---|
| 0 | Object | Plano | Infinity, 100 | | | | |
| 1 | Ape. Stop | Plano | −0.179 | | | | |
| 2 | Lens 1 | 1.699185 (ASP) | 0.564 | Plastic | 1.544 | 55.9 | 2.97 |
| 3 | | −29.874824 (ASP) | 0.148, 0.231 | | | | |
| 4 | Lens 2 | −27.107617 (ASP) | 0.276 | Plastic | 1.650 | 21.4 | −5.21 |
| 5 | | 3.880729 (ASP) | 0.531 | | | | |
| 6 | Lens 3 | −16.628363 (ASP) | 0.389 | Plastic | 1.544 | 55.9 | −103.88 |
| 7 | | −23.752969 (ASP) | 0.221 | | | | |
| 8 | Lens 4 | −2.867529 (ASP) | 0.701 | Plastic | 1.544 | 55.9 | 3.17 |
| 9 | | −1.168820 (ASP) | 0.571 | | | | |
| 10 | Lens 5 | −8.348821 (ASP) | 0.544 | Plastic | 1.544 | 55.9 | −2.89 |
| 11 | | 1.984392 (ASP) | 0.700 | | | | |
| 12 | IR-filter | Plano | 0.300 | Glass | 1.516 | 64.1 | — |
| 13 | | Plano | 0.309 | | | | |
| 14 | Image | Plano | — | | | | |

* Reference wavelength is 587.6 nm (d-line)
* Object Distance = 100 mm: surface 3 thickness = 0.231 mm, f = 4.25 mm

TABLE 16

Aspheric Coefficients

| Surface # | 2 | 3 | 4 | 5 | 6 |
|---|---|---|---|---|---|
| k = | −7.74752E+00 | −1.00000E+00 | 0.00000E+00 | 9.14711E+00 | 0.00000E+00 |
| A4 = | 2.05487E−01 | 2.11486E−02 | 3.72781E−02 | 1.91648E−03 | −1.50398E−01 |
| A6 = | −1.94297E−01 | 6.14295E−02 | −7.22502E−02 | −2.09256E−02 | −1.75748E−01 |
| A8 = | 2.57694E−01 | −2.56600E−01 | 3.15310E−01 | 1.23755E−01 | 3.74743E−01 |
| A10 = | −2.59323E−01 | 3.47431E−01 | −8.77767E−01 | −3.04789E−01 | −4.35413E−01 |
| A12 = | 2.04928E−01 | 4.31320E−02 | 1.31560E+00 | 4.39831E−01 | 2.13614E−01 |
| A14 = | −9.87673E−02 | −2.54629E−01 | −7.52179E−01 | −2.24312E−01 | |

TABLE 16-continued

| Aspheric Coefficients | | | | | |
|---|---|---|---|---|---|
| Surface # | 7 | 8 | 9 | 10 | 11 |
| k = | 0.00000E+00 | 3.54783E+00 | −3.72428E+00 | 2.99173E+00 | −7.45858E+00 |
| A4 = | −1.06180E−01 | 3.38942E−02 | −1.16133E−01 | −1.23605E−02 | −5.58785E−02 |
| A6 = | −1.41836E−01 | 3.24926E−02 | 1.31549E−01 | −2.94702E−02 | 1.44546E−02 |
| A8 = | 1.36109E−01 | −2.14631E−01 | −1.13866E−01 | 1.22142E−02 | −5.84318E−03 |
| A10 = | −5.52458E−02 | 3.11662E−01 | 6.73514E−02 | −7.80001E−04 | 1.54507E−03 |
| A12 = | 1.32038E−02 | −1.68432E−01 | −1.75138E−02 | −2.06224E−04 | −2.07424E−04 |
| A14 = | | 3.33122E−02 | 1.44563E−03 | 2.44628E−05 | 1.11486E−05 |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17.

TABLE 17

| (Embodiment 6) | | | |
|---|---|---|---|
| f | 4.35 | f/f1 | 1.47 |
| Fno | 2.80 | |f/f3| | 0.04 |
| HFOV | 33.2 | |f4/f5| | 1.10 |
| N | 5 | |Δf/f| | 0.023 |
| V1 − V2 | 34.5 | |ΔBFL| [mm] | 0.0 |
| V1/(V2 + V3) | 0.72 | SL/TTL | 0.97 |
| (CT2 + CT3 + CT4 + CT5)/f | 0.44 | TTL/ImgH | 1.80 |

Embodiment 7

Figure 7A:
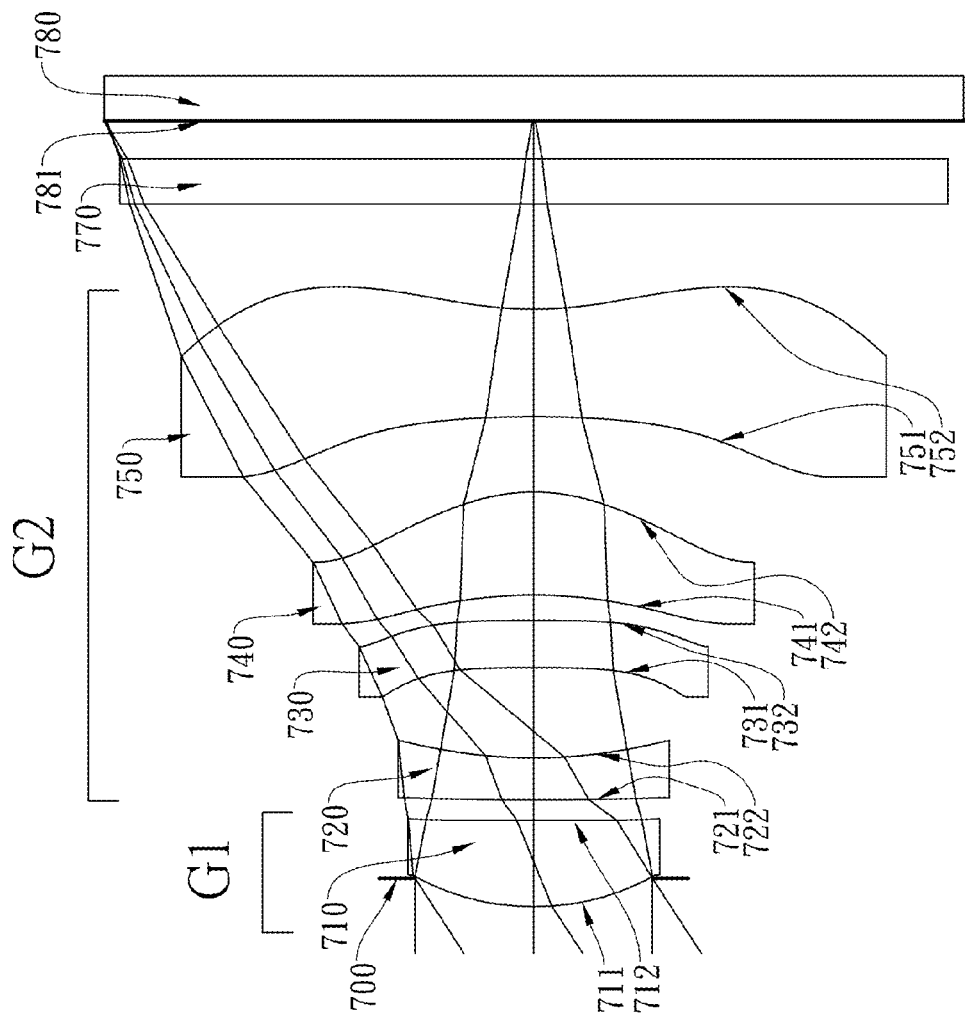
FIG. 7A shows an image capturing lens assembly in accordance with a seventh embodiment of the present invention.
Figure 7B:
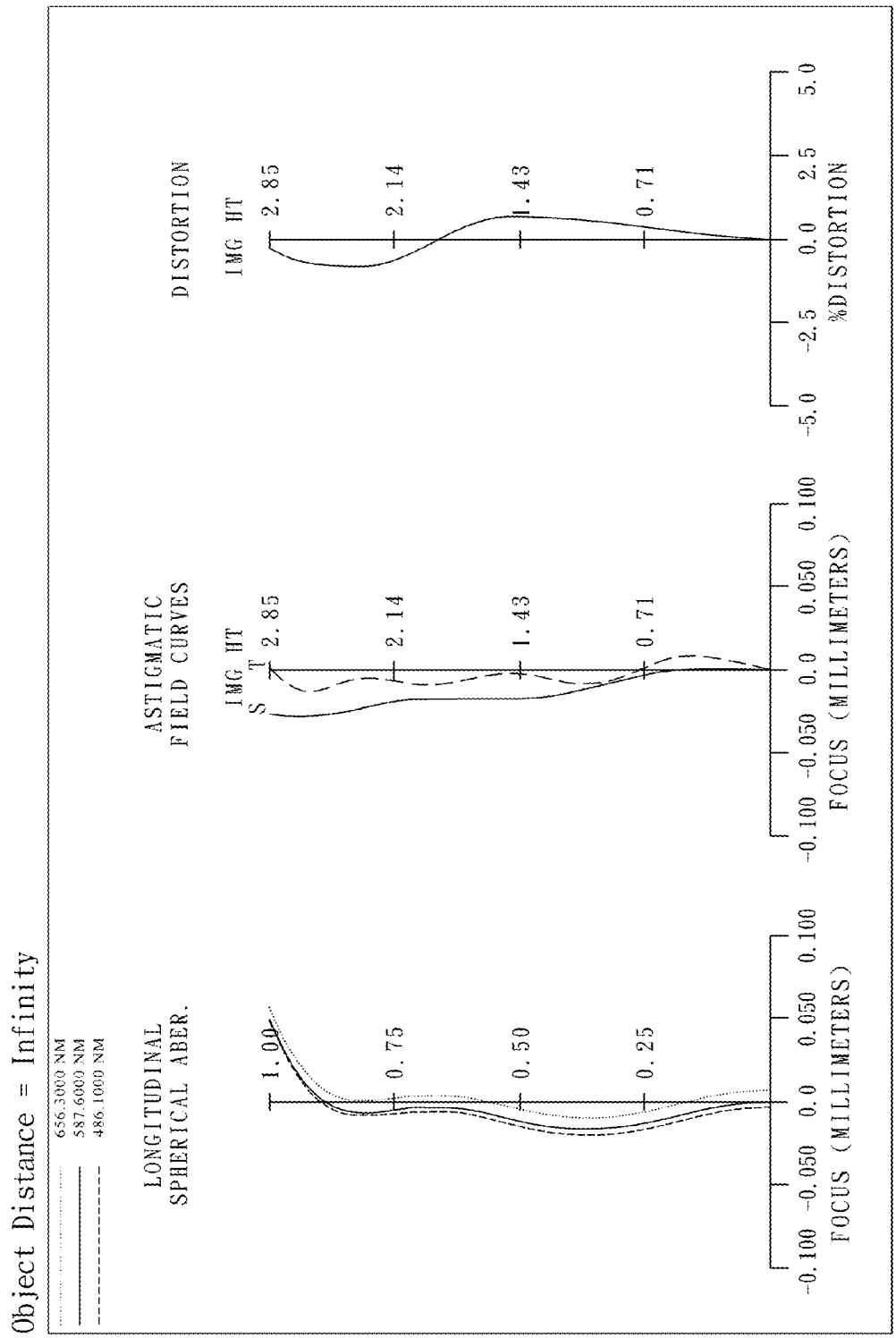
FIG. 7B shows the aberration curves of the seventh embodiment of the present invention as a distance between the lens assembly and an imaged object is infinite.
Figure 7C:
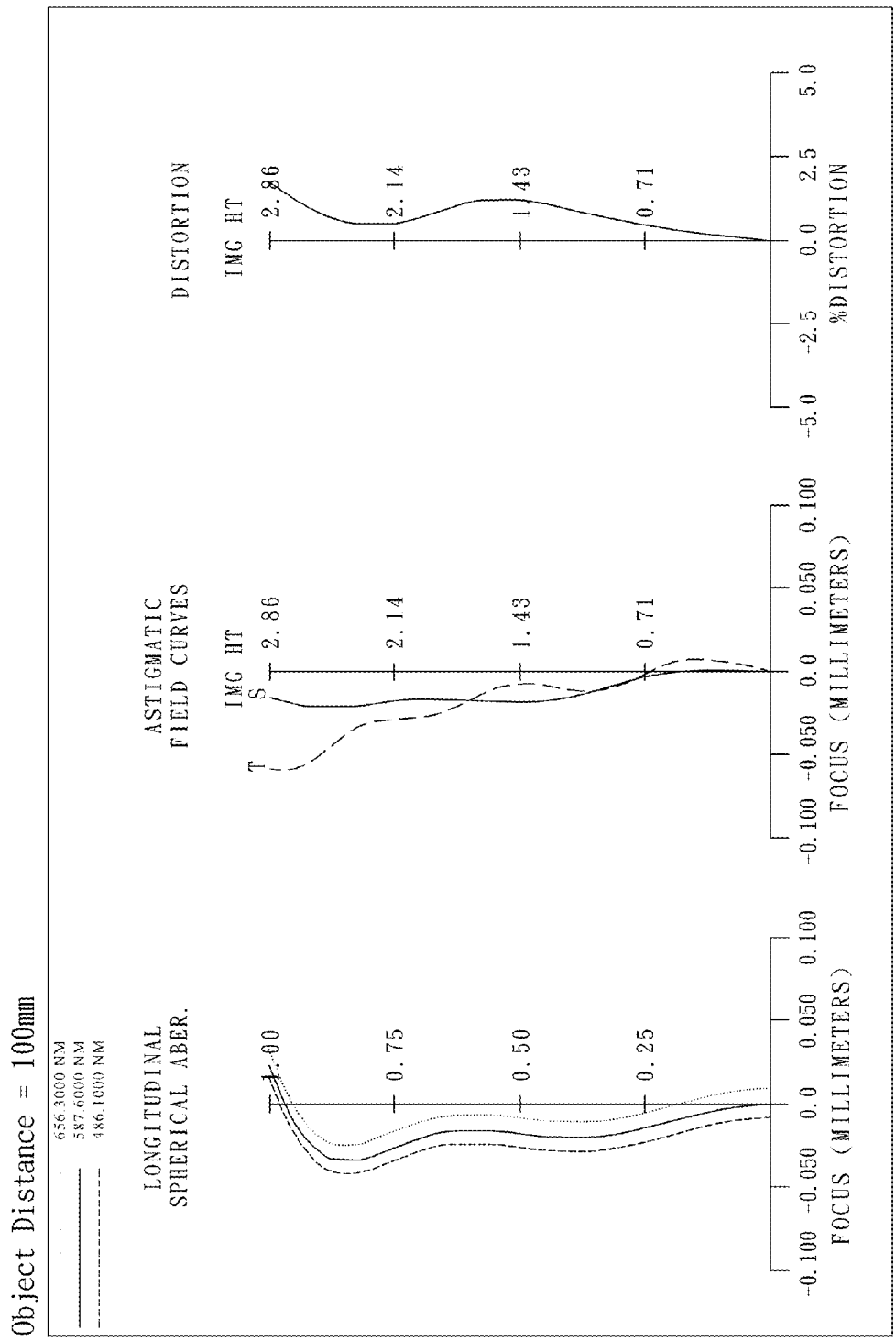
FIG. 7C shows the aberration curves of the seventh embodiment of the present invention as a distance between the lens assembly and the imaged object is 100 mm.

FIG. 7A shows an image capturing lens assembly in accordance with the seventh embodiment of the present invention; meanwhile, FIG. 7B shows the aberration curves of the seventh embodiment as a distance between the lens assembly and an imaged object is infinite, and FIG. 7C shows the aberration curves as a distance between the lens assembly and the imaged object is 100 mm. The image capturing lens assembly of the seventh embodiment of the present invention mainly comprises five lens elements, in order from an object side to an image side:

a first lens group G1, comprising a first lens element 710 made of plastic with a positive refractive power having a convex object-side surface 711 and a convex image-side surface 712, the object-side and image-side surfaces 711 and 712 thereof being aspheric; and a second lens group G2, comprising, in order from an object side to an image side:

a second lens element 720 made of plastic with a negative refractive power having a convex object-side surface 721 and a concave image-side surface 722, the object-side and image-side surfaces 721 and 722 thereof being aspheric;

a third lens element 730 made of plastic with a negative refractive power having a concave object-side surface 731 and a convex image-side surface 732, the object-side and image-side surfaces 731 and 732 thereof being aspheric;

a fourth lens element 740 made of plastic with a positive refractive power having a concave object-side surface 741 and a convex image-side surface 742, the object-side and image-side surfaces 741 and 742 thereof being aspheric; and a fifth lens element 750 made of plastic with a negative refractive power having a concave object-side surface 751 and a concave image-side surface 752, the object-side and image-side surfaces 751 and 752 thereof being aspheric, and at least one inflection point is formed on both the object-side and image-side surfaces 751 and 752 thereof;

wherein an aperture stop 700 is disposed between an imaged object and the first lens element 710;

the image capturing lens assembly further comprises an IR filter 770 disposed between the image-side surface 752 of the fifth lens element 750 and an image plane 781, and the IR filter 770 is made of glass and has no influence on the focal length of the image capturing lens assembly; the image capturing lens assembly further comprises an image sensor 780 provided on the image plane 781.

The detailed optical data of the seventh embodiment is shown in TABLE 18, and the aspheric surface data is shown in TABLE 19, wherein the units of the radius of curvature, the thickness and the focal length are expressed in mm, and HFOV is half of the maximal field of view.

TABLE 18

(Embodiment 7)
Object Distance = Infinity: f = 4.42 mm, Fno = 2.80, HFOV = 33.0 deg.

| Surface # | | Curvature Radius | Thickness | Material | Index | Abbe # | Focal length |
|---|---|---|---|---|---|---|---|
| 0 | Object | Plano | Infinity, 100 | | | | |
| 1 | Ape. Stop | Plano | −0.189 | | | | |
| 2 | Lens 1 | 1.689732 (ASP) | 0.574 | Plastic | 1.544 | 55.9 | 3.01 |
| 3 | | −47.619048 (ASP) | 0.135, 0.220 | | | | |
| 4 | Lens 2 | 21.556835 (ASP) | 0.280 | Plastic | 1.650 | 21.4 | −5.79 |
| 5 | | 3.187194 (ASP) | 0.601 | | | | |
| 6 | Lens 3 | −17.583238 (ASP) | 0.314 | Plastic | 1.650 | 21.4 | −72.87 |
| 7 | | −28.169014 (ASP) | 0.171 | | | | |
| 8 | Lens 4 | −2.894555 (ASP) | 0.686 | Plastic | 1.544 | 55.9 | 3.57 |
| 9 | | −1.260456 (ASP) | 0.501 | | | | |
| 10 | Lens 5 | −7.304873 (ASP) | 0.715 | Plastic | 1.544 | 55.9 | −3.11 |
| 11 | | 2.280392 (ASP) | 0.700 | | | | |

TABLE 18-continued (Embodiment 7)
Object Distance = Infinity: f = 4.42 mm, Fno = 2.80, HFOV = 33.0 deg.

| Surface # | | Curvature Radius | Thickness | Material | Index | Abbe # | Focal length |
|---|---|---|---|---|---|---|---|
| 12 | IR-filter | Plano | 0.300 | Glass | 1.516 | 64.1 | — |
| 13 | | Plano | 0.254 | | | | |
| 14 | Image | Plano | — | | | | |

\* Reference wavelength is 587.6 nm (d-line)
\* Object Distance = 100 mm: surface 3 thickness = 0.220 mm, f = 4.30 mm

TABLE 19

Aspheric Coefficients

| Surface # | 2 | 3 | 4 | 5 | 6 |
|---|---|---|---|---|---|
| k = | −7.53308E+00 | −1.00000E+00 | 0.00000E+00 | 6.32965E+00 | 0.00000E+00 |
| A4 = | 2.06148E−01 | 2.74212E−02 | 1.30122E−02 | −3.22501E−02 | −1.14970E−01 |
| A6 = | −1.91213E−01 | 6.94816E−02 | −9.52120E−02 | −6.28470E−02 | −1.90411E−01 |
| A8 = | 2.63242E−01 | −2.74827E−01 | 3.21976E−01 | 1.28601E−01 | 3.88940E−01 |
| A10 = | −2.55248E−01 | 3.58838E−01 | −8.67584E−01 | −2.97610E−01 | −4.36917E−01 |
| A12 = | 1.83468E−01 | 7.35091E−02 | 1.30640E+00 | 4.00192E−01 | 1.92452E−01 |
| A14 = | −7.31289E−02 | −2.61129E−01 | −7.33729E−01 | −2.02522E−01 | |

| Surface # | 7 | 8 | 9 | 10 | 11 |
|---|---|---|---|---|---|
| k = | 0.00000E+00 | 3.56937E+00 | −4.27834E+00 | −2.19038E+01 | −9.19797E+00 |
| A4 = | −7.91341E−02 | 5.87036E−02 | −1.01422E−01 | −9.83303E−03 | −4.71523E−02 |
| A6 = | −1.18855E−01 | 3.43164E−02 | 1.30526E−01 | −2.94863E−02 | 1.26155E−02 |
| A8 = | 1.27893E−01 | −2.14235E−01 | −1.14388E−01 | 1.21306E−02 | −5.81578E−03 |
| A10 = | −5.73662E−02 | 3.10955E−01 | 6.73100E−02 | −7.96586E−04 | 1.54951E−03 |
| A12 = | 1.94791E−02 | −1.68896E−01 | −1.75267E−02 | −2.07460E−04 | −2.08263E−04 |
| A14 = | | 3.35709E−02 | 1.40333E−03 | 2.49026E−05 | 1.12703E−05 |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20.

TABLE 20

(Embodiment 7)

| f | 4.42 | f/f1 | 1.47 |
|---|---|---|---|
| Fno | 2.80 | |f/f3| | 0.06 |
| HFOV | 33.0 | |f4/f5| | 1.15 |
| N | 5 | |Δf/f| | 0.027 |
| V1 − V2 | 34.5 | |ΔBFL| [mm] | 0.0 |
| V1/(V2 + V3) | 1.31 | SL/TTL | 0.96 |
| (CT2 + CT3 + CT4 + CT5)/f | 0.45 | TTL/ImgH | 1.80 |

Embodiment 8

Figure 8A:
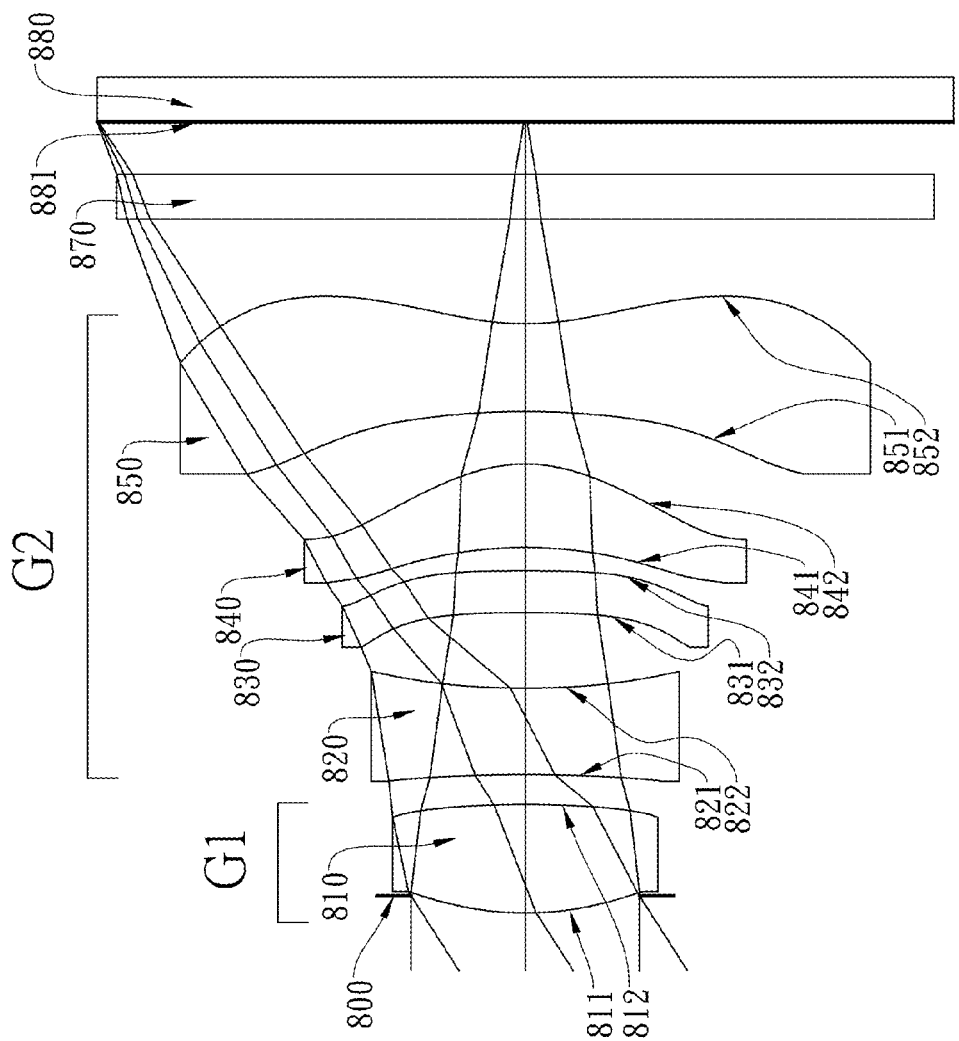
FIG. 8A shows an image capturing lens assembly in accordance with an eighth embodiment of the present invention.
Figure 8B:
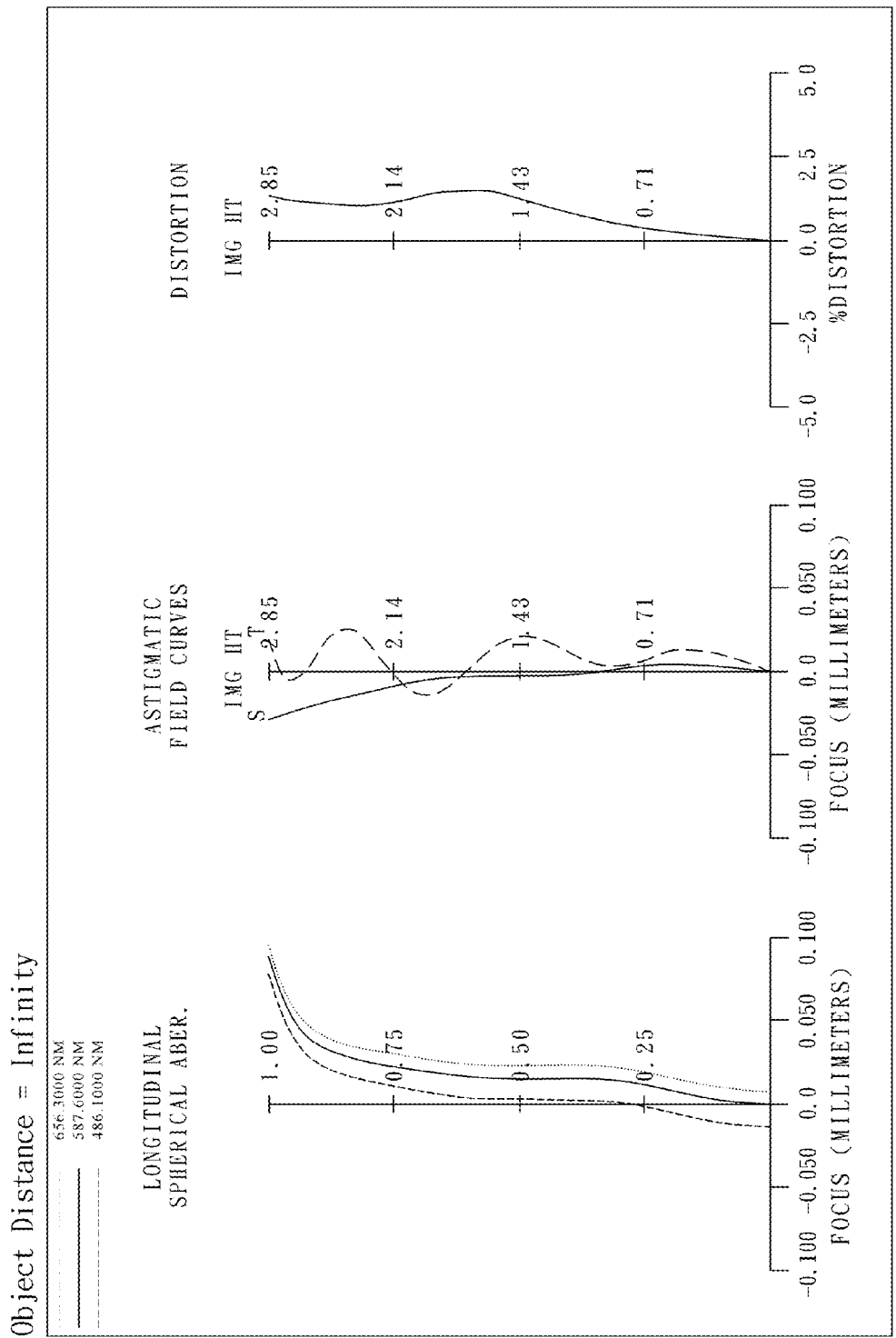
FIG. 8B shows the aberration curves of the eighth embodiment of the present invention as a distance between the lens assembly and an imaged object is infinite.
Figure 8C:
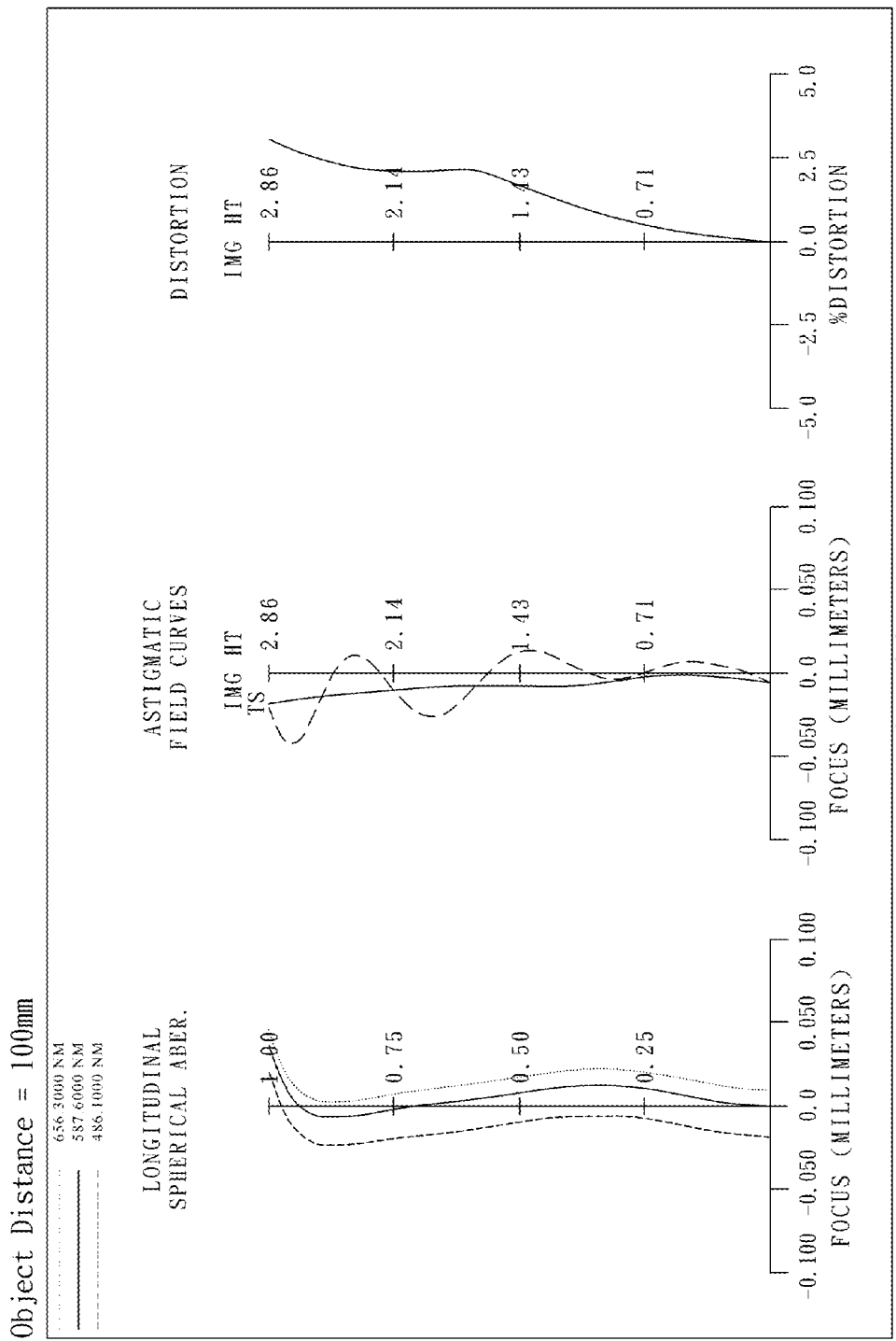
FIG. 8C shows the aberration curves of the eighth embodiment of the present invention as a distance between the lens assembly and the imaged object is 100 mm.

FIG. 8A shows an image capturing lens assembly in accordance with the eighth embodiment of the present invention; meanwhile, FIG. 8B shows the aberration curves of the eighth embodiment as a distance between the lens assembly and an imaged object is infinite, and FIG. 8C shows the aberration curves as a distance between the lens assembly and the imaged object is 100 mm. The image capturing lens assembly of the eighth embodiment of the present invention mainly comprises five lens elements, in order from an object side to an image side:

a first lens group G1, comprising a first lens element 810 made of plastic with a positive refractive power having a convex object-side surface 811 and a convex image-side surface 812, the object-side and image-side surfaces 811 and 812 thereof being aspheric; and a second lens group G2, comprising, in order from an object side to an image side:

a second lens element 820 made of plastic with a negative refractive power having a concave object-side surface 821 and a concave image-side surface 822, the object-side and image-side surfaces 821 and 822 thereof being aspheric;

a third lens element 830 made of plastic with a negative refractive power having a concave object-side surface 831 and a convex image-side surface 832, the object-side and image-side surfaces 831 and 832 thereof being aspheric;

a fourth lens element 840 made of plastic with a positive refractive power having a concave object-side surface 841 and a convex image-side surface 842, the object-side and image-side surfaces 841 and 842 thereof being aspheric; and a fifth lens element 850 made of plastic with a negative refractive power having a concave object-side surface 851 and a concave image-side surface 852, the object-side and image-side surfaces 851 and 852 thereof being aspheric, and at least one inflection point is formed on both the object-side and image-side surfaces 851 and 852 thereof;

wherein an aperture stop 800 is disposed between an imaged object and the first lens element 810;

the image capturing lens assembly further comprises an IR filter 870 disposed between the image-side surface 852 of the fifth lens element 850 and an image plane 881, and the IR filter 870 is made of glass and has no influence on the focal length of the image capturing lens assembly; the image capturing lens assembly further comprises an image sensor 880 provided on the image plane 881.

The detailed optical data of the eighth embodiment is shown in TABLE 21, and the aspheric surface data is shown in TABLE 22, wherein the units of the radius of curvature, the thickness and the focal length are expressed in mm, and HFOV is half of the maximal field of view.

TABLE 21

(Embodiment 8)
Object Distance = Infinity: f = 4.40 mm, Fno = 2.88, HFOV = 32.6 deg.

| Surface # |  | Curvature Radius | Thickness | Material | Index | Abbe # | Focal length |
|---|---|---|---|---|---|---|---|
| 0 | Object | Plano | Infinity, 100 |  |  |  |  |
| 1 | Ape. Stop | Plano | −0.114 |  |  |  |  |
| 2 | Lens 1 | 2.046520 (ASP) | 0.725 | Plastic | 1.544 | 55.9 | 3.03 |
| 3 |  | −7.455006 (ASP) | 0.200, 0.282 |  |  |  |  |
| 4 | Lens 2 | −9.950006 (ASP) | 0.579 | Plastic | 1.634 | 23.8 | −5.57 |
| 5 |  | 5.603143 (ASP) | 0.505 |  |  |  |  |
| 6 | Lens 3 | −12.307808 (ASP) | 0.280 | Plastic | 1.634 | 23.8 | −56.62 |
| 7 |  | −18.895367 (ASP) | 0.157 |  |  |  |  |
| 8 | Lens 4 | −2.865453 (ASP) | 0.559 | Plastic | 1.544 | 55.9 | 2.67 |
| 9 |  | −1.029227 (ASP) | 0.351 |  |  |  |  |
| 10 | Lens 5 | −4.709997 (ASP) | 0.586 | Plastic | 1.530 | 55.8 | −2.31 |
| 11 |  | 1.723928 (ASP) | 0.700 |  |  |  |  |
| 12 | IR-filter | Plano | 0.300 | Glass | 1.516 | 64.1 | — |
| 13 |  | Plano | 0.349 |  |  |  |  |
| 14 | Image | Plano | — |  |  |  |  |

* Reference wavelength is 587.6 nm (d-line)
* Object Distance = 100 mm: surface 3 thickness = 0.282 mm, f = 4.28 mm

TABLE 22

Aspheric Coefficients

| Surface # | 2 | 3 | 4 | 5 | 6 |
|---|---|---|---|---|---|
| k = | −1.54227E+01 | −1.00000E+00 | 1.97618E+01 | 2.54719E+01 | −3.04936E+01 |
| A4 = | 1.91584E−01 | −2.32165E−02 | 2.91488E−02 | 2.56688E−02 | −8.81856E−02 |
| A6 = | −2.34673E−01 | 3.43574E−02 | −8.66789E−02 | −6.44951E−02 | −1.69095E−01 |
| A8 = | 1.88246E−01 | −2.43391E−01 | 3.12916E−01 | 1.25410E−01 | 3.99047E−01 |
| A10 = | −1.77754E−01 | 3.89670E−01 | −8.91055E−01 | −3.23760E−01 | −4.54874E−01 |
| A12 = | 2.63695E−01 | −2.01824E−01 | 1.27400E+00 | 3.76869E−01 | 1.81119E−01 |
| A14 = | −2.18328E−01 | −5.61745E−02 | −6.78225E−01 | −1.60670E−01 |  |

| Surface # | 7 | 8 | 9 | 10 | 11 |
|---|---|---|---|---|---|
| k = | 0.00000E+00 | 3.28243E+00 | −3.71673E+00 | −6.61341E+01 | −9.77742E+00 |
| A4 = | −9.93070E−02 | 2.32026E−02 | −9.27984E−02 | −1.55393E−02 | −4.51794E−02 |
| A6 = | −1.01180E−01 | 4.15662E−02 | 1.32959E−01 | −2.92895E−02 | 1.23446E−02 |
| A8 = | 1.26019E−01 | −2.08361E−01 | −1.14528E−01 | 1.22422E−02 | −5.69898E−03 |
| A10 = | −6.45055E−02 | 3.12178E−01 | 6.69665E−02 | −7.75596E−04 | 1.53689E−03 |
| A12 = | 1.92577E−02 | −1.69602E−01 | −1.75800E−02 | −2.07881E−04 | −2.11610E−04 |
| A14 = |  | 3.27036E−02 | 1.39855E−03 | 2.30582E−05 | 1.13274E−05 |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23.

TABLE 23

(Embodiment 8)

| f | 4.40 | f/f1 | 1.45 |
|---|---|---|---|
| Fno | 2.88 | |f/f3| | 0.08 |
| HFOV | 32.6 | |f4/f5| | 1.16 |
| N | 5 | |Δf/f| | 0.027 |
| V1 − V2 | 32.1 | |ΔBFL| [mm] | 0.0 |
| V1/(V2 + V3) | 1.17 | SL/TTL | 0.98 |
| (CT2 + CT3 + CT4 + CT5)/f | 0.46 | TTL/ImgH | 1.82 |

Embodiment 9

Figure 9A:
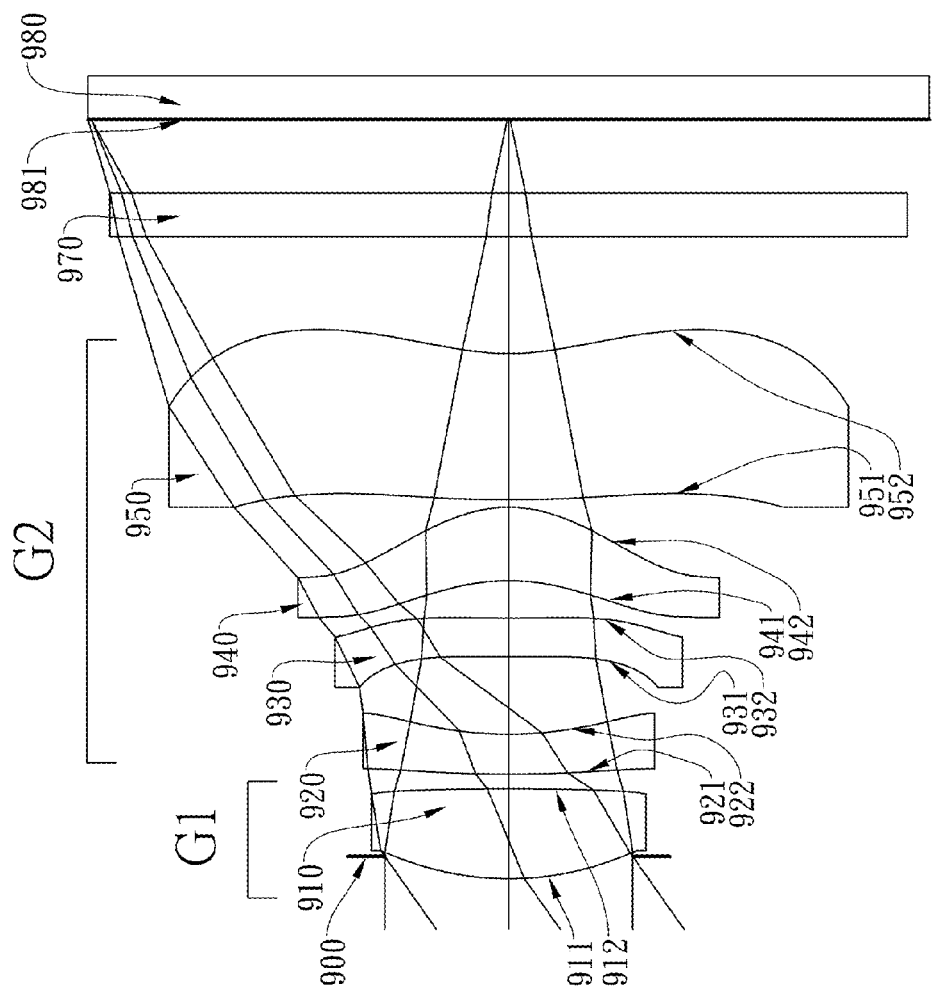
FIG. 9A shows an image capturing lens assembly in accordance with a ninth embodiment of the present invention.
Figure 9B:
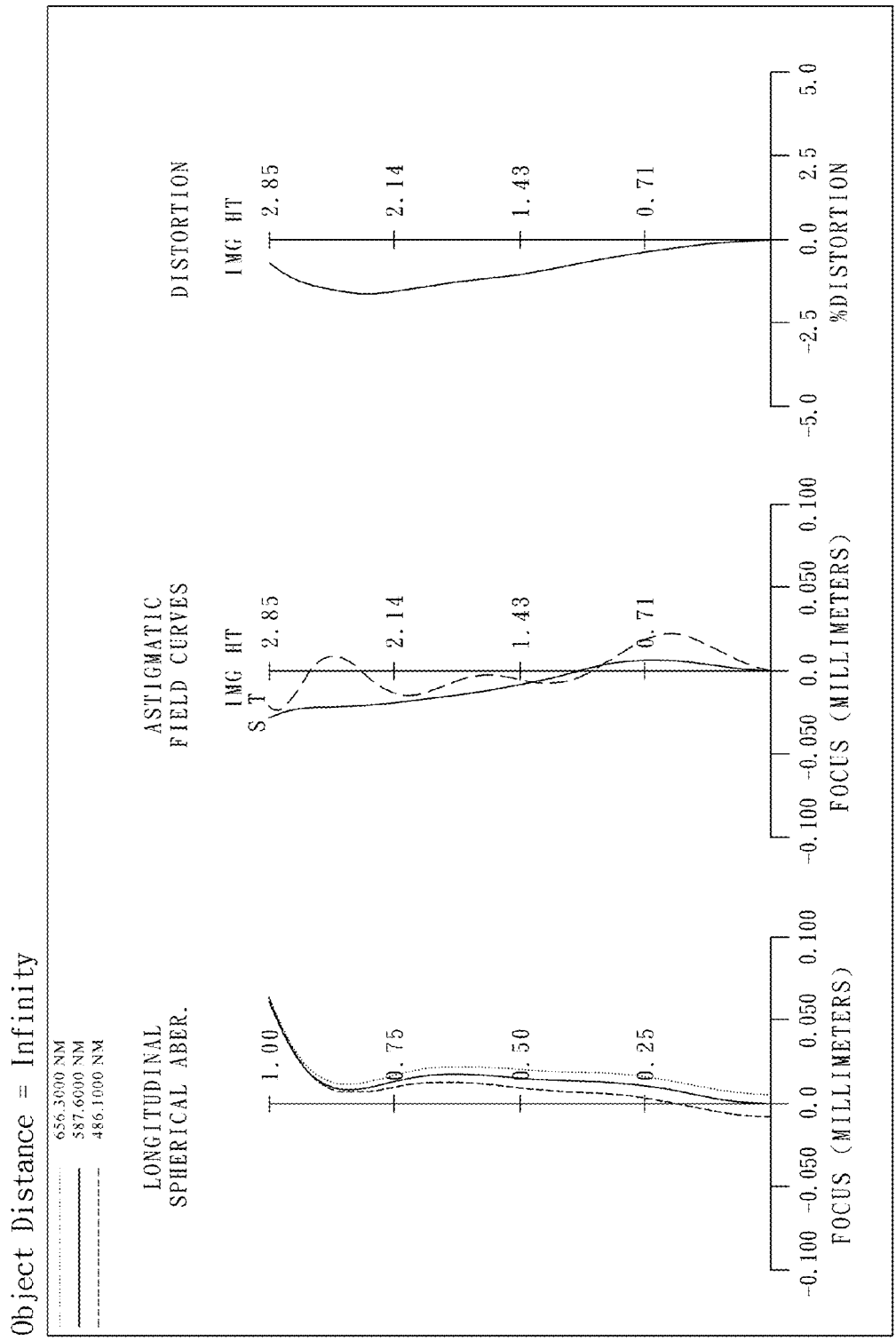
FIG. 9B shows the aberration curves of the ninth embodiment of the present invention as a distance between the lens assembly and an imaged object is infinite.
Figure 9C:
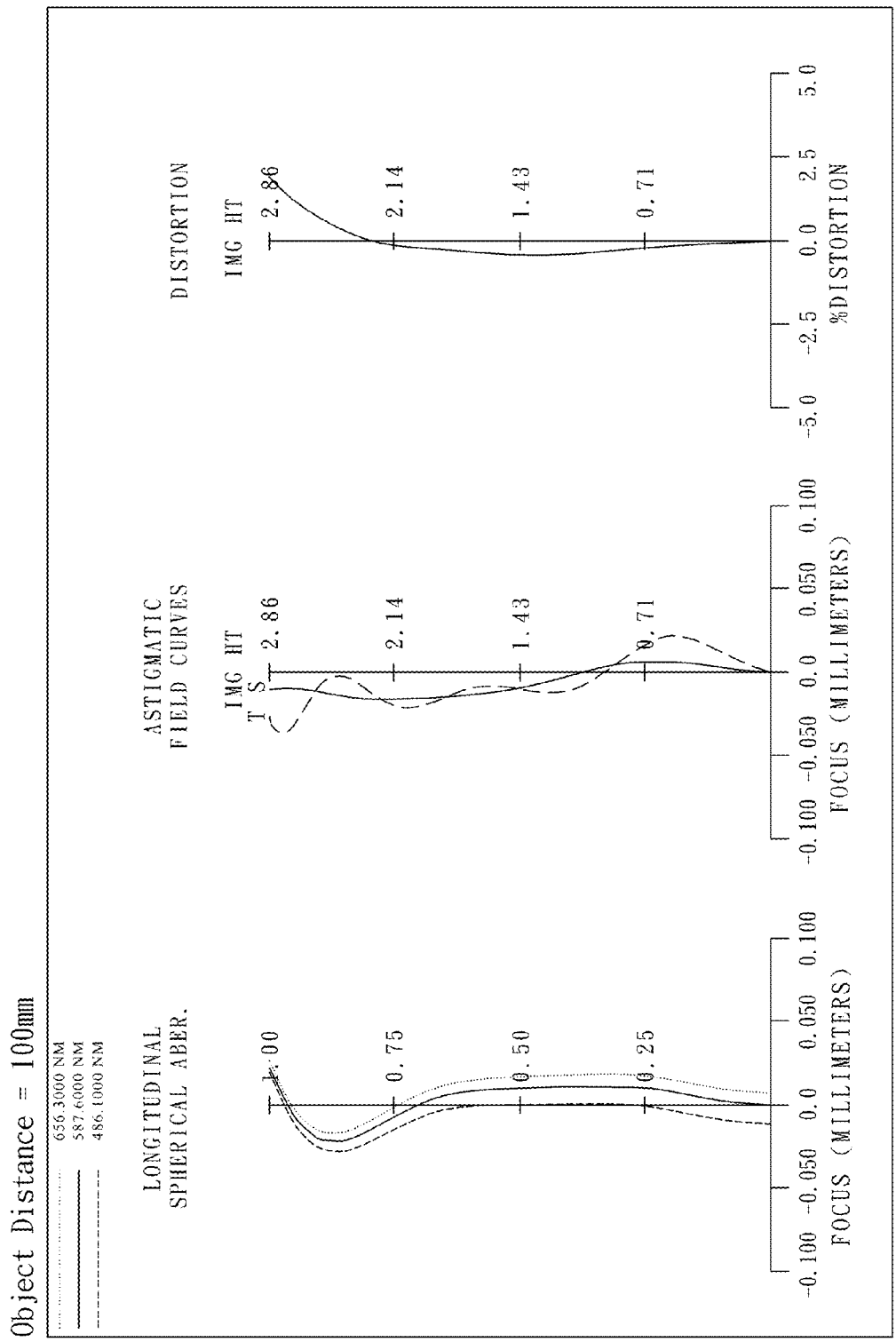
FIG. 9C shows the aberration curves of the ninth embodiment of the present invention as a distance between the lens assembly and the imaged object is 100 mm.

FIG. 9A shows an image capturing lens assembly in accordance with the ninth embodiment of the present invention; meanwhile, FIG. 9B shows the aberration curves of the ninth embodiment as a distance between the lens assembly and an imaged object is infinite, and FIG. 9C shows the aberration curves as a distance between the lens assembly and the imaged object is 100 mm. The image capturing lens assembly of the ninth embodiment of the present invention mainly comprises five lens elements, in order from an object side to an image side:

a first lens group G1, comprising a first lens element 910 made of glass with a positive refractive power having a convex object-side surface 911 and a convex image-side surface 912, the object-side and image-side surfaces 911 and 912 thereof being aspheric; and a second lens group G2, comprising, in order from an object side to an image side:

a second lens element 920 made of plastic with a negative refractive power having a convex object-side surface 921 and a concave image-side surface 922, the object-side and image-side surfaces 921 and 922 thereof being aspheric;

a third lens element 930 made of plastic with a negative refractive power having a convex object-side surface 931 and a concave image-side surface 932, the object-side and image-side surfaces 931 and 932 thereof being aspheric;

a fourth lens element 940 made of plastic with a positive refractive power having a concave object-side surface 941 and a convex image-side surface 942, the object-side and image-side surfaces 941 and 942 thereof being aspheric; and a fifth lens element 950 made of plastic with a negative refractive power having a convex object-side surface 951 and a concave image-side surface 952, the object-side and image-side surfaces 951 and 952 thereof being aspheric, and at least one inflection point is formed on both the object-side and image-side surfaces 951 and 952 thereof;

wherein an aperture stop 900 is disposed between an imaged object and the first lens element 910;

the image capturing lens assembly further comprises an IR filter 970 disposed between the image-side surface 952 of the fifth lens element 950 and an image plane 981, and the IR filter 970 is made of glass and has no influence on the focal length of the image capturing lens assembly; the image capturing lens assembly further comprises an image sensor 980 provided on the image plane 981.

The detailed optical data of the ninth embodiment is shown in TABLE 24, and the aspheric surface data is shown in TABLE 25, wherein the units of the radius of curvature, the thickness and the focal length are expressed in mm, and HFOV is half of the maximal field of view.

TABLE 24

(Embodiment 9)
Object Distance = Infinity: f = 4.07 mm, Fno = 2.40, HFOV = 35.2 deg.

| Surface # | | Curvature Radius | Thickness | Material | Index | Abbe # | Focal length |
|---|---|---|---|---|---|---|---|
| 0 | Object | Plano | Infinity, 100 | | | | |
| 1 | Ape. Stop | Plano | −0.153 | | | | |
| 2 | Lens 1 | 2.010255 (ASP) | 0.615 | Glass | 1.603 | 60.6 | 3.10 |
| 3 | | −23.395733 (ASP) | 0.100, 0.190 | | | | |
| 4 | Lens 2 | 7.983613 (ASP) | 0.275 | Plastic | 1.632 | 23.4 | −5.89 |
| 5 | | 2.504681 (ASP) | 0.530 | | | | |
| 6 | Lens 3 | 19.601947 (ASP) | 0.265 | Plastic | 1.632 | 23.4 | −62.18 |
| 7 | | 13.009879 (ASP) | 0.257 | | | | |
| 8 | Lens 4 | −1.385114 (ASP) | 0.504 | Plastic | 1.544 | 55.9 | 3.36 |
| 9 | | −0.888933 (ASP) | 0.050 | | | | |
| 10 | Lens 5 | 8.100735 (ASP) | 1.002 | Plastic | 1.530 | 55.8 | −4.05 |
| 11 | | 1.624010 (ASP) | 0.800 | | | | |
| 12 | IR-filter | Plano | 0.300 | Glass | 1.516 | 64.1 | — |
| 13 | | Plano | 0.503 | | | | |
| 14 | Image | Plano | — | | | | |

\* Reference wavelength is 587.6 nm (d-line)

\* Object Distance = 100 mm: surface 3 thickness = 0.190 mm, f = 4.02 mm

TABLE 25

Aspheric Coefficients

| Surface # | 2 | 3 | 4 | 5 | 6 |
|---|---|---|---|---|---|
| k = | −1.57044E+01 | 1.00000E+00 | −1.00000E+01 | −1.00000E+00 | 0.00000E+00 |
| A4 = | 2.25667E−01 | 2.33170E−03 | −1.13140E−02 | −3.62341E−02 | −1.76879E−01 |
| A6 = | −3.03014E−01 | 1.27472E−02 | 9.71734E−03 | 6.98733E−02 | −3.68494E−02 |
| A8 = | 3.23752E−01 | −1.32275E−01 | −2.39179E−02 | −1.21860E−01 | 4.64621E−02 |
| A10 = | −1.86691E−01 | 2.11492E−01 | −1.09537E−01 | −2.39432E−02 | 2.32822E−02 |
| A12 = | 1.43178E−02 | −1.33354E−01 | 2.34889E−01 | 1.39474E−01 | −6.62257E−02 |
| A14 = | 1.07945E−02 | 1.04633E−02 | −1.24082E−01 | −8.37628E−02 | |

| Surface # | 7 | 8 | 9 | 10 | 11 |
|---|---|---|---|---|---|
| k = | 0.00000E+00 | 7.43770E−19 | −2.91515E+00 | −1.00000E+00 | −1.26341E+01 |
| A4 = | −1.01909E−01 | 1.90369E−01 | −1.07559E−01 | −8.66759E−03 | −5.42309E−02 |
| A6 = | −1.06179E−01 | 6.08876E−02 | 1.81644E−01 | −1.94351E−02 | 2.00698E−02 |
| A8 = | 1.39461E−01 | −2.22875E−01 | −1.13221E−01 | 8.74007E−03 | −7.54812E−03 |
| A10 = | −6.73640E−02 | 3.01045E−01 | 6.07696E−02 | −1.07773E−03 | 1.62203E−03 |
| A12 = | 1.80176E−02 | −1.64729E−01 | −2.05241E−02 | −1.65291E−04 | −1.82593E−04 |
| A14 = | | 3.35759E−02 | 2.59971E−03 | 3.62563E−05 | 7.49721E−06 |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 26.

TABLE 26

(Embodiment 9)

| f | 4.07 | f/f1 | 1.31 |
|---|---|---|---|
| Fno | 2.40 | |f/f3| | 0.07 |
| HFOV | 35.2 | |f4/f5| | 0.83 |
| N | 5 | |Δf/f| | 0.012 |
| V1 − V2 | 37.2 | |ΔBFL| [mm] | 0.0 |
| V1/(V2 + V3) | 1.29 | SL/TTL | 0.97 |
| (CT2 + CT3 + CT4 + CT5)/f | 0.50 | TTL/ImgH | 1.78 |

Embodiment 10

Figure 10A:
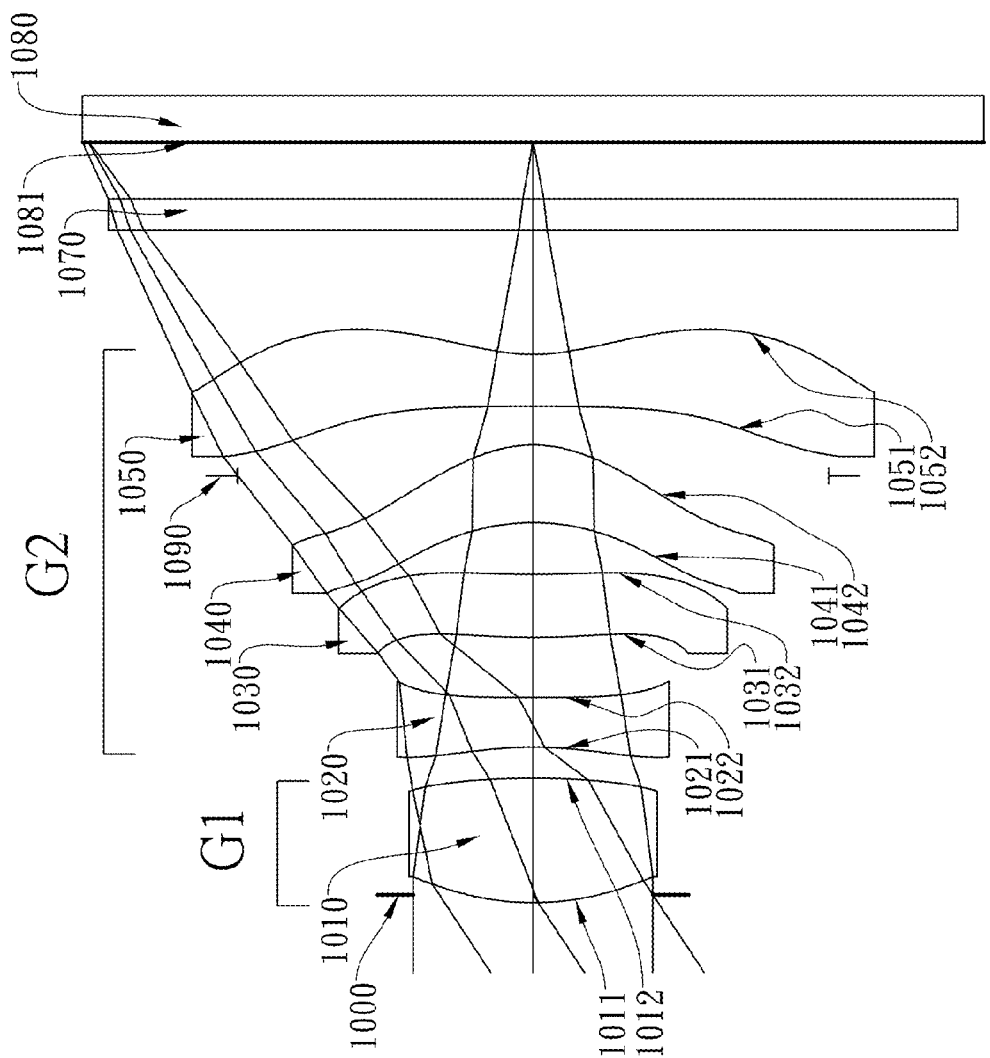
FIG. 10A shows an image capturing lens assembly in accordance with a tenth embodiment of the present invention.
Figure 10B:
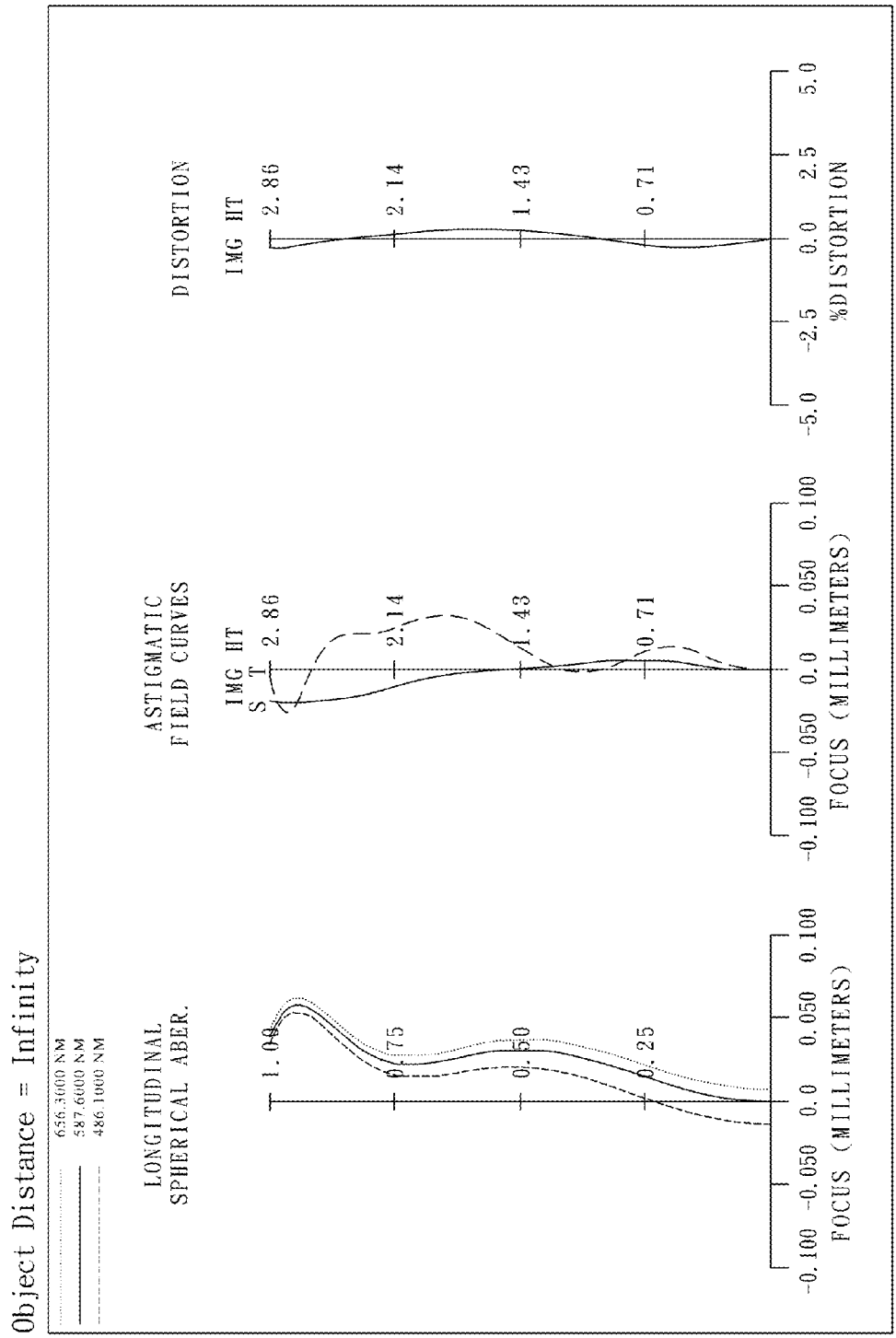
FIG. 10B shows the aberration curves of the tenth embodiment of the present invention as a distance between the lens assembly and an imaged object is infinite.
Figure 10C:
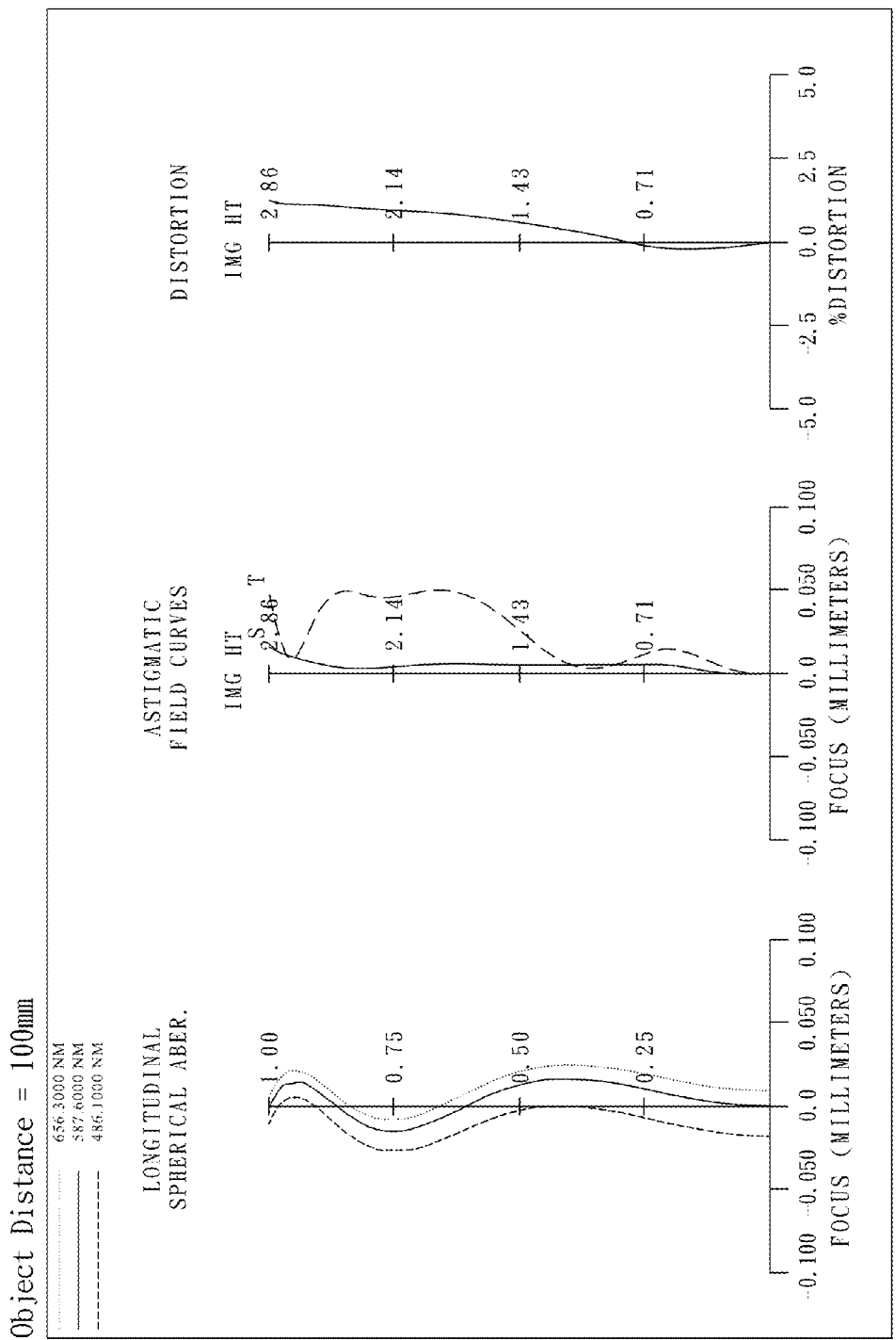
FIG. 10C shows the aberration curves of the tenth embodiment of the present invention as a distance between the lens assembly and the imaged object is 100 mm.

FIG. 10A shows an image capturing lens assembly in accordance with the tenth embodiment of the present invention; meanwhile, FIG. 10B shows the aberration curves of the tenth embodiment as a distance between the lens assembly and an imaged object is infinite, and FIG. 10C shows the aberration curves as a distance between the lens assembly and the imaged object is 100 mm. The image capturing lens assembly of the tenth embodiment of the present invention mainly comprises five lens elements, in order from an object side to an image side:

a first lens group G1, comprising a first lens element 1010 made of plastic with a positive refractive power having a convex object-side surface 1011 and a convex image-side surface 1012, the object-side and image-side surfaces 1011 and 1012 thereof being aspheric; and a second lens group G2, comprising, in order from an object side to an image side:

a second lens element 1020 made of plastic with a negative refractive power having a concave object-side surface 1021 and a concave image-side surface 1022, the object-side and image-side surfaces 1021 and 1022 thereof being aspheric;

a third lens element 1030 made of plastic with a positive refractive power having a convex object-side surface 1031 and a concave image-side surface 1032, the object-side and image-side surfaces 1031 and 1032 thereof being aspheric;

a fourth lens element 1040 made of plastic with a positive refractive power having a concave object-side surface 1041 and a convex image-side surface 1042, the object-side and image-side surfaces 1041 and 1042 thereof being aspheric; and a fifth lens element 1050 made of plastic with a negative refractive power having a concave object-side surface 1051 and a concave image-side surface 1052, the object-side and image-side surfaces 1051 and 1052 thereof being aspheric, and at least one inflection point is formed on both the object-side and image-side surfaces 1051 and 1052 thereof;

wherein an aperture stop 1000 is disposed between an imaged object and the first lens element 1010; moreover, a stop 1090 is disposed between the fourth lens element 1040 and the fifth lens element 1050;

the image capturing lens assembly further comprises an IR filter 1070 disposed between the image-side surface 1052 of the fifth lens element 1050 and an image plane 1081, and the IR filter 1070 is made of glass and has no influence on the focal length of the image capturing lens assembly; the image capturing lens assembly further comprises an image sensor 1080 provided on the image plane 1081.

The detailed optical data of the tenth embodiment is shown in TABLE 27, and the aspheric surface data is shown in TABLE 28, wherein the units of the radius of curvature, the thickness and the focal length are expressed in mm, and HFOV is half of the maximal field of view.

TABLE 27

(Embodiment 10)
Object Distance = Infinity: f = 4.31 mm, Fno = 2.80, HFOV = 33.5 deg.

| Surface # | | Curvature Radius | Thickness | Material | Index | Abbe # | Focal length |
|---|---|---|---|---|---|---|---|
| 0 | Object | Plano | Infinity, 100 | | | | |
| 1 | Ape. Stop | Plano | −0.050 | | | | |
| 2 | Lens 1 | 1.710710 (ASP) | 0.800 | Plastic | 1.544 | 55.9 | 2.54 |
| 3 | | −5.986000 (ASP) | 0.200, 0.256 | | | | |
| 4 | Lens 2 | −2.639760 (ASP) | 0.319 | Plastic | 1.632 | 23.4 | −3.88 |
| 5 | | 36.545000 (ASP) | 0.387 | | | | |
| 6 | Lens 3 | 4.277000 (ASP) | 0.406 | Plastic | 1.632 | 23.4 | 18.28 |
| 7 | | 6.540900 (ASP) | 0.333 | | | | |
| 8 | Lens 4 | −1.410090 (ASP) | 0.500 | Plastic | 1.544 | 55.9 | 2.61 |
| 9 | | −0.795560 (ASP) | −0.200 | | | | |
| 10 | Stop | Plano | 0.447 | | | | |
| 11 | Lens 5 | −31.247800 (ASP) | 0.334 | Plastic | 1.530 | 55.8 | −2.11 |
| 12 | | 1.163810 (ASP) | 0.800 | | | | |
| 13 | IR-filter | Plano | 0.200 | Glass | 1.516 | 64.1 | — |
| 14 | | Plano | 0.364 | | | | |
| 15 | Image | Plano | — | | | | |

\* Reference wavelength is 587.6 nm (d-line)
\* Effective radius of surface 10(Stop) is 1.90 mm
\* Object Distance = 100 mm: surface 3 thickness = 0.256 mm, f = 4.19 mm

TABLE 28

Aspheric Coefficients

| Surface # | 2 | 3 | 4 | 5 | 6 |
|---|---|---|---|---|---|
| k = | −7.18735E+00 | −1.59407E+00 | −7.25651E+00 | −8.32650E−01 | 0.00000E+00 |
| A4 = | 1.47807E−01 | −5.49408E−02 | 7.05501E−02 | 1.05980E−01 | −1.68892E−01 |

TABLE 28-continued

| Aspheric Coefficients | | | | | |
|---|---|---|---|---|---|
| A6 = | −1.69913E−01 | −5.94509E−02 | 8.93479E−02 | 1.48959E−01 | 1.90047E−02 |
| A8 = | 2.05106E−01 | 1.38181E−01 | −3.69004E−02 | −1.62680E−01 | −3.84730E−02 |
| A10 = | −2.96889E−01 | −7.91572E−02 | −3.41596E−01 | −7.31949E−02 | 7.80636E−02 |
| A12 = | 1.34685E−01 | −2.29575E−01 | 7.64778E−01 | 3.53920E−01 | −1.12094E−01 |
| A14 = | 2.29340E−02 | 2.34344E−01 | −4.53803E−01 | −1.80610E−01 | 0.00000E+00 |

| Surface # | 7 | 8 | 9 | 11 | 12 |
|---|---|---|---|---|---|
| k = | 0.00000E+00 | −7.24566E−03 | −3.52960E+00 | 1.00000E+00 | −1.09631E+01 |
| A4 = | −1.36423E−01 | −4.10834E−03 | −1.76060E−01 | −2.73045E−02 | −8.00044E−02 |
| A6 = | −5.85399E−02 | 1.13989E−01 | 2.11974E−01 | −2.28925E−02 | 2.22263E−02 |
| A8 = | 1.13537E−01 | −1.82751E−01 | −1.19470E−01 | 1.22762E−02 | −6.99569E−03 |
| A10 = | −7.37574E−02 | 2.94396E−01 | 5.87491E−02 | −1.03229E−03 | 1.72172E−03 |
| A12 = | 1.53284E−02 | −1.76417E−01 | −1.93087E−01 | −2.63549E−04 | −2.57552E−04 |
| A14 = | 0.00000E+00 | 3.61143E−02 | 2.44253E−03 | 3.88044E−05 | 1.75376E−05 |

The equation of the aspheric surface profiles of the tenth embodiment has the same form as that of the first embodiment. Moreover, the description of the factors in the relations is as those set forth in the first embodiment, but the values of the relations of the tenth embodiment are listed in the following TABLE 29.

TABLE 29

(Embodiment 10)

| f | 4.31 | f/f1 | 1.70 |
|---|---|---|---|
| Fno | 2.80 | |f/f3| | 0.24 |
| HFOV | 33.5 | |f4/f5| | 1.24 |
| N | 5 | |Δf/f| | 0.028 |
| V1 − V2 | 32.5 | |ΔBFL| [mm] | 0.0 |
| V1/(V2 + V3) | 1.19 | SL/TTL | 0.99 |
| (CT2 + CT3 + CT4 + CT5)/f | 0.36 | TTL/ImgH | 1.69 |

Embodiment 11

Figure 11A:
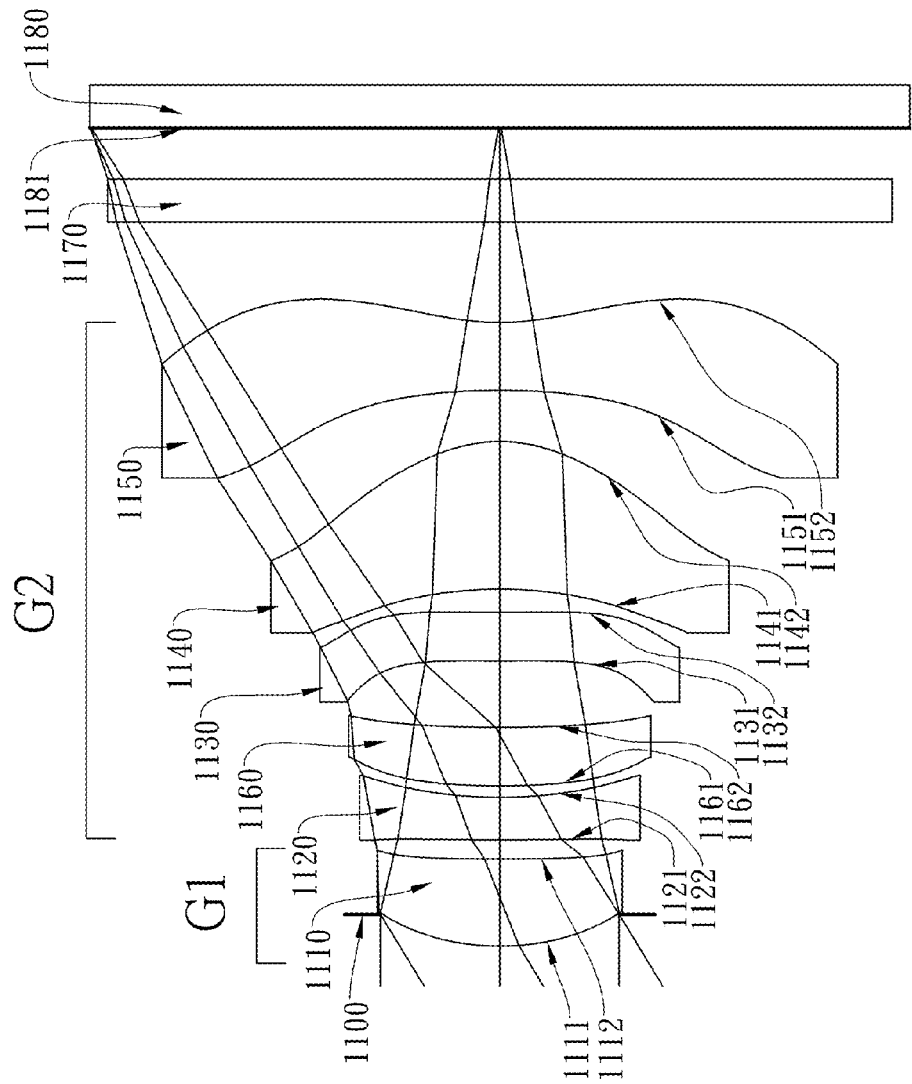
FIG. 11A shows an image capturing lens assembly in accordance with an eleventh embodiment of the present invention.
Figure 11B:
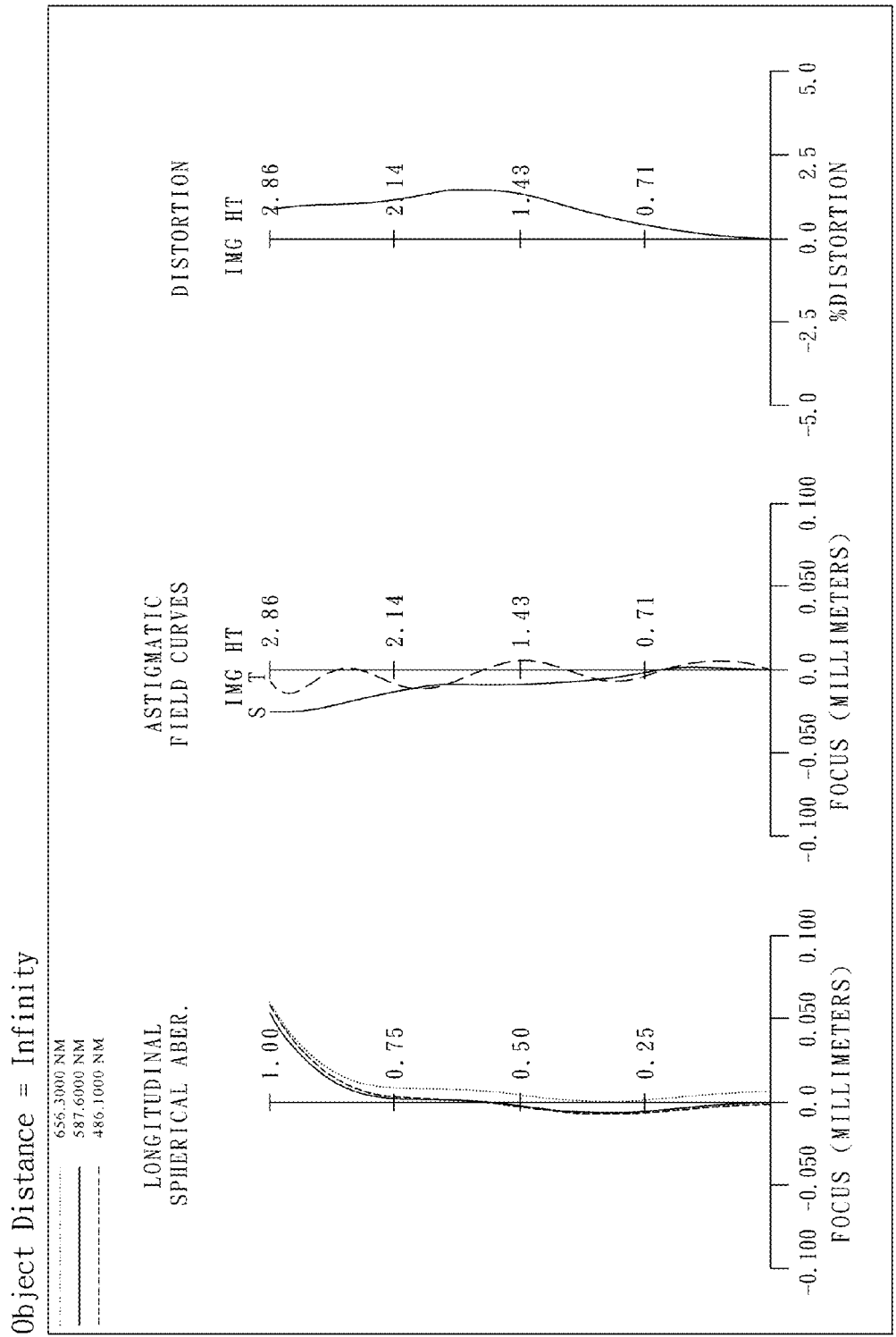
FIG. 11B shows the aberration curves of the eleventh embodiment of the present invention as a distance between the lens assembly and an imaged object is infinite.
Figure 11C:
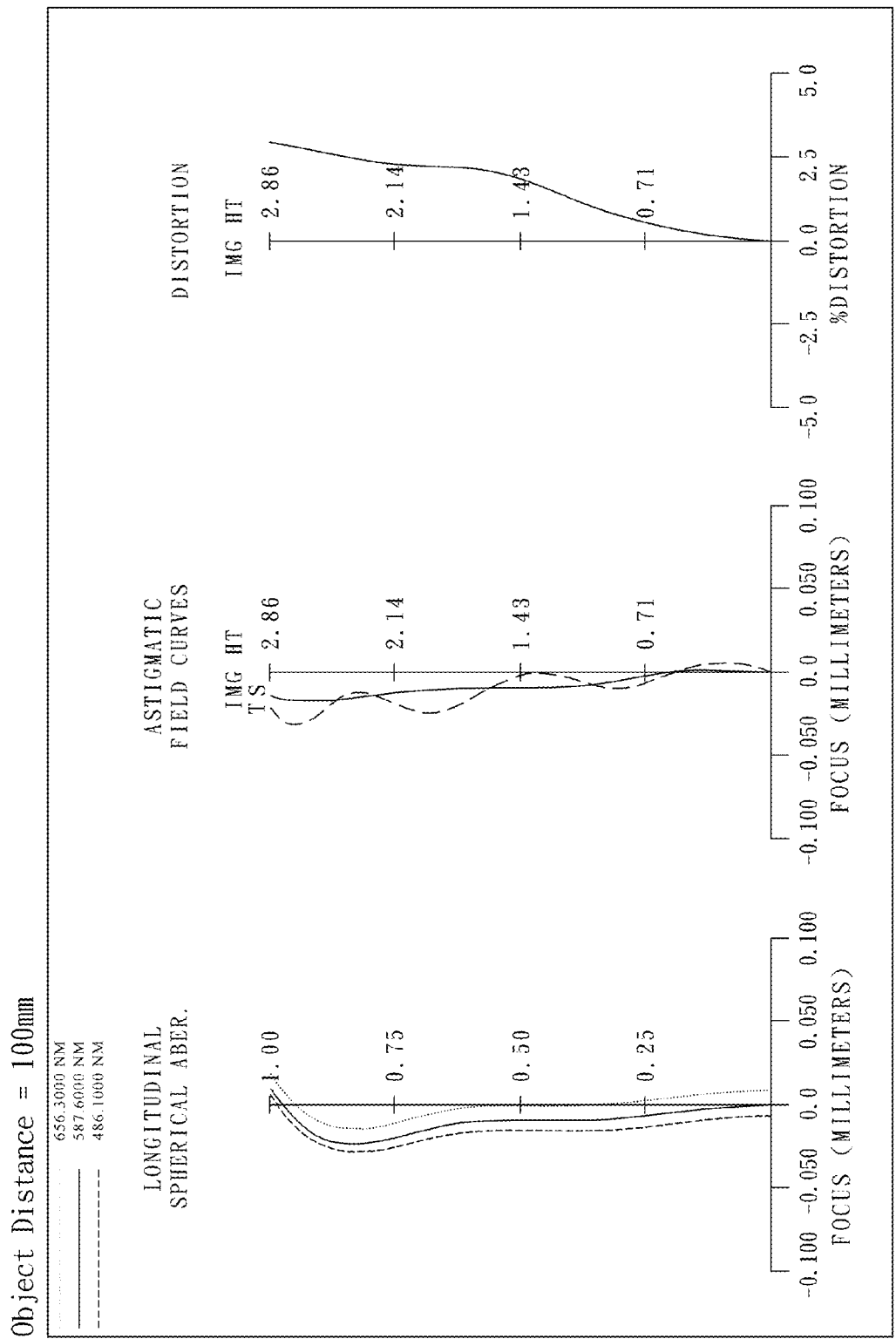
FIG. 11C shows the aberration curves of the eleventh embodiment of the present invention as a distance between the lens assembly and the imaged object is 100 mm.

FIG. 11A shows an image capturing lens assembly in accordance with the eleventh embodiment of the present invention; meanwhile, FIG. 11B shows the aberration curves of the eleventh embodiment as a distance between the lens assembly and an imaged object is infinite, and FIG. 11C shows the aberration curves as a distance between the lens assembly and the imaged object is 100 mm. The image capturing lens assembly of the eleventh embodiment of the present invention mainly comprises six lens elements, in order from an object side to an image side:

a first lens group G1, comprising a first lens element 1110 made of plastic with a positive refractive power having a convex object-side surface and a concave image-side surface 1112, the object-side and image-side surfaces 1111 and 1112 thereof being aspheric; and a second lens group G2, comprising, in order from an object side to an image side:

a second lens element 1120 made of plastic with a negative refractive power having a convex object-side surface 1121 and a concave image-side surface 1122, the object-side and image-side surfaces 1121 and 1122 thereof being aspheric;

a sixth lens element 1160 made of plastic with a positive refractive power having a convex object-side surface 1161 and a concave image-side surface 1162, the object-side and image-side surfaces 1161 and 1162 thereof being aspheric;

a third lens element 1130 made of plastic with a negative refractive power having a convex object-side surface 1131 and a concave image-side surface 1132, the object-side and image-side surfaces 1131 and 1132 thereof being aspheric;

a fourth lens element 1140 made of plastic with a positive refractive power having a concave object-side surface 1141 and a convex image-side surface 1142, the object-side and image-side surfaces 1141 and 1142 thereof being aspheric; and a fifth lens element 1150 made of plastic with a negative refractive power having a concave object-side surface 1151 and a concave image-side surface 1152, the object-side and image-side surfaces 1151 and 1152 thereof being aspheric, and at least one inflection point is formed on both the object-side and image-side surfaces 1151 and 1152 thereof;

wherein an aperture stop 1100 is disposed between an imaged object and the first lens element 1110;

the image capturing lens assembly further comprises an IR filter 1170 disposed between the image-side surface 1152 of the fifth lens element 1150 and an image plane 1181, and the IR filter 1170 is made of glass and has no influence on the focal length of the image capturing lens assembly; the image capturing lens assembly further comprises an image sensor 1180 provided on the image plane 1181.

The detailed optical data of the eleventh embodiment is shown in TABLE 30, and the aspheric surface data is shown in TABLE 31, wherein the units of the radius of curvature, the thickness and the focal length are expressed in mm, and HFOV is half of the maximal field of view.

TABLE 30

(Embodiment 11)
Object Distance = Infinity: f = 4.66 mm, Fno = 2.80, HFOV = 31.3 deg.

| Surface # | | Curvature Radius | Thickness | Material | Index | Abbe # | Focal length |
|---|---|---|---|---|---|---|---|
| 0 | Object | Plano | Infinity, 100 | | | | |
| 1 | Ape. Stop | Plano | −0.221 | | | | |
| 2 | Lens 1 | 1.721941 (ASP) | 0.607 | Plastic | 1.544 | 55.9 | 3.42 |
| 3 | | 20.357661 (ASP) | 0.134, 0.246 | | | | |
| 4 | Lens 2 | 21.061068 (ASP) | 0.297 | Plastic | 1.650 | 21.4 | −5.46 |
| 5 | | 3.020645 (ASP) | 0.080 | | | | |
| 6 | Lens 6 | 5.043414 (ASP) | 0.408 | Plastic | 1.544 | 55.9 | 18.58 |

TABLE 30-continued (Embodiment 11)
Object Distance = Infinity: f = 4.66 mm, Fno = 2.80, HFOV = 31.3 deg.

| Surface # | | Curvature Radius | Thickness | Material | Index | Abbe # | Focal length |
|---|---|---|---|---|---|---|---|
| 7 | | 9.777636 (ASP) | 0.464 | | | | |
| 8 | Lens 3 | 33.509018 (ASP) | 0.339 | Plastic | 1.544 | 55.9 | −65.23 |
| 9 | | 17.175341 (ASP) | 0.163 | | | | |
| 10 | Lens 4 | −2.910623 (ASP) | 1.030 | Plastic | 1.544 | 55.9 | 2.42 |
| 11 | | −1.018447 (ASP) | 0.357 | | | | |
| 12 | Lens 5 | −4.666089 (ASP) | 0.473 | Plastic | 1.544 | 55.9 | −2.22 |
| 13 | | 1.684444 (ASP) | 0.700 | | | | |
| 14 | IR-filter | Plano | 0.300 | Glass | 1.516 | 64.1 | — |
| 15 | | Plano | 0.357 | | | | |
| 16 | Image | Plano | — | | | | |

\* Reference wavelength is 587.6 nm (d-line)
\* Object Distance = 100 mm: surface 3 thickness = 0.246 mm, f = 4.55 mm

TABLE 31

Aspheric Coefficients

| Surface # | 2 | 3 | 4 | 5 | 6 | 7 |
|---|---|---|---|---|---|---|
| k = | −8.26381E+00 | −1.00000E+00 | 0.00000E+00 | 6.90151E+00 | 4.93439E+00 | 9.87402E+00 |
| A4 = | 2.20400E−01 | 4.48002E−02 | −2.44498E−02 | −5.95635E−02 | 3.55779E−02 | 1.08453E−02 |
| A6 = | −1.83619E−01 | 4.70482E−02 | −5.79843E−02 | 8.04292E−04 | 3.03809E−02 | 9.83149E−03 |
| A8 = | 2.46297E−01 | −1.08429E−01 | 3.30897E−01 | 1.21084E−01 | 3.70574E−02 | −4.61578E−03 |
| A10 = | −1.78952E−01 | 2.80867E−01 | −9.10502E−01 | −3.40167E−01 | −2.96562E−02 | 5.06234E−03 |
| A12 = | 7.24179E−02 | −2.66069E−01 | 1.20563E+00 | 4.12557E−01 | −1.41550E−03 | −2.10080E−03 |
| A14 = | 3.32492E−03 | 1.44916E−01 | −6.11205E−01 | −2.18791E−01 | | |

| Surface # | 8 | 9 | 10 | 11 | 12 | 13 |
|---|---|---|---|---|---|---|
| k = | 0.00000E+00 | 0.00000E+00 | 3.62367E+00 | −3.52604E+00 | −3.21344E+00 | −1.03861E+01 |
| A4 = | −1.24657E−01 | −6.29373E−02 | 2.99336E−02 | −1.33897E−01 | −1.50039E−02 | −5.66909E−02 |
| A6 = | −1.99683E−01 | −1.48663E−01 | 2.45609E−02 | 1.21477E−01 | −2.95195E−02 | 1.59676E−02 |
| A8 = | 3.48938E−01 | 1.20990E−01 | −2.12866E−01 | −1.15504E−01 | 1.22337E−02 | −6.09795E−03 |
| A10 = | −4.25392E−01 | −6.01546E−02 | 3.14126E−01 | 6.74482E−02 | −7.61390E−04 | 1.53727E−03 |
| A12 = | 1.78084E−01 | 1.84756E−02 | −1.68261E−01 | −1.73508E−02 | −2.04751E−04 | −2.04177E−04 |
| A14 = | | | 3.23670E−02 | 1.54693E−03 | 2.37076E−05 | 1.09306E−05 |

The equation of the aspheric surface profiles of the eleventh embodiment has the same form as that of the first embodiment. Moreover, the description of the factors in the relations is as those set forth in the first embodiment, but the values of the relations of the eleventh embodiment are listed in the following TABLE 32.

TABLE 32

(Embodiment 11)

| f | 4.66 | f/f1 | 1.36 |
|---|---|---|---|
| Fno | 2.80 | |f/f3| | 0.07 |
| HFOV | 31.3 | |f4/f5| | 1.09 |
| N | 6 | |Δf/f| | 0.024 |
| V1 − V2 | 34.5 | |ΔBFL| [mm] | 0.0 |
| V1/(V2 + V3) | 0.72 | SL/TTL | 0.96 |
| (CT2 + CT3 + CT4 + CT5)/f | 0.46 | TTL/ImgH | 1.96 |

It is to be noted that TABLES 1-32 show different data of the different embodiments, however, the data of the different embodiments are obtained from experiments. Therefore, any image capturing lens assembly of the same structure is considered to be within the scope of the present invention even if it uses different data. The embodiments depicted above and the appended drawings are exemplary and are not intended to limit the scope of the present invention.

What is claimed is:

1. An image capturing lens assembly comprising, in order from an object side to an image side:
   a first lens group comprising only a first lens element with a positive refractive power; and
   a second lens group comprising, in order from an object side to an image side:
   a second lens element with a negative refractive power;
   a third lens element;
   a fourth lens element; and
   a fifth lens element;
   wherein while a distance between an imaged object and the image capturing lens assembly changes from far to near, focusing is performed by moving the first lens group along the optical axis and a distance between the first lens group and an image plane changes from near to far;
   wherein a focal length of the image capturing lens assembly is f, a focal length of the third lens element is f3, a number of lens elements with refractive powers in the image capturing lens assembly is N, and they satisfy the following relations:

$|f/f3|<0.7$; and $5 \leq N \leq 7$.

2. The image capturing lens assembly according to claim 1, wherein a difference of the focal length of the image capturing lens assembly while the first lens element is at the closest or the farthest position to the image plane is $^\Delta f$, the focal length of the image capturing lens assembly is f, and they satisfy the following relation:

$$|^\Delta f/f|<0.1.$$

3. The image capturing lens assembly according to claim 2, wherein a difference of the back focal length of the image capturing lens assembly while the first lens element is at the closest or the farthest position to the image plane is $^\Delta$BFL, and it satisfies the following relation:

$$|^\Delta BFL|<0.1 \text{ mm}.$$

4. The image capturing lens assembly according to claim 3, wherein the first lens element has a convex object-side surface, at least one of the object-side and image-side surfaces of the fourth lens element is aspheric, and at least one of the object-side and image-side surfaces of the fifth lens element is aspheric.

5. The image capturing lens assembly according to claim 4, wherein the fifth lens element has a concave image-side surface and at least one inflection point is formed on at least one of the object-side and image-side surfaces of the fifth lens element.

6. The image capturing lens assembly according to claim 5, wherein the second lens element has a concave image-side surface and the fourth lens element has a concave object-side surface and a convex image-side surface.

7. The image capturing lens assembly according to claim 6, wherein the fourth lens element has a positive refractive power and the fifth lens element has a negative refractive power.

8. The image capturing lens assembly according to claim 6, wherein the third lens element has a negative refractive power.

9. The image capturing lens assembly according to claim 7, wherein the fifth lens element has a concave object-side surface.

10. The image capturing lens assembly according to claim 7, wherein an Abbe number of the first lens element is V1, an Abbe number of the second lens element is V2, and they satisfy the following relation:

$$28<V1-V2<45.$$

11. The image capturing lens assembly according to claim 7, wherein the focal length of the image capturing lens assembly is f, the focal length of the third lens element is f3, and they satisfy the following relation:

$$|f/f3|<0.4.$$

12. The image capturing lens assembly according to claim 7, further comprising a stop, a distance on an optical axis between the stop and the image plane is SL, a distance on the optical axis between the object-side surface of the first lens element and the image plane is TTL, and they satisfy the following relation:

$$0.92<SL/TTL<1.15.$$

13. The image capturing lens assembly according to claim 12, wherein a focal length of the fourth lens element is f4, a focal length of the fifth lens element is f5, and they satisfy the following relation:

$$0.6<|f4/f5|<1.4.$$

14. The image capturing lens assembly according to claim 12, wherein a thickness of the second lens element on the optical axis is CT2, a thickness of the third lens element on the optical axis is CT3, a thickness of the fourth lens element on the optical axis is CT4, a thickness of the fifth lens element on the optical axis is CT5, the focal length of the image capturing lens assembly is f, and they satisfy the following relation:

$$0.2<(CT2+CT3+CT4+CT5)/f<0.7.$$

15. The image capturing lens assembly according to claim 5, wherein an Abbe number of the first lens element is V1, an Abbe number of the second lens element is V2, an Abbe number of the third lens element is V3, and they satisfy the following relation:

$$0.85<V1/(V2+V3)<1.7.$$

16. The image capturing lens assembly according to claim 1, further comprising an image sensor provided on the image plane; a distance on the optical axis between the object-side surface of the first lens element and the image plane is TTL, half of a diagonal length of an effective photosensitive area of the image sensor is ImgH, and they satisfy the following relation:

$$TTL/\text{ImgH}<2.2.$$

17. An image capturing lens assembly comprising, in order from an object side to an image side:
   a first lens group comprising only a first lens element with a positive refractive power; and
   a second lens group comprising, in order from an object side to an image side:
      a second lens element with a negative refractive power;
      a third lens element;
      a fourth lens element with a positive refractive power; and
      a fifth lens element with a negative refractive power;
   while a distance between an imaged object and the image capturing lens assembly changes from far to near, focusing is performed by moving the first lens group along the optical axis and a distance between the first lens group and an image plane changes from near to far;
   wherein a thickness of the second lens element on the optical axis is CT2, a thickness of the third lens element on the optical axis is CT3, a thickness of the fourth lens element on the optical axis is CT4, a thickness of the fifth lens element on the optical axis is CT5, a focal length of the image capturing lens assembly is f, a number of lens elements with refractive powers in the image capturing lens assembly is N, and they satisfy the following relations:

$$0.2<(CT2+CT3+CT4+CT5)/f<1.2; \text{ and}$$

$$5 \leq N \leq 7.$$

18. The image capturing lens assembly according to claim 17, wherein a difference of the focal length of the image capturing lens assembly while the first lens element is at the closest or the farthest position to the image plane is $^\Delta f$, the focal length of the image capturing lens assembly is f, and they satisfy the following relation:

$|\Delta f/f|<0.1.$

19. The image capturing lens assembly according to claim 18, wherein the first lens element has a convex object-side surface, the fifth lens element has a concave image-side surface and at least one inflection point is formed on at least one of the object-side and image-side surfaces of the fifth lens element.

20. The image capturing lens assembly according to claim 19, wherein the second lens element has a concave image-side surface and the fourth lens element has a concave object-side surface and a convex image-side surface.

21. The image capturing lens assembly according to claim 19, wherein the focal length of the image capturing lens assembly is f, a focal length of the first lens element is f1, a focal length of the third lens element is f3, and they satisfy the following relations:

$1.0<f/f1<1.8;$ and $|f/f3|<0.7.$

22. The image capturing lens assembly according to claim 19, wherein an Abbe number of the first lens element is V1, an Abbe number of the second lens element is V2, and they satisfy the following relation:

$28<V1-V2<45.$

23. The image capturing lens assembly according to claim 19, wherein the third lens element has a negative refractive power.

24. The image capturing lens assembly according to claim 19, wherein the fifth lens element has a concave object-side surface.

* * * * *